US008354148B2

(12) United States Patent
Nishiura et al.

(10) Patent No.: US 8,354,148 B2
(45) Date of Patent: Jan. 15, 2013

(54) OPTICAL COMPENSATION POLARIZING PLATE, IMAGE DISPLAY UNIT AND LIQUID CRYSTAL DISPLAY UNIT

(75) Inventors: Yousuke Nishiura, Odawara (JP); Takako Nishiura, legal representative, Odawara (JP); Hajime Nakayama, Minami-Ashigara (JP); Tadashi Ito, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1600 days.

(21) Appl. No.: 11/596,876

(22) PCT Filed: May 17, 2005

(86) PCT No.: PCT/JP2005/009307
§ 371 (c)(1),
(2), (4) Date: Jun. 29, 2007

(87) PCT Pub. No.: WO2005/111675
PCT Pub. Date: Nov. 24, 2005

(65) Prior Publication Data
US 2007/0292635 A1 Dec. 20, 2007

(30) Foreign Application Priority Data

| May 18, 2004 | (JP) | 2004-148335 |
|---|---|---|
| Dec. 28, 2004 | (JP) | 2004-380722 |
| Mar. 10, 2005 | (JP) | 2005-068096 |

(51) Int. Cl.
*C09K 19/00* (2006.01)

(52) U.S. Cl. ......... 428/1.3; 428/1.31; 428/1.33; 349/96; 349/117; 349/118

(58) Field of Classification Search .......... 428/1.3–1.33; 349/96, 117–118
See application file for complete search history.

(56) References Cited

U.S. PATENT DOCUMENTS

| 5,245,456 | A | 9/1993 | Yoshimi et al. |
| 7,695,780 | B2 | 4/2010 | Ohgaru et al. ............... 428/1.31 |
| 2002/0162483 | A1* | 11/2002 | Shimizu et al. .......... 106/170.28 |
| 2003/0003246 | A1 | 1/2003 | Negoro et al. ................. 428/1.2 |
| 2003/0210370 | A1 | 11/2003 | Yano et al. ..................... 349/117 |
| 2004/0032547 | A1 | 2/2004 | Yano et al. |
| 2004/0247889 | A1 | 12/2004 | Nakajima et al. .......... 428/423.1 |
| 2005/0030456 | A1 | 2/2005 | Murakami et al. |
| 2007/0292635 | A1 | 12/2007 | Nishiura et al. |

FOREIGN PATENT DOCUMENTS

| JP | 4-305602 A | 10/1992 |
| JP | 4-371903 A | 12/1992 |
| JP | 5-157911 A | 6/1993 |
| JP | 7-261152 A | 10/1995 |
| JP | 11-246704 A | 9/1999 |
| JP | 2000-063560 A | 2/2000 |
| JP | 2000-63560 A | 2/2000 |
| JP | 2001-247717 A | 9/2001 |
| JP | 2001-350022 A | 12/2001 |
| JP | 2002-249599 A | 9/2002 |
| JP | 2002-258045 A | 9/2002 |
| JP | 2002-258045 A | 9/2002 |
| JP | 2003-294944 A | 10/2003 |
| JP | 2004-004641 A | 1/2004 |
| JP | 2004-4642 A | 1/2004 |
| JP | 2004-46065 A | 2/2004 |
| JP | 4074872 B | 2/2008 |

OTHER PUBLICATIONS

JPO Website Machine English Translation of JP2001-247717, Kuraki Yasuo, Nov. 11, 2001.*
JPO Machine English Translation of JP 2005-113113, Nozoe et al., Apr. 28, 2005.
JPO Machine English Translation of JP 2001-350022, Uchida et al., Dec. 21, 2001.
JPO Machine English Translation of JP 2001-247717, Kuraki, Sep. 11, 2001.
JPO Machine English Translation of JP 2000-063560, Kuraki, Feb. 29, 2000.
JPO Machine English Translation of JP 11-246704, Kuraki, Sep. 14, 1999.
Official Action issued by the Japanese Patent Office in corresponding JP Patent Application No. 2005-145956, Sep. 5, 2007; and English-language translation thereof.
Office Action from Japanese Patent Office issued in Applicants' corresponding Japanese Patent Application No. 2007-286475 dated Aug. 10, 2010, with English translation.
Office Action from Japanese Patent Office issued in Applicants' corresponding Japanese Patent Application No. 2007-286475 dated Nov. 2, 2010, with English translation.

* cited by examiner

*Primary Examiner* — Angela Ortiz
*Assistant Examiner* — Ruiyun Zhang
(74) *Attorney, Agent, or Firm* — Buchanan Ingersoll & Rooney PC

(57) ABSTRACT

An optical compensation polarizing plate comprising: a first transparent protective film; a polarizer; a second transparent protective film; and an optical compensation layer in this order, wherein at least one of the first and second transparent protective films is a cellulose acylate film having a retardation value in plane Re (nm) and a retardation value in film thickness direction Rth (nm) which fulfill the following formulae (I) and (II), and Nz and $Re_1$ defined by the following formulae (III) and (IV), of the optical compensation layer fulfill the following formulae (V) and (VI):
(I) $|Re| \leq 10$, (II) $|Rth| \leq 25$, (III) $Nz = (nx_1 - nz_1)/(nx_1 - ny_1)$, (IV) $Re_1 = (nx_1 - ny_1) \times d_1$, (V) $0.4 \leq Nz \leq 0.6$ (VI) $100 \leq Re_1 \leq 350$, wherein $Re_1$ is a retardation value in plane (nm) at a wavelength of 590 nm; Nz is an Nz factor at a wavelength of 590 nm; $nx_1$ is a refractive index along a slow axis in a film plane; $ny_1$ is a refractive index along a direction perpendicular to the slow axis in a film plane; $nz_1$ is a refractive index along a thickness direction of the film; and $d_1$ is a thickness of the film (nm).

25 Claims, No Drawings

OPTICAL COMPENSATION POLARIZING PLATE, IMAGE DISPLAY UNIT AND LIQUID CRYSTAL DISPLAY UNIT

TECHNICAL FIELD

This invention relates to an optical compensation polarizing plate comprising a polarizer having transparent protective films and an optical compensation layer laminated thereon. Further, it relates to an image display unit with the use of the above optical compensation polarizing plate. The optical compensation polarizing plate according to the invention is particularly suitable for a liquid crystal display unit operable in the so-called IPS mode.

BACKGROUND ART

In liquid crystal display units mainly employed in these days, use is made of the so-called TN mode wherein liquid crystal molecules having a positive dielectric anisotropy are aligned in a twisted state by about 90°. A liquid crystal display unit of the TN mode comprises substrates having a pair of transparent electrodes, a liquid crystal cell comprising nematic liquid crystals enclosed between the substrates and polarizing plates provided in both sides thereof. Compared with LCDs of other modes, liquid crystal display units of the TN mode are advantageous in showing a relatively high response speed of several ten milliseconds and achieving a high display contrast. However, they suffer from some problems due to viewing angle characteristics such that the display color and display contrast vary depending on viewing direction and, therefore, are still inferior in display performance to CRT.

In a liquid crystal display unit of the TN mode, display is made by applying an electric filed perpendicularly to the substrates. By switching on/off the electric field application, the major axis of liquid crystal molecules are aligned almost perpendicular with the substrates/almost parallel therewith. Thus, display is made owing to the change in the major axis direction of liquid crystal molecules on the face perpendicular to the substrates. Accordingly, the retardation of the liquid crystal layer largely varies depending on the viewing direction and, as a result, the display color and display contrast widely vary. To improve these viewing angle characteristics, it is proposed to provide an optical compensation layer between a polarizer and a TN mode liquid crystal cell and there have been proposed various optical compensation sheets. Although the viewing angle can be enlarged to a certain extent by providing such an optical compensation sheet, no such a wide viewing angle as being available as an alternative to CRT can be established in practice so far.

There has been also proposed a display system wherein an electric filed is applied in the direction not perpendicular to substrates as in the above cases but almost parallel therewith (JP-A-7-261152 and ASIA DISPLAY'95 (published by The Institute of Television Engineers of Japan & The Society for Information Display, pp. 577 to 580 and 707 to 710)). This display system wherein an electric field is applied almost in parallel to substrates is called the IPS (In-Plane Switching) mode. In a liquid crystal display unit of the IPS mode, liquid crystal molecules have homogeneous orientation almost parallel to the substrate face in the nondriven state. Therefore, light penetrates through the liquid crystal layer while little changing the polarizing face. Therefore, almost complete black display can be made in the nondriven state by providing polarizing plates above and below the substrate.

In the IPS mode, almost complete black display can be made in the normal panel line direction. In the case of observing the panel from a direction deviating from the normal line, however, there arises a problem that the viewing angle is narrowed because of light leakage that is unavoidable depending on the characteristics of the polarizing plates in the direction deviating from the light axis of the polarizing plates provided above and below the liquid crystal cell, and unignorable phase contrast caused by the homogeneously oriented liquid crystals and the transparent protective films.

To overcome this problem, use is made of a polarizing plate in which the geometric axis deviation in the polarizing plate occurring in looking from an angle is compensated by an optical compensation sheet. Polarizing plates exerting this effect are disclosed in, for example, JP-A-4-305602 and JP-A-4-371903. However, a sufficiently wide view angle can be hardly obtained in practice by using known optical compensation sheets.

In the polarizing plate reported by JP-A-4-305602, an optical compensation sheet is employed as a protective film for a polarizer. Although this polarizing plate affords favorable viewing angle characteristics in the common use environment, the polarizer suffers from a dimensional change at a high temperature or a high humidity and, in its turn, the protective film directly laminated thereon is deformed too. As a result, there arises a problem that the phase contrast of the optical compensation sheet employed as the protective film departs from the desired range so that the effects thereof cannot be stably maintained.

In JP-A-4-371903, an optical compensation sheet is laminated on a polarizing plate with the use of a triacetyl cellulose film (TAC film) having been commonly employed as a protective film. Since no stress is directly loaded on the optical compensation sheet in this case, the phase contrast of the optical compensation sheet remains stable. However, the TAC film has an unignorable phase contrast, which makes it difficult to design the optical compensation layer for compensating. Similar to the above-described case, moreover, the TAC film is stretched due to a dimensional change of the polarizer at a high temperature or a high humidity so as to cause a change in the phase contrast, which makes it impossible to establish the desired object.

In JP-A-2004-4641 and JP-A-2004-4642, a film containing a norbornene resin and a film containing a resin having imido group together with a resin having phenyl group and nitrile group are laminated as protective films. Since the phase contrast can be lowered in these cases, an optical compensation layer can be easily designed. However, these synthetic resins generally have hydrophobic nature, which frequently results in a problem in adhesion to a polarizer. That is, these resins are liable to peel off. In these cases, moreover, moisture transmission from the polarizer can be scarcely expected and thus moisture remains inside, which brings about a problem of worsening in the polarizing plate performance. Similar to the above-described case, furthermore, the problem of change in the phase contrast is more serious in such a synthetic resin film than in the TAC film, which makes it impossible to establish the desired effect.

DISCLOSURE OF THE INVENTION

The present invention relates to an optical compensation polarizing plate having a polarizing plate and an optical compensation layer laminated thereon. An object thereof is to provide an optical compensation polarizing plate by which display contrast and viewing angle characteristics of display color can be improved without lowering the frontal contrast when employed in an image display unit, in particular, a liquid crystal display unit.

Another object of the invention is to provide an image display unit provided with the above-described optical compensation polarizing plate, in particular, a liquid crystal display unit having excellent viewing angle characteristics and being available as an alternative to CRT.

Still another object thereof is to provide a liquid crystal display unit having a high contrast ratio over a wide range and being operable in the IPS mode to present easily viewable display.

The inventors conducted intensive studies to overcome the above-described problems. As a result, they have invented an optical compensation polarizing plate, an image display unit and a liquid crystal display unit as will be mentioned herein below, thereby completing the invention.

Accordingly, the invention has been achieved by providing the following matters.

(1) An optical compensation polarizing plate constructed by laminating transparent protective films on both faces of a polarizer to give a polarizing plate and further laminating an optical compensation layer on one face thereof; wherein at least one of the transparent protective films is a cellulose acylate film the retardation value in plane Re (expressed in nm) and the retardation value in the film thickness direction Rth (expressed in nm) of which fulfill the following formulae (I) and (II), and the Nz and $Re_1$, respectively defined by the following formulae (III) and (IV), of the optical compensation layer fulfill the following formulae (V) and (VI):

$$|Re| \leq 10 \quad (I)$$

$$|Rth| \leq 25 \quad (II)$$

$$Nz = (nx_1 - nz_1)/(nx_1 - ny_1) \quad (III)$$

$$Re_1 = (nx_1 - ny_1) \times d_1 \quad (IV)$$

$$0.45 \leq Nz \leq 0.6 \quad (V)$$

$$100 \leq Re_1 \leq 350 \quad (VI)$$

wherein $Re_1$ is a retardation value in plane (expressed in nm) at the wavelength of 590 nm; Nz is an Nz factor at the wavelength of 590 nm; $nx_1$ is a refractive index along the slow axis in the film plane; $ny_1$ is a refractive index along the direction perpendicular to the slow axis in the film plane; $nz_1$ is a refractive index along the thickness direction of the film; and $d_1$ is the thickness of the film (expressed in mm).

(2) An optical compensation polarizing plate as described in the above (1), wherein the transparent protective film fulfills the following formula (VII):

$$|Re_{(400)} - Re_{(700)}| \leq 10 \text{ and } |Rth_{(400)} - Rth_{(700)}| \leq 35 \quad (VII)$$

wherein $Re(\lambda)$ is a retardation value in plane (expressed in nm) at the wavelength of λ nm; and $Rth(\lambda)$ is a retardation value in the film thickness direction (expressed in run) at the wavelength of λ nm.

(3) An optical compensation polarizing plate as described in the above (1) or (2), wherein the film thickness of the transparent protective film is from 10 to 120 μm.

(4) An optical compensation polarizing plate as described in any of the above (1) to (3), wherein the transparent protective film fulfills the following formula (VIII):

$$|Re(MAX) - Re(MIN)| \leq 6 \text{ and } |Rth(MAX) - Rth(MIN)| \leq 10 \quad (VIII)$$

wherein Re(MAX) and Rth(MAX) are the maximum retardation values (expressed in nm) of an arbitrary cut out film piece of 1 m square; and Re(MIN) and Rth(MIN) are the Minimum retardation values (expressed in inn) thereof.

(5) An optical compensation polarizing plate as described in any of the above (1) to (4), wherein the transparent protective film contains at least one compound lowering the retardation value in the film thickness direction Rth (compound being capable of lowering the retardation value in the film thickness direction Rth) within a range fulfilling the following formulae (IX) and (X):

$$(Rth(A) - Rth(0))/A \leq 1.0 \quad (IX)$$

$$0.1 \leq A \leq 30 \quad (X)$$

wherein Rth(A) is Rth (nm) of a film containing A % of the compound lowering Rth; Rth(0) is Rth (nm) of a film containing no compound lowering Rth; and A is the mass (weight) (%) of the compound referring the mass of the polymer employed as the film material as to 100.

(6) An optical compensation polarizing plate as described in the above (5), wherein the compound lowering Rth is a compound having an octanol-water partition coefficient (LogP) of from 0 to 7.

(7) An optical compensation polarizing plate as described in the above (5) or (6), which contains, as the compound lowering Rth, at least one compound represented by any of the formulae (13), (18) and (19) in an amount of from 0.01 to 30% by mass based on the solid cellulose acylate content:

formula (13):

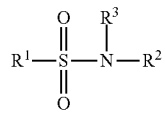

wherein $R^1$ represents an alkyl group or an aryl Lump; and $R^2$ and $R^3$ independently represent each a hydrogen atom, an alkyl group or an aryl group, provided that the sum of carbon atoms in $R^1$, $R^2$ and $R^3$ is 10 or more;

formula (18):

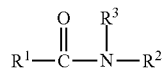

wherein $R^1$ represents an alkyl group or an aryl group; and $R^2$ and $R^3$ independently represent each a hydrogen atom, an alkyl group or an aryl group;

formula (19):

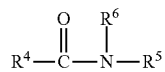

wherein $R^4$, $R^5$ and $R^6$ independently represent each an alkyl group or an aryl group.

(8) An optical compensation polarizing plate as described in any of the above (1) to (7), wherein the transparent protective film contains at least one compound lowering |Re(400)−Re(700)| and |Rth(400)−Rth(700)| in an amount of from 0.01 to 30% by mass based on the solid cellulose acylate content.

(9) An optical compensation polarizing plate as described in any of the above (1) to (8), wherein the transparent protective film has the slow axis in the transverse direction (TD) perpendicular to the machine direction (MD) of the film.

(10) An optical compensation polarizing plate as described in any of the above (1) to (9), wherein the transparent protective film has a contact angle of the alkali-saponified film surface of 55° or less.

(11) An optical compensation polarizing plate as described in any of the above (1) to (10), wherein the transparent protective film shows changes in Re and Rth each 15 nm or less after treating at 60° C. and 90% RH for 240 hours.

(12) An optical compensation polarizing plate as described in any of the above (1) to (11), wherein the transparent protective film shows changes in Re and Rth each 15 nm or less after treating at 80° C. for 240 hours.

(13) An optical compensation polarizing plate as described in any of the above (1) to (12), wherein the transparent protective film is a stretched film and the optical compensation layer is laminated after the stretching.

(14) An optical compensation polarizing plate as described in any of the above (1) to (12), wherein the transparent protective film is a stretched film which is stretched after the lamination of the optical compensation layer.

(15) An optical compensation polarizing plate as described in the above (13) or (14), wherein the retardation values in plane of the transparent protective film before and after the stretching fulfill the following formula (XI):

$$|Re(n)-Re(0)|/n \leq 1.0$$

wherein Re(n) is a retardation value in plane (expressed in nm) of the film stretched by n(%); and Re(0) is a retardation value in plane (expressed in nm) of the non-stretched film.

(16) An optical compensation polarizing plate as described in any of the above (1) to (15), wherein the transparent protective film comprises cellulose acetate having a degree of substitution by acyl group of from 2.70 to 3.00.

(17) An optical compensation polarizing plate as described in any of the above (1) to (15), wherein the transparent protective film comprises cellulose acylate fulfilling all of the following formulae (XII) to (XIV):

$$2.50 \leq SA+SB \leq 3.00 \quad \text{(XII)}$$

$$0.5 \leq SA \leq 2.5 \quad \text{(XIII)}$$

$$0.5 \leq SB \leq 3.00 \quad \text{(XIV)}$$

wherein SA is a degree of substitution by acetyl group; and SB is a degree of substitution by substituted acyl group having from 3 to 22 carbon atoms.

(18) An optical compensation polarizing plate as described in any of the above (1) to (17), wherein the optical compensation layer is an optical compensation layer wherein a rod-like or disk-like compound is oriented perpendicularly to the transparent protective film face.

(19) An optical compensation polarizing plate as described in any of the above (1) to (17), wherein the optical compensation layer contains a polymer having a positive intrinsic double refraction value selected from among polyamide, polyimide, polyester, polyether ketone, polyamide imide and polyester imide.

(20) An optical compensation polarizing plate as described in any of the above (1) to (17), wherein the optical compensation layer contains a polymer having a negative intrinsic double refraction value.

(21) An optical compensation polarizing plate as described in any of the above (1) to (20), wherein the transparent protective film is bonded to the optical compensation layer via an adhesive layer or a pressure-sensitive adhesive layer.

(22) An optical compensation polarizing plate as described in any of the above (1) to (21), which has at least one layer selected from among a hard coat layer, an antiglare layer and an antireflective layer.

(23) An image display unit wherein an optical compensation polarizing plate as described in any of the above (1) to (22) is employed.

(24) A liquid crystal display unit having an image display unit of the IPS mode, wherein an optical compensation polarizing plate as described in any of the above (1) to (22) is provided in a cell substrate in the viewing side, a polarizing plate having a transparent protective film as described in any of the above (1) to (17) laminated on at least one face of a polarizer is provided in a cell substrate in the side opposite to the viewing side, and the major axis direction of liquid crystal molecules in the liquid crystal cell is in parallel with the absorption axis direction of the polarizing plate under no voltage application.

(25) A liquid crystal display unit having an image display unit of the IPS mode; wherein a polarizing plate having a transparent protective film as described in any of the above (1) to (17) laminated on at least one face of a polarizer is provided in a cell substrate in the viewing side, an optical compensation polarizing plate as described in any of the above (1) to (22) is provided in a cell substrate in the side opposite to the viewing side, and the major axis direction of liquid crystal molecules in the liquid crystal cell is in perpendicular to the absorption axis direction of the polarizing plate under no voltage application.

In the optical compensation polarizing plate according to the invention as described above, light leakage in a direction deviating from the normal line can be compensated by the specific optical compensation layer in the case of locating the liquid crystal cell and the polarizing plate under cross Nicols. In particular, the optical compensation polarizing plate according to the invention has a function of compensating a lowering in the contrast from an angle in the liquid crystal layer of a liquid crystal display unit of the IPS mode. The optical compensation layer has an Nz value as described above of form 0.4 to 0.6 and an in-plane phase contrast (Re1) of from 100 to 350 nm. From the viewpoint of the compensation function, the Nz value is preferably 0.45 or more, still preferably 0.48 or more. On the other hand, it is also preferable that the Nz value is 0.55 or less, still preferably 0.52 or less. From the viewpoint of the compensation function, the in-plane phase retardation Re1 is 230 nm or more, still preferably 250 inn or more.

At least one of the transparent protective films laminated on the both faces of the polarizer in the optical compensation polarizing plate according to the invention is a cellulose acylate film having a small optical anisotropy (Re, Rth), i.e., $|Re| \leq 10$ and $|Rth| \leq 25$, preferably $|Re| \leq 5$ and $|Rth| \leq 10$ and still preferably $|Re|$ and $|Rth| \leq 5$. By laminating the optical compensation layer having a specific double refractive index on the cellulose acylate film having a small optical anisotropy, the optical compensation function of the optical compensation layer can be effectively expressed.

It is preferable that the transparent protective film to be used in the invention has a small scattering in the optical anisotropy in plane. It is particularly desirable that $|Re(MAX)-Re(MIN)| \leq 6$ and $|Rth(MAX)-Rth(MIN)| \leq 10$, still preferably $|Re(MAX)-Re(MIN)| \leq 3$ and $|Rth(MAX)-Rth(MIN)| \leq 5$.

[In the above formulae, Re(MAX) and Rth(MAX) are the maximum retardation values (expressed in mm) of an arbitrary cut out film piece of 1 m square; and Re(MIN) and Rth(MIN) are the minimum retardation values (expressed in inn) thereof.

By regulating the optical anisotropy in plane of the transparent protective film, the optical anisotropy of the optical compensation polarizing plate constructed by using it can be also regulated. In its turn, it is possible to achieve an effect of lessening display irregularity of a liquid crystal panel with the use of the same.

The film having small Re and Rth (i.e., an optical isotropic film) to be used in the invention shows a small Re in a stretched state and can sustain in-plane scattering at a low level even though various transport tensions occur during the production. Thus, it shows a small scattering in the optical anisotropy in the film plane.

In the invention, it is also desirable to use a cellulose acylate film having a small wavelength scattering. It is preferable that $|Re_{(400)}-Re_{(700)}| \leq 10$ and $|Rth_{(400)}-Rth_{(700)}| \leq 35$, still preferably $|Re_{(400)}-Re_{(700)}| \leq 5$ and $|Rth_{(400)}-Rth_{(700)}| \leq 25$ and particularly preferably $|Re_{(400)}-Re_{(100)}| \leq 3$ and $|Rth_{(400)}-Rth_{(700)}| \leq 15$.

It is preferable that the transparent protective film as described above is a stretched film. The stretching may be carried out either by monoaxial stretching or biaxial stretching. A biaxially stretched film is particularly preferred.

In general, the strength of a film material can be elevated by stretching to give mechanical properties with an improved toughness. However, many materials suffer from the generation of phase contrast by stretching. Such films cannot be used as a protective film for a polarizer.

On the other hand, the transparent protective film in the invention is a cellulose acylate film which suffers from little change in optical characteristics by stretching or by a dimensional change due to a stress after bonding. Thus, this film is appropriately usable as a protective film for a polarizer. It is preferable that $|Re(n)-Re(0)|/n \leq 1.0$, still preferably $|Re(n)-Re(0)|/n \leq 0.5$.

In the above formulae, Re(n) is a retardation value in plane (expressed in nm) of the film stretched by n(%); and Re(0) is a retardation value in plane (expressed in nm) of the non-stretched film.

It is also preferable that the film thickness of the transparent protective film in the invention is from 10 to 120 μm, still preferably from 40 to 100 μm and particularly preferably from 60 to 80 μm.

Concerning change in the optical performance of the transparent protective film in the invention depending on environmental change, it is preferable that changes in Re and Rth are each 15 nm or less, still preferably 10 nm or less and still preferably 5 nm or less, after treating at 60° C. and 90% RH for 240 hours. It is also preferable that the transparent protective film shows changes in Re and Rth each 15 nm or less, still preferably 5 mm or less, after treating at 80° C. for 240 hours.

By regulating the optical anisotropy and scattering of the transparent protective film for the polarizer as described above, it becomes possible to easily design the optical compensation layer to be laminated thereon and give an optical compensation polarizing plate having a high compensation effect.

Although the thickness of the optical compensation layer is not particularly restricted in the invention, it usually ranges from about 2 to 200 μm, preferably from 10 to 100 μm.

The invention further relates to an image display unit with the use of the above-described optical compensation polarizing plate.

As the image display unit according to the invention, a liquid crystal display unit of the IPS mode is suitable. By providing the optical compensation layer according to the invention as described above on the surface of one of liquid crystal cells of the IPS mode, light leakage occurring in black display in existing liquid crystal display units of the IPS mode can be lessened. This liquid crystal display unit of the IPS mode has a high contrast ratio in all directions, thereby establishing easily viewable display with a wide viewing angle.

Now, a preferable embodiment of the liquid crystal display unit of the IPS mode with the use of the optical compensation polarizing plate according to the invention will be illustrated.

(1) A liquid crystal display unit, wherein the optical compensation polarizing plate according to the invention is provided in a cell substrate in the viewing side, a polarizing plate having the above-described transparent protective film with $|Re| \leq 10$ and $|Rth| \leq 25$ laminated on at least one face of a polarizer is provided in a cell substrate in the side opposite to the viewing side, and the extraordinary refractive index direction of a liquid crystal material in the liquid crystal cell is in parallel with the absorption axis direction of the polarizing plate under no voltage application.

(2) A liquid crystal display unit, wherein a polarizing plate having the above-described transparent protective film with $|Re| \leq 10$ and $|Rth| \leq 25$ laminated on at least one face of a polarizer is provided in a cell substrate in the viewing side, the optical compensation polarizing plate according to the invention is provided in a cell substrate in the side opposite to the viewing side, and the extraordinary refractive index direction of a liquid crystal material in the liquid crystal cell is in perpendicular to the absorption axis direction of the polarizing plate under no voltage application.

By employing the transparent protective film to be used in the optical compensation polarizing plate according to the invention as at least one of two transparent protective films of the polarizing plate provided in the face of the liquid crystal cell opposite to the optical compensation polarizing plate according to the invention, it is possible to establish easily viewable display which has a higher contrast ratio in all directions and a wide viewing angle.

Application of the optical compensation polarizing plate according to the invention to an image display unit, in particular a liquid crystal display unit, makes it possible to improve display contrast and viewing angle characteristics without lowering the frontal contrast provide favorable image characteristics, thereby giving image characteristics with a wide viewing angle and a high contrast. The optical compensation polarizing plate according to the invention is appropriately usable in a liquid crystal display unit operating in the IPS mode. Moreover, the optical compensation polarizing plate according to the invention suffers from little degradation in the optical performance at a high temperature and a high humidity.

BEST MODE FOR CARRYING OUT THE INVENTION

Now, the optical compensation polarizing plate and image display unit according to the invention will be illustrated. The optical compensation polarizing plate according to the invention is an optical compensation polarizing plate constructed by laminating transparent protective films on both faces of a polarizer to give a polarizing plate and further laminating an optical compensation layer on one face thereof, wherein at least one of the transparent protective films is a cellulose acylate film the retardation value in plane Re (expressed in nm) and the retardation value in the film thickness direction Rth (expressed in inn) of which fulfill the following formulae (I) and (II) (hereinafter referred to as "the cellulose acylate film according to the invention"), and the Nz and $Re_1$, respectively defined by the following formulae (III) and (IV), of the optical compensation layer fulfill the following formulae (V) and (VI):

$$|Re| \leq 10 \quad \text{(I)}$$

$$|Rth| \leq 25 \quad \text{(II)}$$

$$Nz=(nx_1-nz_1)/(nx_1-ny_1) \quad \text{(III)}$$

$$Re_1=(nx_1-ny_1) \times d_1 \quad \text{(IV)}$$

$$0.45 \leq Nz \leq 0.6 \quad \text{(V)}$$

$$100 \leq Re_1 \leq 350 \quad \text{(VI)}$$

wherein $Re_1$ is a retardation value in plane (expressed in nm) at the wavelength of 590 nm; Nz is an Nz factor at the wavelength of 590 nm; $nx_1$ is a refractive index along the slow axis in the film plane; $ny_1$ is a refractive index along the direction perpendicular to the slow axis in the film plane; $nz_1$ is a refractive index along the thickness direction of the film; and $d_1$ is the thickness of the film (expressed in nm).

Moreover, lamination is made so that the absorption axis of the polarizer, the slow axis of the optical compensation layer and the slow axis of the transparent protective film are in perpendicular to each other or in parallel. It is preferable to arrange the absorption axis of the polarizer in parallel with the slow axis of the optical compensation layer from the viewpoint of the continuous roll-bonding procedure in the lamination step.

Next, the cellulose acylate film according to the invention will be illustrated in detail.

[Starting Cotton Material for Synthesizing Cellulose Acylate]

Examples of the starting cellulose to be used for synthesizing the cellulose acylate in the invention include cotton linter and wood pulp (hardwood pulp and softwood pulp). Use can be made of cellulose acylate obtained from any cellulose material and a mixture is also usable in some cases. These starting cotton materials are described in detail in, for example, *Purasuchikku Zairyo Koza* (17), *Senisokei Jushi* (Marusawa and Uda, The Nikkan Kogyo Shinbun, Ltd., 1970) and Japan Institute of Invention and Innovation Journal of Technical Disclosure No. 2001-1745, p. 7 to 8. Namely, use may be made of cellulose materials reported therein and the material of the cellulose acylate film of the invention is not particularly restricted.

Now, the cellulose acylate film according to the invention produced starting with the cellulose material as described above will be illustrated. In the cellulose acylate according to the invention, hydroxyl groups in cellulose have been acylated. As the substituents, use may be made of acetyl groups having from 2 to 22 carbon atoms. In the cellulose acylate according to the invention, the degree of substitution of hydroxyl groups in the cellulose is not particularly restricted. The substitution degree can be determined by measuring the degree of binding of acetic acid or fatty acids having form 3 to 22 carbon atoms substituting hydroxyl groups in cellulose and calculating. The measurement can be carried out in accordance with ASTM D-8,7-91.

As described above, the degree of substitution of hydroxyl groups in the cellulose is not particularly restricted in the cellulose acylate according to the invention. It is preferable that the degree of substitution of hydroxyl group by acyl group is from 2.70 to 3.00, still preferably from 2.85 to 3.00 and still preferably from 2.90 to 3.00.

The acyl group substituting hydroxyl group may be an aliphatic group having from 2 to 22 carbon atoms or an allyl group. Use may be made of, for example, alkylcarbonyl esters, alkenylcarbonyl esters, aromatic carbonyl esters and aromatic alkylcarbonyl esters of cellulose each optionally having additional substituents. Preferable examples of the acyl group include acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl and cinnamoyl groups. Among them, acetyl, propionyl, butanoyl, dodecanoyl, octadecanoyl, t-butanoyl, oleoyl, benzoyl, naphthylcarbonyl cinnamoyl groups are preferable, and acetyl, propionyl and butanoyl groups are still preferable.

It is also preferable to use a cellulose acylate mixture and a cellulose acylate fulfilling all of the requirements as specified by the following formulae (XII) to (XIV) is particularly preferable.

$$2.50 \leq SA+SB \leq 3.00 \quad \text{Formula (XII)}$$

$$0 \leq SA \leq 2.5 \quad \text{Formula (XIII)}$$

$$0.5 \leq SB \leq 3.00 \quad \text{Formula (XIV)}$$

In the above formulae, SA is a degree of substitution by acetyl group; and SB is a degree of substitution by substituted acyl group having from 3 to 22 carbon atoms.

The term "degree of substitution by acetyl group" as used herein means the sum of acylation ratios at the 2-, 3- and 6-positions of cellulose (i.e., degree of substitution of 1 indicating 100% acylation). In the invention, it is preferable that $2.60 \leq SA+SB \leq 3.00$, still preferably $2.67 \leq SA+SB \leq 2.97$. Concerning SA, it is also preferable that $0 \leq SA \leq 2.20$, still preferably $0 \leq SA \leq 2.0$. Concerning SB, it is also preferable that $0.80 \leq SB \leq 2.97$, still preferably $1.25 \leq SB \leq 2.97$. Although the degrees of substitution of hydroxyl groups at the 2-, 3- and 6-positions of cellulose are not particularly restricted in the invention, The degree of substitution of hydroxyl group at the 6-position is preferably 0.7 or more, still preferably 0.8 or more and still preferably 0.85 or more. Owing to the constitution, not only the degradation of the cellulose acylate caused by electron beam irradiation can be prevented but also the solubility and the moisture- and heat-resistances thereof can be improved.

The acyl group having from 3 to 22 carbon atoms represented by the substituent SB in the cellulose acylate according to the invention may be either an aliphatic acyl group or an aromatic acyl group. In the case where the acyl group in the cellulose acylate according to the invention is an aliphatic acyl group, it preferably has from 3 to 18 carbon atoms, still preferably from 3 to 12 carbon atoms and still preferably from 3 to 8 carbon atoms. Examples of such aliphatic acyl groups include alkylcarbonyl groups, alkenylcarbonyl groups and alkynylcarbonyl groups. In the case where the acyl group in the cellulose acylate according to the invention is an aromatic acyl group, it preferably has from 6 to 22 carbon atoms, still preferably from 6 to 18 carbon atoms and still preferably from 6 to 12 carbon atoms.

Preferable examples of the cellulose acylate according to the invention include cellulose acetate, cellulose propionate, cellulose butyrate, cellulose acetate propionate, cellulose acetate butyrate, cellulose propanoate butyrate, cellulose acetate propionate butyrate, cellulose acetate hexanoate, cellulose acetate octanoate, cellulose acetate cyclohexanoate, cellulose acetate decanoate, cellulose acetate adamantane carboxylate, cellulose acetate sulfate, cellulose acetate carbamate, cellulose propionate sulfate, cellulose acetate propionate sulfate, cellulose acetate phthalate and so on. Still preferable examples thereof include cellulose acetate, cellulose propionate, cellulose butyrate, cellulose acetate propionate, cellulose acetate butyrate, cellulose propanoate butyrate, cellulose acetate hexanoate, cellulose acetate octanoate and so on. Still preferable examples thereof include cellulose acetate, cellulose propionate, cellulose butyrate, cellulose acetate propionate and cellulose acetate butyrate. In such a case, the degrees of substitution by acetyl group and an acyl group having 3 or more carbon atoms respectively fall within the ranges as defined above. Desired characteristics can be obtained depending on the substitution degrees.

[Degree of Polymerization of Cellulose Acylate]

The degree of polymerization (expressed in viscosity-average degree of polymerization) of the cellulose acylate according to the invention ranges preferably from 180 to 700. In cellulose acetate, the degree of polymerization preferably ranges from 180 to 550, still preferably from 180 to 400 and particularly preferably from 180 to 350. In the case where the degree of polymerization is too high, a dope solution of the cellulose acylate has a high viscosity and, in its turn, a film can be hardly formed by casting. An average degree of polymerization can be measured by the limiting viscosity method (Kazuo Uda & Hideo Saito, *SEN-I* GAKKAISHI, Vol. 18, No. 1, p. 105-120, 1962). This method is reported in greater detail in JP-A-9-95538.

The molecular weight distribution of the cellulose acylate according to the invention is evaluated by gel permeation chromatography. A smaller polydispersity index Mw/Mn (Mw: mass-average molecular weight, Mn: number-average molecular weight) and a narrower molecular weight distribution are preferred. More specifically speaking, Mw/Mn preferably ranges from 1.0 to 3.0, still preferably form 1.0 to 2.0 and most desirably form 1.0 to 1.6.

When low-molecular weight components are removed, the average molecular weight (degree of polymerization) is elevated but the viscosity becomes lower than common cellulose acylates, thereby becoming useful. Cellulose acylate containing less low-molecular weight components can be obtained by removing the low-molecular weight components from cellulose acylate synthesized by a conventional method. The low-molecular weight components can be removed by washing cellulose acylate with an appropriate organic solvent. In the case of producing cellulose acylate containing less low-molecular weight components, it is preferable to control the amount of the sulfuric acid catalyst in the acetylation to 0.5 to 25 parts by mass per 100 parts by mass of cellulose acylate. By controlling the amount of the sulfuric acid catalyst within the range as described above, it is possible to synthesize cellulose acylate favorable from the viewpoint of molecular weight distribution (i.e., having a uniform of molecular weight distribution). In using the production of cellulose acylate according to the invention, the water content ratio is preferably 2% by mass or less, still preferably 1% by mass or less and particularly preferably 0.7% by mass or less. In general, cellulose acylate contains water and it is known that the water content ratio thereof ranges from 2.5 to 5% by mass. To regulate to this water content ratio of cellulose acylate in the invention, it is required to dry the cellulose acylate. The drying method is not particularly restricted, so long as the desired water content ratio can be established thereby. As the starting cotton material and the synthesis method to be used for obtaining the cellulose acylate, use can be made of the starting cotton material and the synthesis method described in detail in Japan Institute of Invention and Innovation Journal of Technical Disclosure No. 2001-1745 (2001 Mar. 15, Japan Institute of Invention and Innovation), p. 7 to 12.

As the cellulose acylate according to the invention, use can be also made of a mixture of two or more cellulose acylates so long as these cellulose acylates fulfill the requirements in substituent, degree of substitution, degree of polymerization, molecular weight distribution and so on as described above.

[Additives to Cellulose Acylate]

To a cellulose acylate solution (dope solution) according to the invention, it is possible to add various additives (for example, a compound lowering optical anisotropy, a wavelength dispersion regulator, a UV-blocking agent, a plasticizer, an antidegradant, fine particles, an optical characteristic-controlling agent, etc.) depending on purpose in individual steps of the production. Now, these additives will be illustrated. These additives may be added in the step of preparing the dope. Alternatively, a step of adding the additives may be provided in the final step of preparing the dope.

It is preferable that the cellulose acylate film according to the invention contains at least one compound lowering the optical anisotropy, in particular, the retardation value in the film thickness direction Rth within a range fulfilling the following formulae (IX) and (X):

$$(Rth(A)-Rth(0))/A \leq 1.0 \quad \text{(IX)}$$

$$0.1 \leq A \leq 30 \quad \text{(X)}$$

It is preferable that the above formulae (IX) and (X) are:

$$(Rth(A)-Rth(0))/A \leq 2.0 \quad \text{(IX)}$$

$$0.05 \leq A \leq 25 \quad \text{(X)}$$

It is preferable that the above formulae (IX) and (X) are:

$$(Rth(A)-Rth(0))/A \leq -3.0 \quad \text{(IX)}$$

$$0.1 \leq A \leq 20 \quad \text{(X)}$$

In the above formulae, Rth(A) is Rth (nm) of a film containing A % of the compound lowering Rth; Rth(0) is Rth (nm) of a film containing no compound lowering Rth; and A is the mass (%) of the compound referring the mass of the polymer employed as the film material as to 100.

[Structural Characteristic of Compound Lowering Optical Anisotropy of Cellulose Acylate Film]

Now, the compound lowering optical anisotropy of cellulose acylate film will be illustrated.

As the results of intensive studies, the inventors sufficiently lowered the optical anisotropy by using a compound inhibiting the orientation of cellulose acylate in a film in plane and in the film thickness direction, thereby reducing Re to zero and Rth close to zero. For this purpose, it is advantageous to employ a compound lowering optical anisotropy which is sufficiently compatible with cellulose acylate and has neither a rod-like structure nor a planar structure by itself. In the case of having a plural number of planar functional groups such as aromatic groups, more specifically speaking, a nonplanar structure having these functional groups not on a single plane is advantageous.

As examples of the compound lowering optical anisotropy of cellulose acylate film, compounds represented by the following formulae (1) to (19) may be cited.

Formula (1):

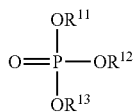

In the above formula, $R^{11}$ to $R^{13}$ independently represent each an aliphatic group having from 1 to 20 carbon atoms. $R^{11}$ to $R^{13}$ may be bonded together to form a ring.

Formula (2):

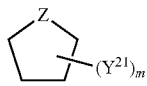

Formula (3):

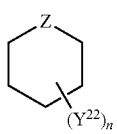

In the formulae (2) and (3), Z represents a carbon atom, an oxygen atom, a sulfur atom or —$NR^{25}$— wherein $R^{25}$ represents a hydrogen atom or an alkyl group. The 5- or 6-membered ring containing Z may have a substituent. $Y^{21}$ and $Y^{22}$ independently represent each an ester group, an alkoxycarbonyl group, an amide group or a carbamoyl group having from 1 to 20 carbon atoms. $Y^{21}$ and $Y^{22}$ may be bonded together to form a ring. m is an integer of from 1 to 5, while a is an integer of from 1 to 6.

(4)

$Y^{31}-L^{31}-Y^{32}$ (5)

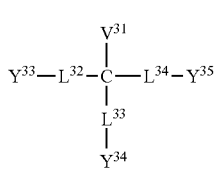

(6)

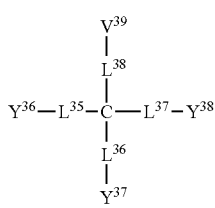

(7)

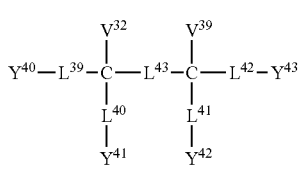

(8)

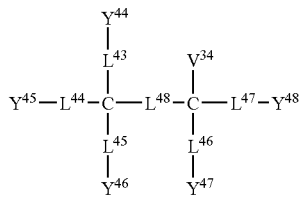

(9)

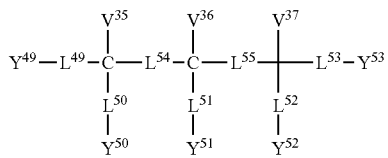

(10)

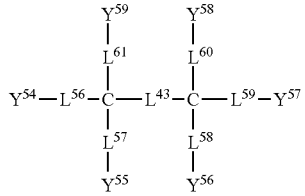

(11)

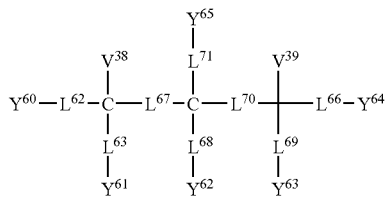

(12)

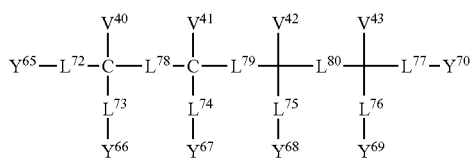

In the formulae (4) to (12), $Y^{31}$ to $Y^{70}$ independently represent each an ester group having from 1 to 20 carbon atoms, an alkoxy carbonyl group having from 1 to 20 carbon atoms, an amido group having from 1 to 20 carbon atoms, a carbamoyl group having from 1 to 20 carbon atoms or a hydroxy group. $V^{31}$ to $V^{43}$ independently represent each a hydrogen atom or an aliphatic group having from 1 to 20 carbon atoms. $L^{31}$ to $L^{80}$ independently represent each a divalent saturated linking group having from 0 to 40 atoms including from 0 to 20 carbon atoms.

$L^{31}$ to $L^{80}$ having 0 atom means that groups located at both ends of the linking group directly form a single bond. $V^{31}$ to $V^{43}$ and $L^{31}$ to $L^{80}$ may further have a substituent.

Formula (13):

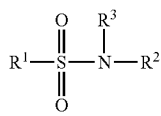

In the above formula, $R^1$ represents an alkyl group or an aryl group. $R^2$ and $R^3$ independently represent each a hydrogen atom, an allyl group or an aryl group. $R^1$, $R^2$ and $R^3$ have 10 or more carbon atoms in total and each of these groups may have a substituent.

Formula (14):

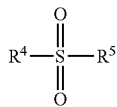

In the above formula, $R^4$ and $R^5$ independently represent each an alkyl group or an aryl group. $R^4$ and $R^5$ have 10 or more carbon atoms in total and each of these groups may have a substituent.

Formula (15):

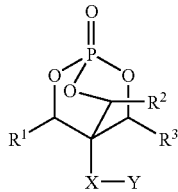

In the above formula, $R^1$, $R^2$ and $R^3$ independently represent each a hydrogen atom or an alkyl group. X represents a divalent linking group formed by one or more groups selected from the following group 1 of linking groups. Y represents an alkyl group, an aryl group or an aralkyl group.

(Group 1 of linking groups) single bond, —O—, —CO—, —NR$^4$—, alkylene groups and arylene groups, wherein $R^4$ represents a hydrogen atom, an alkyl group, an aryl group or an aralkyl group.

Formula (16):

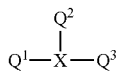

In the above formula, $Q^1$, $Q^2$ and $Q^3$ independently represent each a 5- or 6-membered ring. X represents B, C—R (wherein R represents a hydrogen atom or a substituent.), N, P or P=O.

Formula (17):

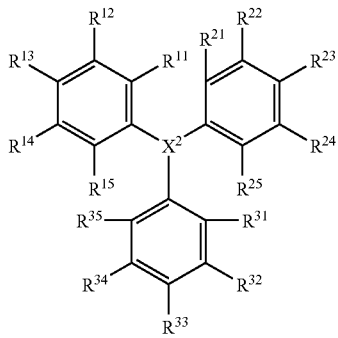

In the above formula, $X^2$ represents B, C—R (wherein R represents a hydrogen atom or a substituent) or N. $R^{11}$, $R^{12}$, $R^{13}$, $R^{14}$, $R^{15}$, $R^{21}$, $R^{23}$, $R^{24}$, $R^{25}$, $R^{31}$, $R^{32}$, $R^{33}$, $R^{34}$ and $R^{35}$ represent each a hydrogen atom or a substituent.

Formula (18):

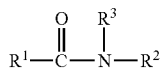

In the above formula, $R^1$ represents an alkyl group or an aryl group. $R^2$ and $R^3$ independently represent each a hydrogen atom, an alkyl group or an aryl group. The alkyl group and aryl group may have a substituent.

Preferable examples of the compounds represented by the formula (18) are compounds represented by the formula. (19).

Formula (19):

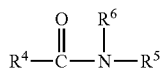

In the above formula (19), $R^4$, $R^5$ and $R^6$ independently represent each an alkyl group or an aryl group. The alkyl group may be a chain type, branched or cyclic alkyl group. The alkyl group preferably has from 1 to 15, still preferably from 1 to 15 and most desirably form 1 to 12, carbon atoms. As a cyclic alkyl group, a cyclohexyl group is particularly preferred. An aryl group preferably has from 6 to 36, still preferably from 6 to 24, carbon atoms.

The above-described alkyl group and aryl group may further have a substituent. Preferable examples of the substituent include halogen atoms (for example, chlorine, bromine, fluorine and iodine), alkyl groups, aryl groups, alkoxy groups, aryloxy groups, acyl groups, alkoxycarbonyl groups, aryloxycarbonyl groups, acyloxy groups, sulfonylamino groups, hydroxy group, cyano group, amino group and acylamino groups. Still preferable examples thereof include halogen atoms, alkyl groups, aryl groups, alkoxy groups, aryloxy groups, sulfonylamino groups and acylamino groups. Particularly preferable examples thereof include alkyl groups, aryl groups, sulfonylamino groups and acylamino groups.

Among the compounds cited above, the compounds represented by the formulae (13), (18) and (19) are preferred. It is preferable to employ at least one compound from among them.

(LogP Value)

To produce the cellulose acylate film according to the invention, it is preferable to employ, from among the compounds which prevent cellulose acylate in the film from orientation in-plane and in the film thickness direction to thereby lower optical anisotropy, a compound having an octanol-water partition coefficient (logP value) of from 0 to 7. A compound having a logP value exceeding 7 has a poor compatibility with cellulose acylate and thus frequently results in clouding or blooming of the film. A compound having a logP value less than 0 has highly hydrophilic nature which sometimes worsens the water resistance of the cellulose acylate film. It is still preferable that the logP value ranges from 1 to 6, particularly preferably from 1.5 to 5.

The octanol-water partition coefficient (logP value) can be measured by the flask shaking method in accordance with JIS Z7260-107 (2000). It is also possible to estimate the octanol-water partition coefficient (logP value) by using not practical measurement but a computational or empirical method. As the computational method, use may be preferably made of Crippen's fragmentation method (J. Chem. Inf. Comput. Sci., 27, 21 (1987)), Viswanadhan's fragmentation method (J.

Chem. Inf. Comput. Sci., 29, 163 (1989)), Broto's fragmentation method (Eur. J. Med. Chem.-Chim. Theor., 19, 71 (1984)) and so on. It is still preferable to employ Crippen's fragmentation method (J. Chem. Inf. Comput. Sci., 27, 21 (1987)). In the case where the logP value of a compound determined by the measurement method differs from its calculated value, it is favorable to judge whether or not the compound falls within the desired range with the use of Crippen's fragmentation method.

[Physical Properties of Compound Lowering Optical Anisotropy]

The compound lowering optical anisotropy may either contain an aromatic group or not. It is preferable that the compound lowering optical anisotropy has a molecular weight of 150 or more but not more than 3000, still preferably 170 or more but not more than 2000 and still preferably 200 or more but not more than 1000. So long as the molecular weight falls within this range, the compound may have either a specific monomer structure or an oligomer or polymer structure composed of a plural number of the monomer units bonded together.

It is preferable that the compound lowering optical anisotropy is a liquid at 25° C. or a solid having a melting point of from 25 to 250° C. A compound which is a liquid at 25° C. or a solid having a melting point of from 25 to 200° C. is still preferred. It is also preferable that the compound lowering optical anisotropy would not vaporize in the course of dope casting and drying in constructing the cellulose acylate film.

The compound lowering optical anisotropy is added preferably in an amount of from 0.01 to 30% by mass, still preferably from 1 to 25% by mass and particularly preferably from 5 to 20% by mass based on the solid cellulose acylate content.

A single compound may be used as the compound lowering optical anisotropy. Alternatively, use can be made of a mixture of two or more compounds at an arbitrary ratio.

The compound lowering optical anisotropy may be added at any step in preparing a dope. It may be added at the final step of the dope preparation.

The average content of the compound lowering optical anisotropy from the surface in at least one side to the part corresponding to 10% of the total film thickness amounts to 80 to 99% of the average content of the compound at the center of the cellulose acylate film. The content of the compound may be determined by quantifying the compound on the surface and at the center by, for example, an infrared spectrometry method described in JP-A-8-57879.

Now, specific examples of the compound lowering optical anisotropy of the cellulose acylate film to be used in the invention will be illustrated, though the invention is not restricted to these compounds.

First, compounds of the formula (1) will be described.

In the formula (1), $R^{11}$ to $R^{13}$ independently represent each an aliphatic group having from 1 to 20 carbon atoms. $R^{11}$ to $R^{13}$ may be bonded together to form a ring.

Now, $R^{11}$ to $R^{13}$ will be illustrated in greater detail. $R^{11}$ to $R^{13}$ independently represent each an aliphatic group having from 1 to 20, preferably from 1 to 16 and still preferably from 1 to 12, carbon atoms. The term "aliphatic group" as used herein preferably means an aliphatic hydrocarbon group, still preferably an alkyl group (including chain type, branched and cyclic alkyl groups), an alkenyl group or an alkynyl group. Examples of the alkyl group include methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamancyl, bicyclo[2.2.2]octan-3-yl and so on. Examples of the alkenyl group include vinyl, allyl, prenyl, geranyl, oleyl, 2-cyclopenten-1-yl, 2-cyclohexen-1-yl and so on. Examples of the alkynyl group include ethynyl and propargyl and so on.

The aliphatic groups represented by $R^{11}$ to $R^{13}$ may be substituted. Examples of the substituent include halogen atoms (for example, chlorine, bromine, fluorine and iodine), alkyl groups (including chain type, branched and cyclic alkyl groups, bicycloalkyl groups and active methine group), alkenyl groups, alkynyl groups, aryl groups, heterocyclic groups (at any substitution site), acyl groups, alkoxycarbonyl groups, aryloxycarbonyl groups, heterocyclic oxycarbonyl groups, carbamoyl groups, N-acylcarbamoyl groups, N-sulfonylcarbamoyl groups, N-carbamoylcarbamoyl groups, N-sulfamoylcarbamoyl groups, carbazole group, carboxy group or its salt, oxalyl group, oxamoyl group, cyano group, carbonimidoyl group), formyl group, hydroxy group, alkoxy groups (including ethyleneoxy group or propyleneoxy group repeating units), aryloxy groups, heterocyclicoxy groups, acyloxy groups, (alkoxy or aryloxy) carbonyloxy groups, carbamoyloxy group, sulfonyloxy group, amino group, (alkyl, aryl or heterocyclic) amino groups, acylamino groups, sulfonamido group, ureido groups, thioureido groups, imido group, (alkoxy or aryloxy) carbonylamino groups, sulfamoylamino group, semicarbazide group, ammonia group, oxamoylamino group, N-(alkyl or aryl) sulfonylureido groups, N-acylureido groups, N-acylsulfamoyl groups, heterocyclic groups having quaternized nitrogen atom (for example, pyridinio group, imidazolio group, quinolynio group and isoquinolinio group), isocyano group, imino group, (alkyl or aryl) sulfonyl groups, (alkyl or aryl) sulfinyl groups, sulfo group or its salts, sulfamoyl groups, N-acylsulfamoyl groups, N-slufonylsulfamoyl groups or its salts, phosphino group, phosphinyl group, phosphinyloxy group, phosphinylamino group, silyl group and so on.

Moreover, these groups may be combined together to from a composite substituent. Examples of such substituents include ethoxyethoxyethyl group, hydroxyethoxyethyl group, ethoxycarbonylethyl group and so on. $R^{11}$ TO $R^{13}$ may further have phosphate group as a substituent. The compounds of formula (1) may have a plural number of phosphate groups per molecule.

Next, the compounds of the formulae (2) and (3) will be described. In the formulae (2) and (3), Z represents a carbon atom, an oxygen atom, a sulfur atom or —$NR^{25}$ wherein $R^{25}$ represents a hydrogen atom or an alkyl group. The 5- or 6-membered ring having Z may have a substituent. A plural number of substituents may be bonded together to form a ring. Examples of the 5- or 6-membered ring having Z include tetrahydrofuran, tetrahydropyran, tetrahydrothiophene, thiane, piperidine, indoline, isoindoline, chroman, isochroman, tetrahydro-2-furanone, tetrahydro-2-pyrone, 4-butane lactam, 6-hexanolactam and so on.

The 5- or 6-membered ring having Z includes a lactone structure or a lactam structure, i.e., a cyclic ester or cyclic amide structure having an oxo group at the carbon atom adjacent to Z. Examples of such cyclic ester or cyclic amide structure include 2-pyrrolidone, 2-piperidone, 5-pentanolide and 6-hexanolide.

$R^{25}$ represents a hydrogen atom or an alkyl group (including chain type, branched and cyclic alkyl groups) preferably having from 1 to 20 carbon atoms, still preferably from 1 to 16 carbon atoms and particularly preferably form 1 to 12 carbon atoms. Examples of the alkyl group represented by $R^{25}$ include methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamancyl, bicyclo[2.2.2]octan-3-yl and so on. The alkyl group represented by $R^{25}$ may be substituted. As examples of the substituent, those described above as examples of substituents of $R^{11}$ to $R^{13}$ may be cited.

$Y^{21}$ and $Y^{22}$ independently represent each an ester group, an alkoxycarbonyl group, an amido group or a carbamoyl group. The ester group preferably has from 1 to 20 carbon atoms, still preferably from 1 to 16 carbon atoms and particularly preferably from 1 to 12 carbon atoms. Examples thereof include acetoxy, ethylcarbonyloxy, propylcarbonyloxy, n-butylcarbonyloxy, iso-butylcarbonyloxy, t-butyl carbonyl oxy, sec-butylcarbonyloxy, n-pentylcarbonyloxy, t-amylcarbonyloxy, n-hexylcarbonyloxy, cyclohexylcarbonyloxy, 1-ethylpentylcarbonyloxy, n-heptylcarbonyloxy, n-nonylcarbonyloxy, n-undecylcarbonyloxy, benzylcarbonyloxy, 1-naphthalenecarbonyloxy, 2-naphthalenecarbonyloxy, 1-adamantancarbonyloxy and so on. The alkoxycarbonyl group preferably has from 1 to 20 carbon atoms, still preferably from 1 to 16 carbon atoms and particularly preferably from 1 to 12 carbon atoms. Examples thereof include methoxycarbonyl, ethoxycarbonyl, n-propyloxycarbonyl, isopropyloxycarbonyl, n-butoxycarbonyl, t-butoxycarbonyl, iso-butoxycarbonyl, sec-butoxycarbonyl, n-pentyloxycarbonyl, t-amyloxycarbonyl, n-hexyloxycarbonyl, cyclohexyloxycarbonyl, 2-ethylhexyloxycarbonyl, 1-ethylpropyloxycarbonyl, n-octyloxycarbonyl, 7-dimethyl-3-octyloxycarbonyl, 3,5,5-trimethyl hexyl oxycarbonyl, 4-t-butylcyclohexyloxycarbonyl, 2,4-dimethylpentyl-3-oxycarbonyl, 1-adamantaneoxycarbonyl, 2-adamantaneoxycarbonyl, dicyclopentadienyloxycarbonyl, n-decyloxycarbonyl, n-dodecyloxycarbonyl, n-tetradecyloxycarbonyl, n-hexadecyloxycarbonyl and so on. The amido group preferably has from 1 to 20 carbon atoms, still preferably from 1 to 16 carbon atoms and particularly preferably from 1 to 12 carbon atoms. Examples thereof include acetamido, ethylcarboxamido, n-propylcarboxamido, isopropylcarboxamido, n-butylcarboxamido, t-butylcarboxamido, iso-butylcarboxamido, sec-butylcarboxamido, n-peritylcarboxamido, t-amylcarboxamido, n-hexylcarboxamido, cyclohexylcarboxamido, 1-ethylpentylcarboxamido, 1-ethylpropylcarboxamido, n-heptylcarboxamido, n-octylcarboxamido, 1-adamantanecarboxamido, 2-adamantanecarboxamido, n-nonylcarboxamido, n-dodecylcarboxamido, n-pentanecarboxamido, n-hexadecylcarboxamido and so on. The carbamoyl groups preferably has from 1 to 20 carbon atoms, still preferably from 1 to 16 carbon atoms and particularly preferably from 1 to 12 carbon atoms. Examples thereof include methylcarbamoyl, dimethylcarbamoyl, ethylcarbamoyl, diethylcarbamoyl, n-propylcarbamoyl, isopropylcarbamoyl, n-butylcarbamoyl, t-butylcarbamoyl, iso-butylcarbamoyl, sec-butylcarbamoyl, n-pentylcarbamoyl, t-amylcarbamoyl, n-hexylcarbamoyl, cyclohexylcarbamoyl, 2-ethylhexylcarbamoyl, 2-ethylbutylcarbamoyl, t-octylcarbamoyl, n-heptylcarbamoyl, n-octylcarbamoyl, 1-adamantanecarbamoyl, 2-adamantanecarbamoyl, n-decylcarbamoyl, n-dodecylcarbamoyl, n-tetradecylcarbamoyl, n-hexadecylcarbamoyl and so on. $Y^{21}$ and $Y^{22}$ may be bonded together to form a ring. $Y^{21}$ and $Y^{22}$ may further have a substituent. As examples of the substituent, those described above as examples of substituents of $R^{11}$ to $R^{13}$ may be cited. m is from 1 to 5, preferably from 1 to 3. n is from 1 to 6, preferably from 1 to 3.

Next, the compounds of the formulae (4) to (12) will be described.

In the formulae (4) to (13), $Y^{31}$ to $Y^{70}$ independently represent each an ester group, an alkoxycarbonyl group, an amido group, a carbamoyl group or a hydroxy group. The ester group preferably has from 1 to 20 carbon atoms, still preferably from 1 to 16 carbon atoms and particularly preferably from 1 to 12 carbon atoms. Examples thereof include acetoxy, ethylcarbonyloxy, propylcarbonyloxy, n-butyl carbonyl oxy, iso-butylcarbonyloxy, t-butyl carbonyl oxy, sec-butylcarbonyloxy, n-pentylcarbonyloxy, t-amylcarbonyloxy, n-hexylcarbonyloxy, cyclohexylcarbonyloxy, 1-ethylpentylcarbonyloxy, n-heptylcarbonyloxy, n-nonylcarbonyloxy, n-undecylcarbonyloxy, benzylcarbonyloxy, 1-naphthalenecarbonyloxy, 2-naphthalenecarbonyloxy, 1-adamantanecarbonyloxy and so on. The alkoxycarbonyl group preferably has from 1 to 20 carbon atoms, still preferably from 1 to 16 carbon atoms and particularly preferably from 1 to 12 carbon atoms. Examples thereof include methoxy carbonyl, ethoxycarbonyl, n-propyloxycarbonyl, isopropyloxycarbonyl, n-butoxycarbonyl, t-butoxycarbonyl, iso-butoxycarbonyl, sec-butyloxycarbonyl, n-pentyloxycarbonyl, t-amyloxycarbonyl, n-hexyloxycarbonyl, cyclohexyloxycarbonyl, 2-ethylhexyloxycarbonyl, 1-ethylpropyloxycarbonyl, n-octyloxycarbonyl, 3,7-dimethyl-3-octyloxycarbonyl, 3,5,5-trimethylhexyloxycarbonyl, 4-t-butylcyclohexyloxycarbonyl, 2,4-dimethylpentyl-3-oxycarbonyl, 1-adamantaneoxycarbonyl, 2-adamantaneoxycarbonyl, dicyclopentadienyloxycarbonyl, n-decyloxycarbonyl, n-dodecyloxycarbonyl, n-tetradecyloxycarbonyl, n-hexadecyloxycarbonyl and so on. The amido group preferably has from 1 to 20 carbon atoms, still preferably from 1 to 16 carbon atoms and particularly preferably from 1 to 12 carbon atoms. Examples thereof include acetamido, ethylcarboxamido, n-propylcarboxamido, isopropylcarboxamido, n-butylcarboxamido, t-butylcarboxamido, iso-butylcarboxamdo, sec-butylcarboxamido, n-pentylcarboxamido, t-amylcarboxamido, n-hexylcarboxamido, cyclohexylcarboxamido, 1-ethylpentylcarboxamido, 1-ethylpropylcarboxamido, n-heptylcarboxamido, n-octylcarboxamido, 1-adamantanecarboxamido, 2-adamantanecarboxamido, n-nonylcarboxamido, n-dodecylcarboxamido, n-pentanecarboxamidn, n-hexadecylcarboxamido and so on. The carbamoyl groups preferably has from 1 to 20 carbon atoms, still preferably from 1 to 16 carbon atoms and particularly preferably from 1 to 12 carbon atoms. Examples thereof include methylcarbamoyl, dimethylcarbamoyl, ethylcarbamoyl, diethylcarbamoyl, n-propylcarbamoyl, isopropylcarbamoyl, n-butylcarbamoyl, t-butylcarbamoyl, iso-butylcarbamoyl, sec-butylcarbamoyl, n-pentylcarbamoyl, t-amylcarbamoyl, n-hexylcarbamoyl, cyclohexylcarbamoyl, 2-ethylhexylcarbamoyl, 2-ethylbutylcarbamoyl, t-octylcarbamoyl, n-heptylcarbamoyl, n-octylcarbamoyl, 1-adamantanecarbamoyl, 2-adamantanecarbamoyl, n-decylcarbamoyl, n-dodecylcarbamoyl, n-tetradecylcarbamoyl, n-hexadecylcarbamoyl and so on. $Y3^{71}$ to $Y^{70}$ may further have a substituent. As examples of the substituent, those described above as examples of substituents of $R^{11}$ to $R^{13}$ may be cited.

$V^{31}$ to $V^{43}$ independently represent each an aliphatic group having from 1 to 20, preferably from 1 to 16 and still preferably from 1 to 12, carbon atoms. The term "aliphatic group" as used herein preferably means an aliphatic hydrocarbon group, still preferably an alkyl group (including chain type, branched and cyclic alkyl groups), an alkenyl group or an alkynyl group. Examples of the alkyl group include methyl, ethyl, n-propyl, isopropyl, n-butyl, isobutyl, sec-butyl, t-butyl, n-pentyl, t-amyl, n-hexyl, n-octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamancyl, bicyclo[2.2.2]octan-3-yl and so on. Examples of the alkenyl group include vinyl, allyl, prenyl, geranyl, oleyl, 2-cyclopenten-1-yl, 2-cyclohexen-1-yl and so on. Examples of the alkynyl group include ethynyl and propargyl and so on. $V^{31}$ to $V^{43}$ may further have a substituent. As examples of the substituent, those described above as examples of substituents of $R^{11}$ to $R^{13}$ may be cited.

$L^{31}$ to $L^{80}$ independently represent each a divalent saturated linking group having from 0 to 40 atoms including from 0 to 20 carbon atoms.

$L^{31}$ to $L^{80}$ having 0 atom means that groups located at both ends of the linking group directly form a single bond. Preferable examples of $L^{31}$ to $L^{80}$ include alkylene groups (for example, methylene, ethylene, propylene, trimethylene, tetramethylene, pentamethylene, hexamethylene, methylethylene, ethylethylene and so on), cyclic divalent groups (for example, cis-1,4-cyclohexylene, trans-1,4-cyclohexylene, 1,3-cyclopentylidene and so on), ethers, thioethers, esters, amides, sulfone, sulfoxide, sulfide, sulfonamide, ureilene, thioureilene and so on. These divalent groups may be bonded together to form a divalent complex group. Examples of such complex substituents include —$(CH_2)_2$—O—$(CH_2)_2$—, —$(CH_2)_2$—O—$(CH_2)_o(CH_2)$—, —$(CH_2)_2S(CH_2)_2$—, —$(CH_2)_2O_2C(CH_2)_2$— and so on. $L^{31}$ to $L^{80}$ may further have a substituent. As examples of the substituent, those described above as examples of substituents of $R^{11}$ to $R^{13}$ may be cited.

Preferable examples of the compound formed by combining $Y^{31}$ to $Y^{70}$, $V^{31}$ to $V^{43}$ and $L^{31}$ to $L^{80}$ in the formulae (4) to (12) include citric acid esters (for example, triethyl o-acetylcitrate, tributyl o-acetylcitrate, acetyltriethyl citrate, acetyltributyl citrate, tri(ethyloxycarbonylmethylene) o-acetylcitrate and so on), oleic acid esters (for example, ethyl oleate, butyl oleate, 2-ethylhexyl oleate, phenyl oleate, cyclohexyl oleate, octyl oleate and so on), ricinolic acid esters (for example, methylacetyl ricinolate and so on), sebacic acid esters (for example, dibutyl sebacate and so on), glycerol carboxylic acid esters (for example, triacetin, tributylin and so on), glycolic acid esters (for example, butylphthalylbutyl glycolate, ethylphthalylethyl glycolate, methylphthalylethyl glycolate, butylphthalylbutyl glycolate, methylphthalylmethyl glycolate, propylphthalylpropyl glycolate, butylphthalylbutyl glycolate, octylphthalyloctyl glycolate and so on), pentaerythritol carboxylic acid esters (for example, pentaerythritol tetraacetate, pentaerythritol tetrabutyrate and so on), dipentaerythritol carboxylic acid esters (for example, dipentaerythritol hexaacetate, dipentaerythritol hexabutyrate, dipentaerythritol tetraacetate and so on), trimethylolpropane carboxylic acid esters (for example, trimethylolpropane triacetate, trimethylolpropane diacetate monopropionate, trimethylolpropane tripropionate, trimethylolpropane tributyrate, trimethylolpropane tripivaloate, trimethylolpropane tri(t-butylacetate), trimethylolpropane di-2-ethylhexanate, trimethylolpropane tetra-2-ethylhexanate, trimethylolpropane diacetate monooctanoate, trimethylolpropane trioctanoate, trimethylolpropane tri(cyclohexanecarboxylate) and so on), glycerol esters described in JP-A-11-246704, diglycerol esters described in JP-A-2000-63560, citric acid esters described in JP-A-11-92574, pyrrolidonecarboxylic acid esters (methyl 2-pyrrolidone-5-carboxylate, ethyl 2-pyrrolidone-5-carboxylate, butyl 2-pyrrolidone-5-carboxylate, 2-ethylhexyl 2-pyrrolidone-5-carboxylate), cyclohexanedicarboxylic acid esters (dibutyl cis-1,2-cyclohexanedicarboxylate, dibutyl trans-1,2-cyclohexanedicarboxylate, dibutyl cis-1,4-cyclohexanedicarboxylate, dibutyl trans-1,4-cyclohexanedicarboxylate and so on), xylitol carboxylic acid esters (xylitol pentaacetate, xylitol tetraacetate, xylitol pentapropionate and so on) and so on.

Next, examples of the compounds represented by the formulae (1) to (12) usable in the invention will be presented, though the invention is not restricted thereto. Compounds (C-1 to C-76) are examples of the compounds of the formula (1), while compounds (C-201 to C-231 and C-401 to C-448) are examples of the compounds of the formulae (2) to (12). logP values shown in the tables or given in the parentheses are determined by Crippen's fragmentation method (J. Chem. Inf. Comput. Sci., 27, 21 (1987)).

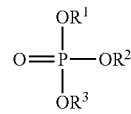

In the above formula, $R^1$ to $R^3$ have the same meanings as $R^{11}$ to $R^{13}$ in the above formula (1) and specific examples thereof will be shown concerning the following compounds C-1 to C-76.

| compound | $R^1$ | $R^2$ | $R^3$ | logP |
|---|---|---|---|---|
| C-1 | $CH_3$ | $C_2H_5$ | $C_2H_5$ | 1.24 |
| C-2 | $C_2H_5$ | $C_2H_5$ | $C_2H_5$ | 1.58 |
| C-3 | $C_3H_7$ | $C_3H_7$ | $C_3H_7$ | 2.99 |
| C-4 | i-$C_3H_7$ | i-$C_3H_7$ | i-$C_3H_7$ | 2.82 |
| C-5 | $C_4H_9$ | $C_4H_9$ | $C_4H_9$ | 4.18 |
| C-6 | i-$C_4H_9$ | i-$C_4H_9$ | i-$C_4H_9$ | 4.2 |
| C-7 | s-$C_4H_9$ | s-$C_4H_9$ | s-$C_4H_9$ | 4.23 |
| C-8 | t-$C_4H_9$ | t-$C_4H_9$ | t-$C_4H_9$ | 3.06 |
| C-9 | $C_5H_{11}$ | $C_5H_{11}$ | $C_5H_{11}$ | 5.37 |
| C-10 | $CH_2C(CH_3)_3$ | $CH_2C(CH_3)_3$ | $CH_2C(CH_3)_3$ | 5.71 |
| C-11 | c-$C_5H_9$ | c-$C_5H_9$ | c-$C_5H_9$ | 4.12 |
| C-12 | 1-ethylpropyl | 1-ethylpropyl | 1-ethylpropyl | 5.63 |
| C-13 | $C_6H_{13}$ | $C_6H_{13}$ | $C_6H_{13}$ | 6.55 |
| C-14 | c-$C_6H_{11}$ | c-$C_6H_{11}$ | c-$C_6H_{11}$ | 5.31 |
| C-15 | $C_7H_{15}$ | $C_7H_{15}$ | $C_7H_{15}$ | 7.74 |
| C-16 | 4-methylcyclohexyl | 4-methylcyclohexyl | 4-methylcyclohexyl | 6.3 |
| C-17 | 4-t-butylcyclohexyl | 4-t-butylcyclohexyl | 4-t-butylcyclohexyl | 9.78 |
| C-18 | $C_8H_{17}$ | $C_8H_{17}$ | $C_8H_{17}$ | 8.93 |
| C-19 | 2-ethylhexyl | 2-ethylhexyl | 2-ethylhexyl | 8.95 |
| C-20 | 3-methylbutyl | 3-methylbutyl | 3-methylbutyl | 5.17 |
| C-21 | 1,3-dimethylbutyl | 1,3-dimethylbutyl | 1,3-dimethylbutyl | 6.41 |
| C-22 | 1-isopropyl-2-methylpropyl | 1-isopropyl-2-methylpropyl | 1-isopropyl-2-methylpropyl | 8.05 |

-continued

| compound | R¹ | R² | R³ | logP |
|---|---|---|---|---|
| C-23 | 2-ethylbutyl | 2-ethylbutyl | 2-ethylbutyl | 6.57 |
| C-24 | 3,5,5-trimethylhexyl | 3,5,5-trimethylhexyl | 3,5,5-trimethylhexyl | 9.84 |
| C-25 | cyclohexylmethyl | cyclohexylmethyl | cyclohexylmethyl | 6.25 |
| C-26 | $CH_3$ | $CH_3$ | 2-ethylhexyl | 3.35 |
| C-27 | $CH_3$ | $CH_3$ | 1-adamantyl | 2.27 |
| C-28 | $CH_3$ | $CH_3$ | $C_{12}H_{25}$ | 4.93 |
| C-29 | $C_2H_5$ | $C_2H_5$ | 2-ethylhexyl | 4.04 |
| C-30 | $C_2H_5$ | $C_2H_5$ | 1-adamantyl | 2.96 |
| C-31 | $C_2H_5$ | $C_2H_5$ | $C_{12}H_{25}$ | 5.62 |
| C-32 | $C_4H_9$ | $C_4H_9$ | cyclohexyl | 4.55 |
| C-33 | $C_4H_9$ | $C_4H_9$ | $C_6H_{13}$ | 4.97 |
| C-34 | $C_4H_9$ | $C_4H_9$ | $C_8H_{17}$ | 5.76 |
| C-35 | $C_4H_9$ | $C_4H_9$ | 2-ethylhexyl | 5.77 |
| C-36 | $C_4H_9$ | $C_4H_9$ | $C_{10}H_{21}$ | 6.55 |
| C-37 | $C_4H_9$ | $C_4H_9$ | $C_{12}H_{25}$ | 7.35 |
| C-38 | $C_4H_9$ | $C_4H_9$ | 1-adamantyl | 4.69 |
| C-39 | $C_4H_9$ | $C_4H_9$ | $C_{16}H_{33}$ | 8.93 |
| C-40 | $C_4H_9$ | $C_4H_9$ | dicyclopentadienyl | 4.68 |
| C-41 | $C_6H_{13}$ | $C_6H_{13}$ | $C_{14}H_{29}$ | 9.72 |
| C-42 | $C_6H_{13}$ | $C_6H_{13}$ | $C_8H_{17}$ | 7.35 |
| C-43 | $C_6H_{13}$ | $C_6H_{13}$ | 2-ethylhexyl | 7.35 |
| C-44 | $C_6H_{13}$ | $C_6H_{13}$ | $C_{10}H_{21}$ | 8.14 |
| C-45 | $C_6H_{13}$ | $C_6H_{13}$ | $C_{12}H_{25}$ | 8.93 |
| C-46 | $C_6H_{13}$ | $C_6H_{13}$ | 1-adamantyl | 6.27 |
| C-47 | 4-chlorobutyl | 4-chlorobutyl | 4-chlorobutyl | 4.18 |
| C-48 | 4-chlorohexyl | 4-chlorohexyl | 4-chlorohexyl | 6.55 |
| C-49 | 4-bromobutyl | 4-bromobutyl | 4-bromobutyl | 4.37 |
| C-50 | 4-bromohexyl | 4-bromohexyl | 4-bromohexyl | 6.74 |
| C-51 | $(CH_2)_2OCH_2CH_3$ | $(CH_2)_2OCH_2CH_3$ | $(CH_2)_2OCH_2CH_3$ | 1.14 |
| C-52 | $C_8H_{17}$ | $C_8H_{17}$ | $(CH_2)_2O(CH_2)_2OCH_2CH_3$ | 6.55 |
| C-53 | $C_6H_{13}$ | $C_6H_{13}$ | $(CH_2)_2O(CH_2)_2OCH_2CH_3$ | 4.96 |
| C-54 | $C_4H_9$ | $C_4H_9$ | $(CH_2)_2O(CH_2)_2OCH_2CH_3$ | 3.38 |
| C-55 | $C_4H_9$ | $C_4H_9$ | $(CH_2)_2O(CH_2)_2OCH_2OH$ | 2.59 |
| C-56 | $C_6H_{13}$ | $C_6H_{13}$ | $(CH_2)_2O(CH_2)_2OCH_2OH$ | 4.18 |
| C-57 | $C_8H_{17}$ | $C_8H_{17}$ | $(CH_2)_2O(CH_2)_2OCH_2OH$ | 5.76 |
| C-58 | $C_4H_9$ | $(CH_2)_2O(CH_2)_2OCH_2OH$ | $(CH_2)_2O(CH_2)_2OCH_2OH$ | 2.2 |
| C-59 | $C_4H_9$ | $C_4H_9$ | $CH_2CH=CH_2$ | 4.19 |
| C-60 | $C_4H_9$ | $CH_2CH=CH_2$ | $CH_2CH=CH_2$ | 3.64 |
| C-61 | $(CH_2)_2CO_2CH_2CH_3$ | $(CH_2)_2CO_2CH_2CH_3$ | $(CH_2)_2CO_2CH_2CH_3$ | 1.1 |
| C-62 | $(CH_2)_2CO_2(CH_2)_3CH_3$ | $(CH_2)_2CO_2(CH_2)_3CH_3$ | $(CH_2)_2CO_2(CH_2)_3CH_3$ | 3.69 |
| C-63 | $(CH_2)_2CONH(CH_2)_3CH_3$ | $(CH_2)_2CONH(CH_2)_3CH_3$ | $(CH_2)_2CONH(CH_2)_3CH_3$ | 1.74 |
| C-64 | $C_4H_9$ | $C_4H_9$ | $(CH_2)_4OP=O(OC_4H_9)_2$ | 6.66 |
| C-65 | $C_4H_9$ | $C_4H_9$ | $(CH_2)_3OP=O(OC_4H_9)_2$ | 6.21 |
| C-66 | $C_4H_9$ | $C_4H_9$ | $(CH_2)_2OP=O(OC_4H_9)_2$ | 6.16 |
| C-67 | $C_4H_9$ | $C_4H_9$ | $(CH_2)_2O(CH_2)_2OP=O(OC_4H_9)_2$ | 5.99 |
| C-68 | $C_6H_{13}$ | $C_6H_{13}$ | $(CH_2)_2O(CH_2)_2OP=O(OC_4H_9)_2$ | 7.58 |
| C-69 | $C_6H_{13}$ | $C_6H_{13}$ | $(CH_2)_4OP=O(OC_4H_9)_2$ | 8.25 |
| C-70 | $c-C_6H_{13}$ | $c-C_6H_{13}$ | $(CH_2)_2O(CH_2)_2OP=O(OC_4H_9)_2$ | 6.35 |
| C-71 | $C_6H_{12}Cl$ | $C_6H_{12}Cl$ | $(CH_2)_2O(CH_2)_2OP=O(OC_4H_9)_2$ | 7.18 |
| C-72 | $C_4H_8Cl$ | $C_4H_8Cl$ | $(CH_2)_2O(CH_2)_2OP=O(OC_4H_9)_2$ | 5.6 |
| C-73 | $C_4H_8Cl$ | $C_4H_8Cl$ | $(CH_2)_2O(CH_2)_2OP=O(OC_4H_8Cl)_2$ | 5.59 |
| C-74 | $C_4H_9$ | $C_4H_9$ | 2-tetrahydrofuranyl | 3.27 |
| C-75 | $C_4H_9$ | 2-tetrahydrofuranyl | 2-tetrahydrofuranyl | 2.36 |
| C-76 | 2-tetrahydrofuranyl | 2-tetrahydrofuranyl | 2-tetrahydrofuranyl | 1.45 |

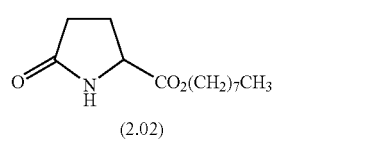

C-201

(2.00)

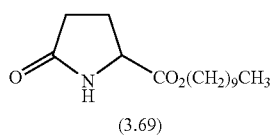

C-203

(3.69)

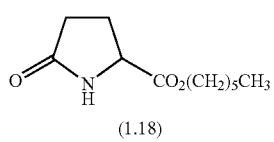

C-202

(2.02)

C-204

(1.18)

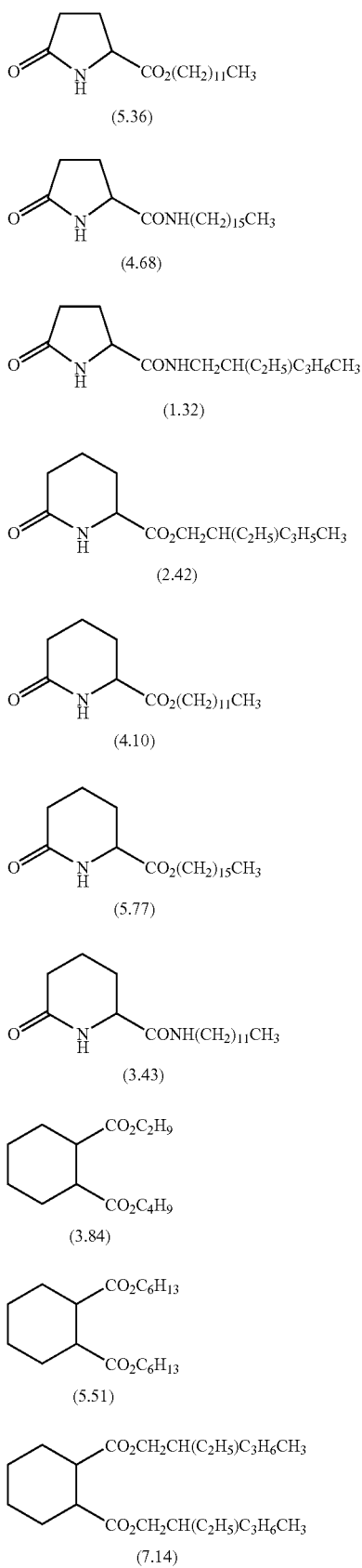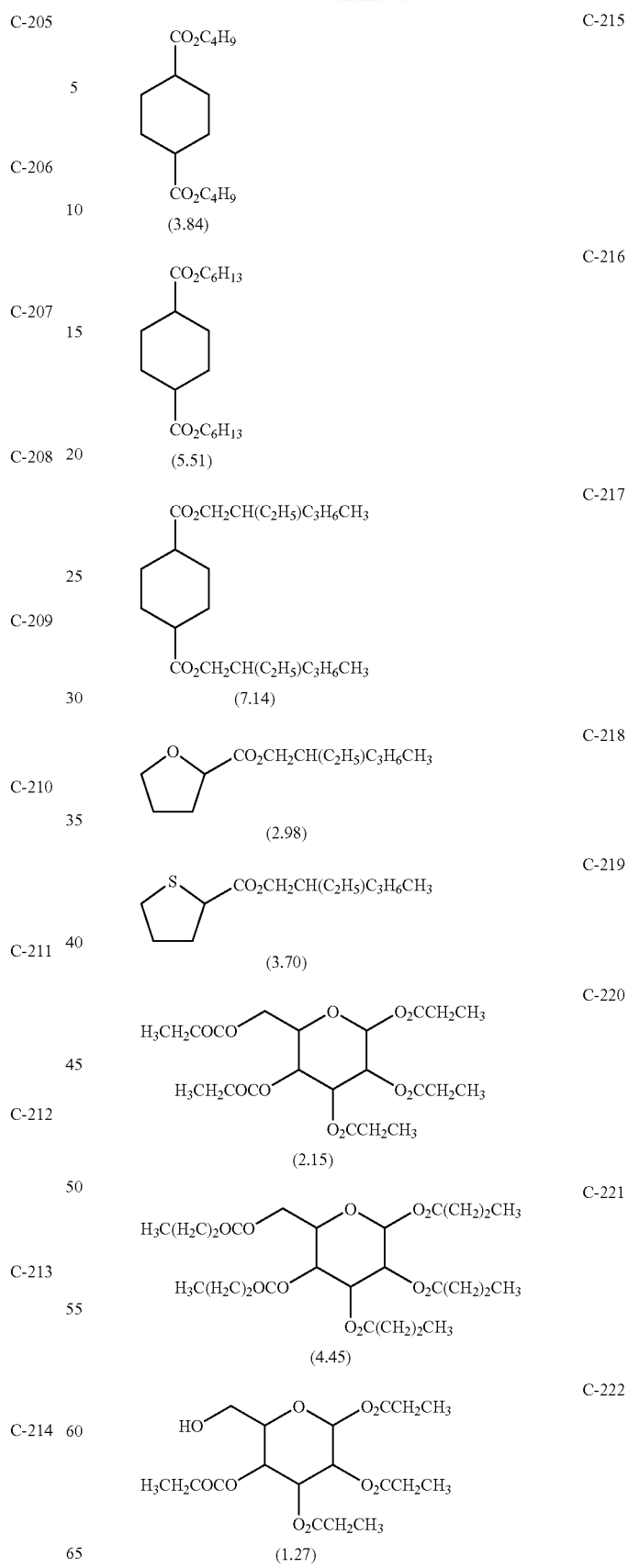

C-223
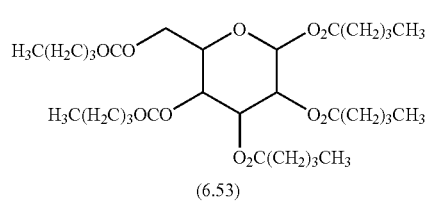
(6.53)
C-224
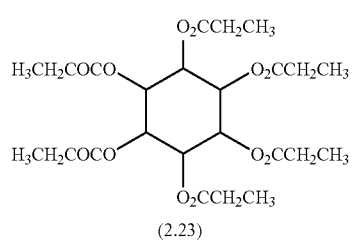
(2.23)
C-225
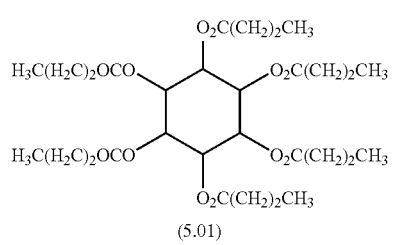
(5.01)
C-226
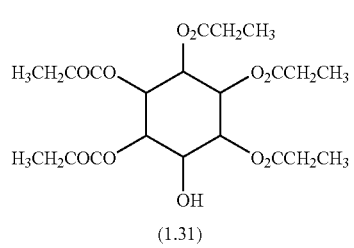
(1.31)
C-227
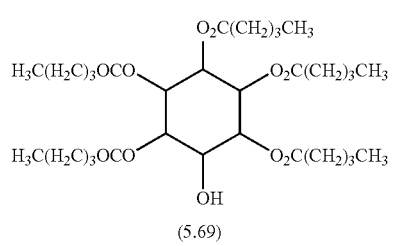
(5.69)
C-228
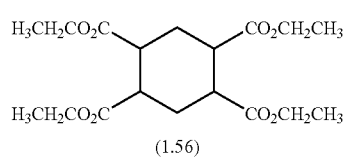
(1.56)
C-229
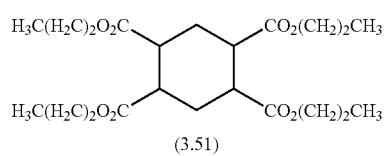
(3.51)
C-230
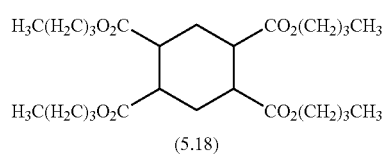
(5.18)
C-231
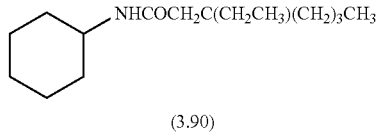
(3.90)
C-401
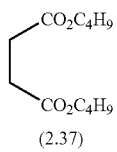
(2.37)
C-402
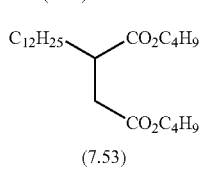
(5.71)
C-403
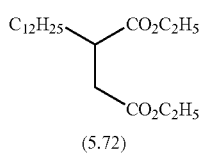
(7.53)
C-404
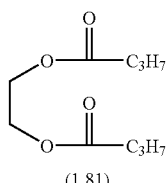
(5.72)
C-405
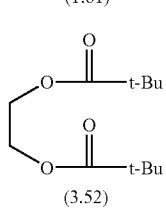
(1.81)
C-406
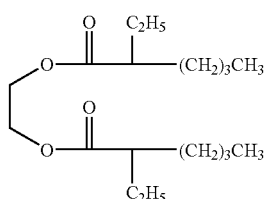
(3.52)
C-407
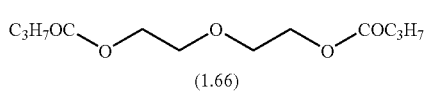
(5.45)
C-408
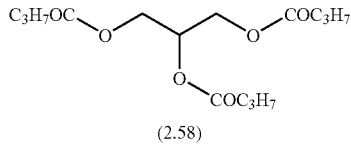
(1.66)
C-409
(2.58)

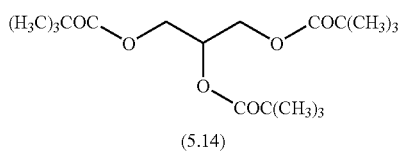
(5.14)
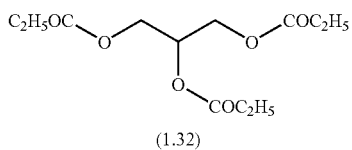
(1.32)
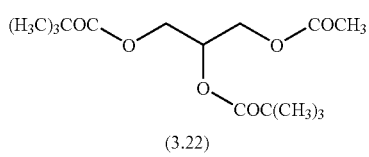
(3.22)
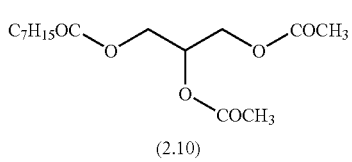
(2.10)
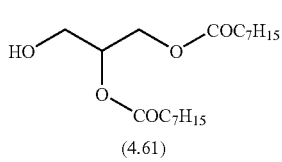
(4.61)
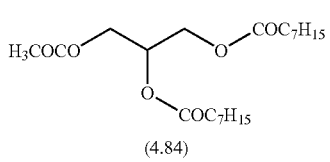
(4.84)
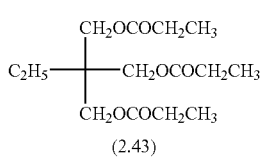
(2.43)
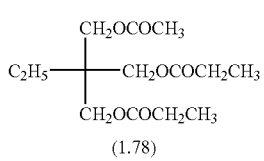
(1.78)
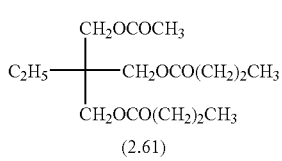
(2.61)
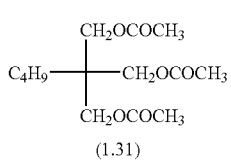
(1.31)
C-410
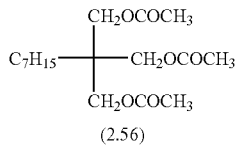
(2.56)
C-411
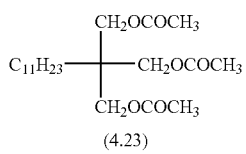
(4.23)
C-412
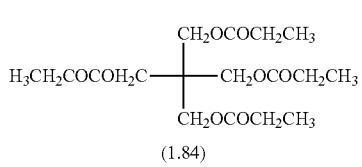
(1.84)
C-413
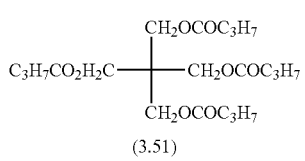
(3.51)
C-414
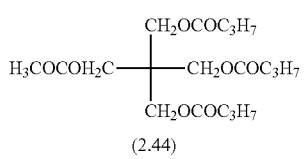
(2.44)
C-415
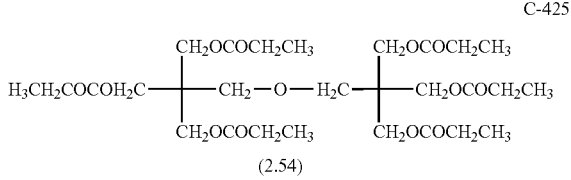
(2.54)
C-416
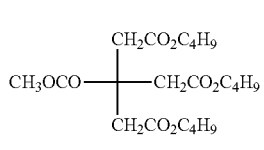
(3.01)
C-417
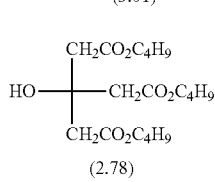
(2.78)
C-418
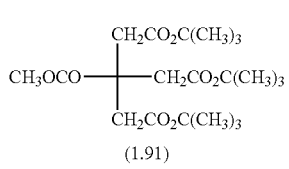
(1.91)
C-419
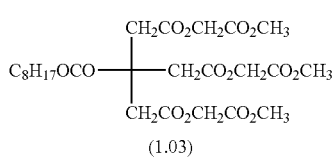
(1.03)
C-420
C-421
C-422
C-423
C-424
C-425
C-426
C-427
C-428
C-429

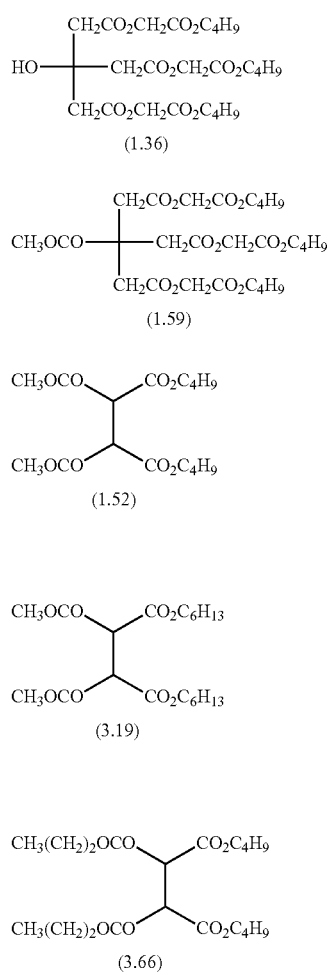
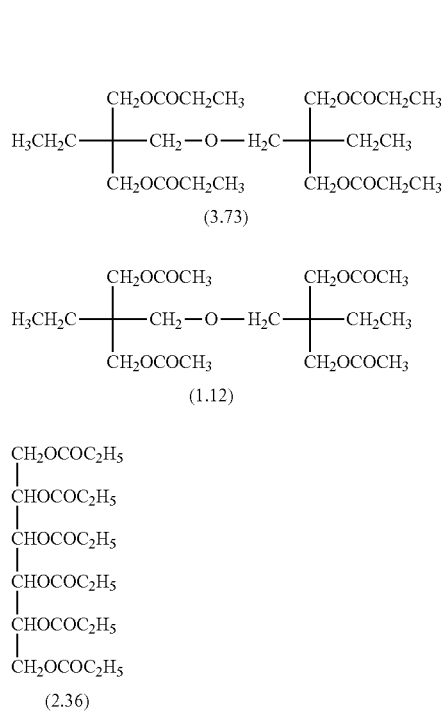
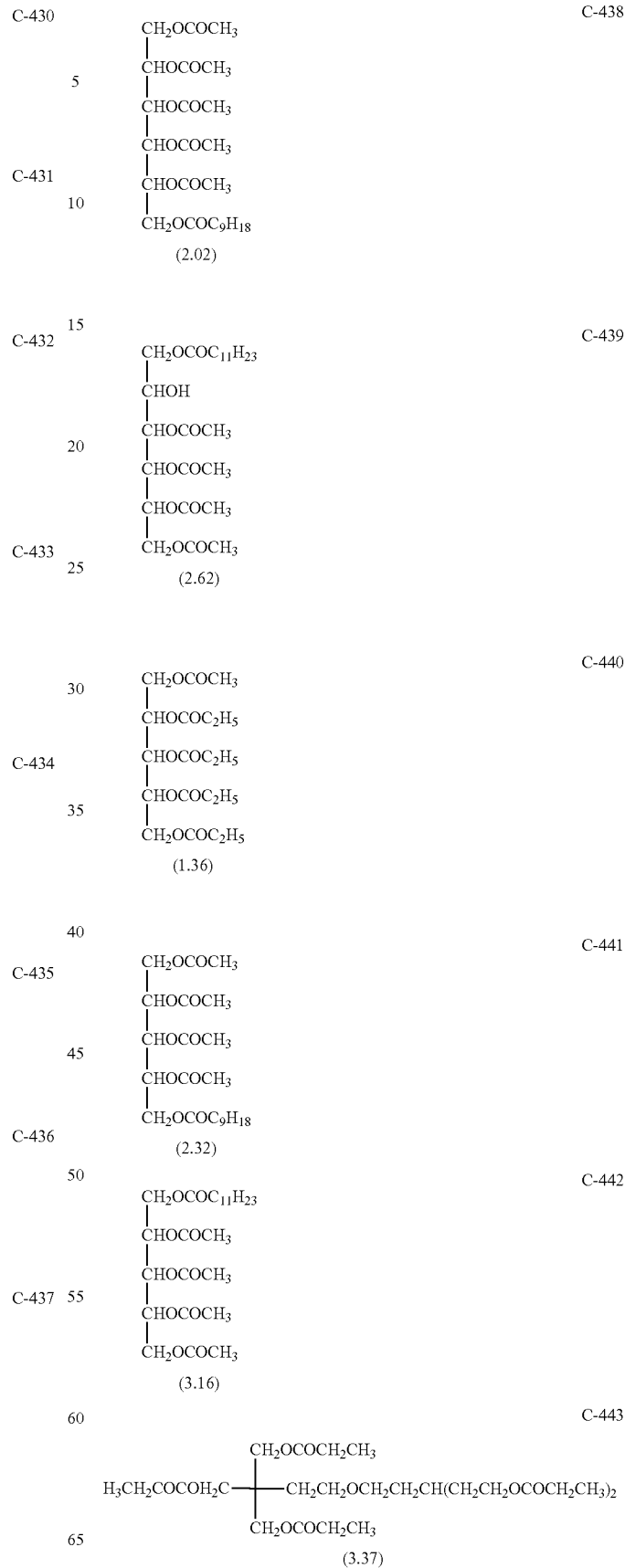

-continued

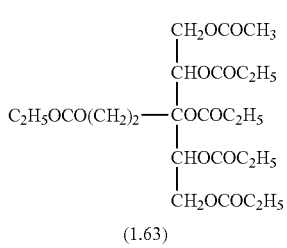
(1.63)

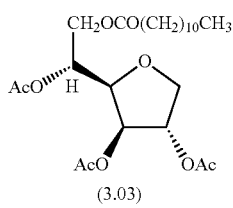
(3.03)

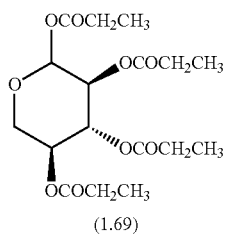
(1.69)

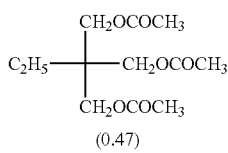
(0.47)

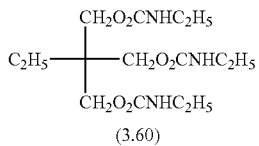
(3.60)

Now, the compounds of the formulae (13) and (14) will be described.

In the above formula (13), $R^1$ represents an alkyl group or an aryl group. $R^2$ and $R^3$ independently represent each a hydrogen atom, an alkyl group or an aryl group. It is particularly preferable that the sum of the carbon atoms in $R^1$, $R^2$ and $R^3$ is 10 or more. In the formula (14), $R^4$ and $R^5$ independently represent each an alkyl group or an aryl group. The sum of carbon atoms in $R^4$ and $R^5$ is 10 or more. The alkyl and aryl groups may have a substituent. Preferable examples of the substituent include a fluorine atom, alkyl groups, aryl groups, alkoxy groups, sulfone group and sulfonamido group. Among all, alkyl groups, aryl groups, alkoxy groups, sulfone group and sulfonamido group are particularly preferable. The alkyl group may be either chain type, branched or cyclic. It is preferable that the alkyl group has from 1 to 25 carbon atoms, still preferably from 6 to 25 and particularly preferably from 6 to 20 carbon atoms (for example, methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantyl, decyl, t-octyl, undecyl, dodecyl, tridecyl, tetradecyl, pentadecyl, hexadecyl, heptadecyl, octadecyl, nonadecyl and didecyl). The aryl group preferably has from 6 to 30 carbon atoms, still preferably form 6 to 24 carbon atoms (for example, phenyl, biphenyl, terphenyl, naphthyl, binaphthyl and triphenylphenyl). Next, preferable examples of the compounds represented by the formula (13) or the formula (14) will be presented, though the invention is not restricted to these specific examples.

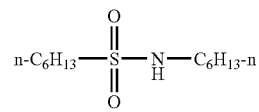
A-1

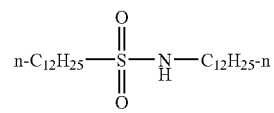
A-2

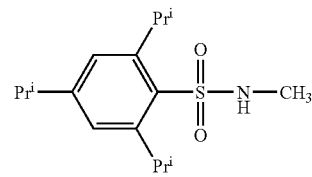
A-3

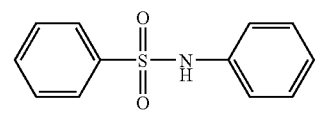
A-4

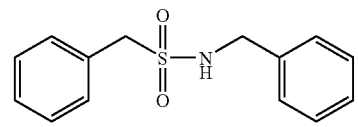
A-5

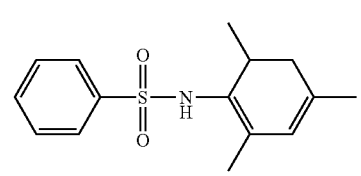
A-6

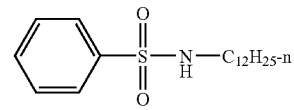
A-7

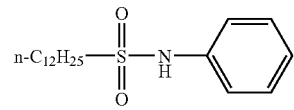
A-8

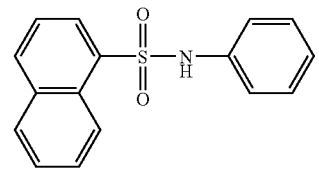
A-9

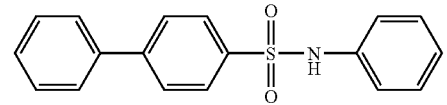
A-10

A-11 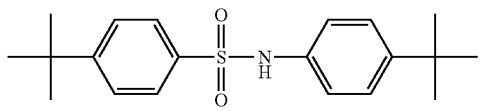
A-12 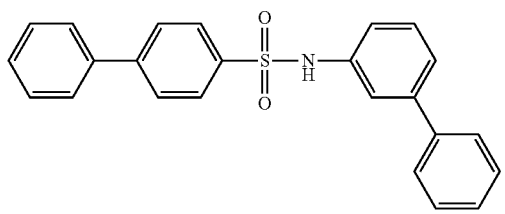
A-13 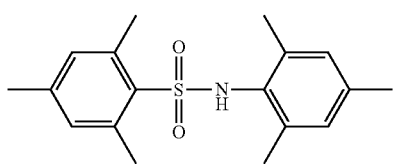
A-14 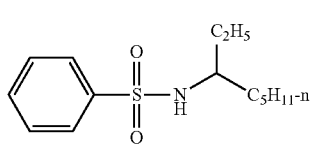
A-15 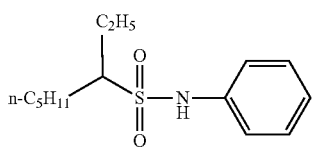
A-16 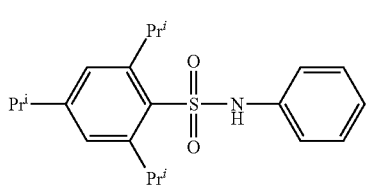
A-17 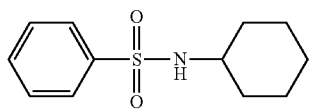
A-18 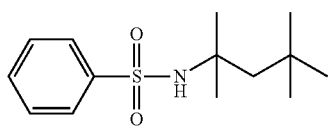
A-19 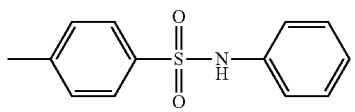
A-20 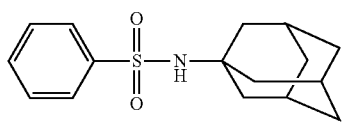
A-21 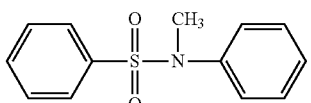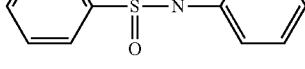
A-22 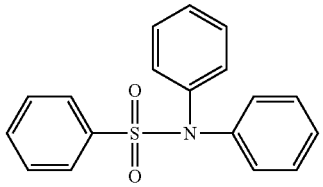
A-23 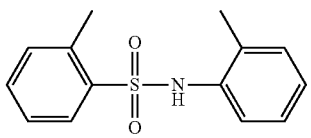
A-24 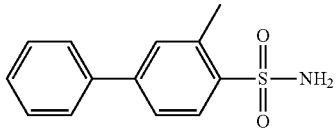
A-25 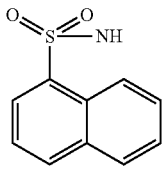
A-26 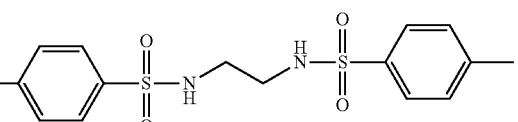
A-27 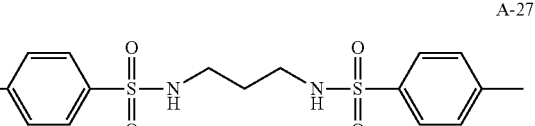
A-28 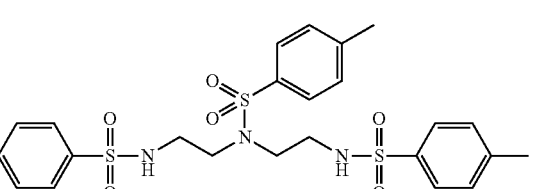
A-29 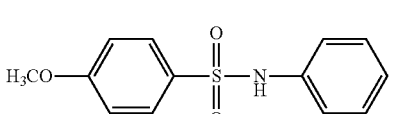
A-30 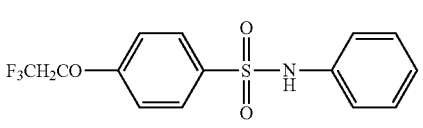

A-31 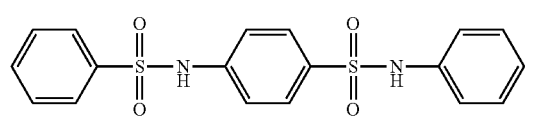
A-32 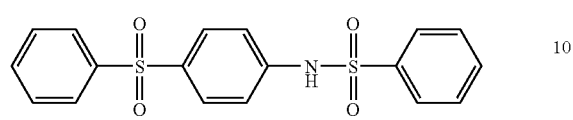
A-33 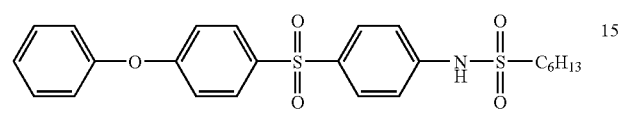
A-34 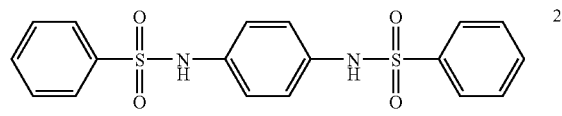
A-35 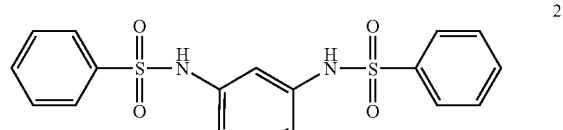
A-36 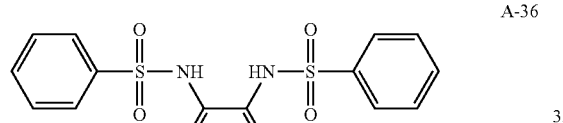
A-37 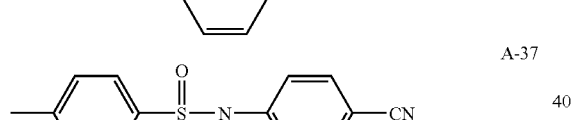
A-38 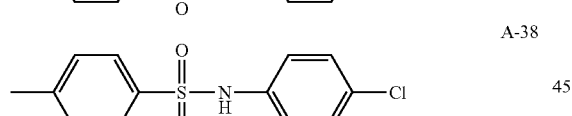
A-39 
A-40 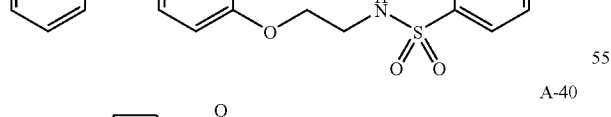
A-41 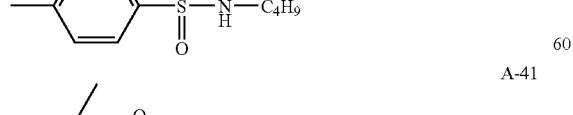
A-42 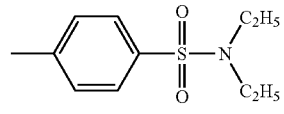
A-43 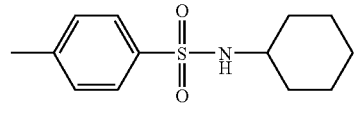
A-44 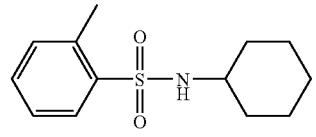
A-45 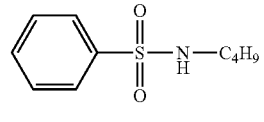
A-46 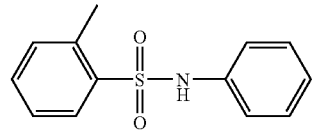
A-47 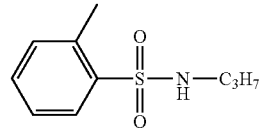
A-48 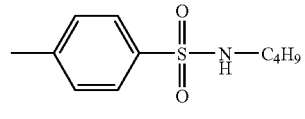
A-49 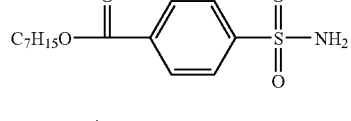
A-50 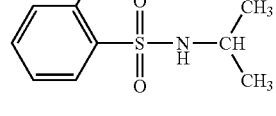
A-51 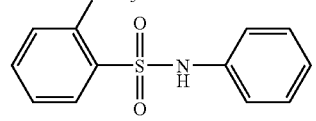
B-1 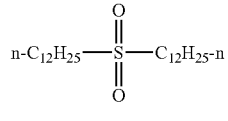
B-2 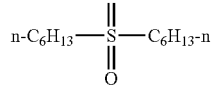

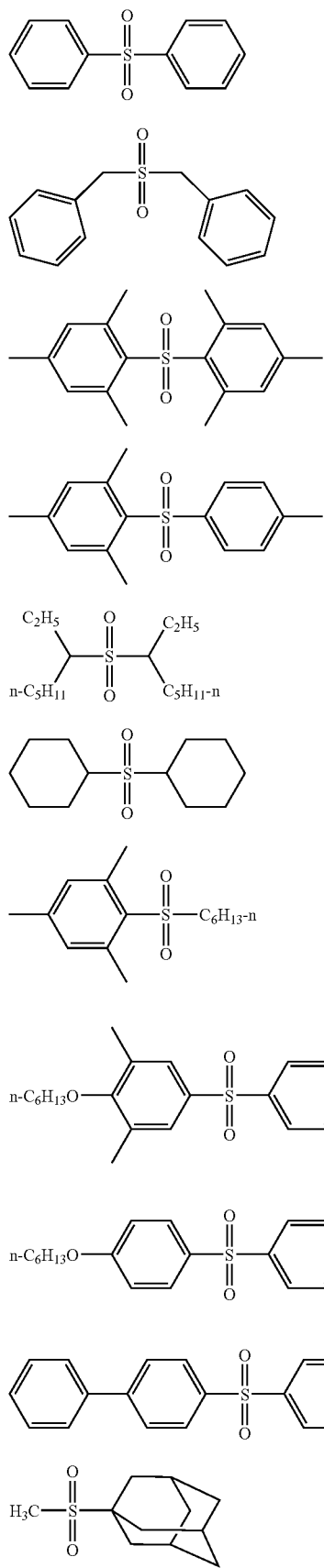

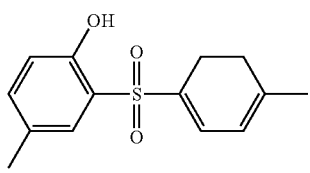
B-24

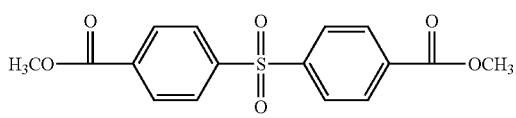
B-25

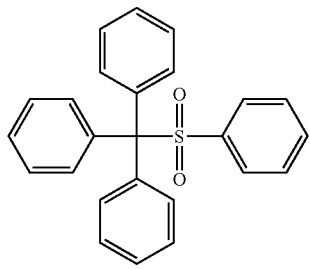
B-26

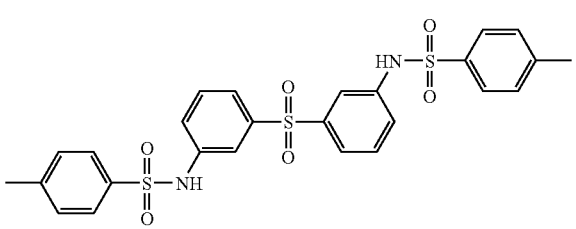
B-27

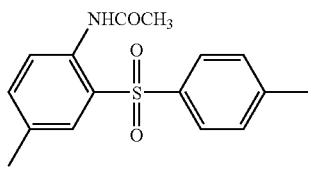
B-28

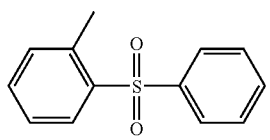
B-29

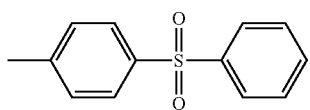
B-30

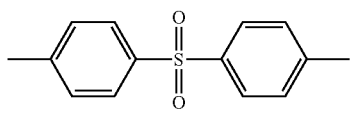
B-31

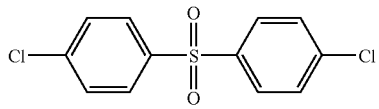
B-32

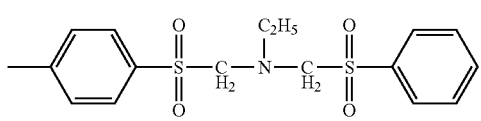
B-33

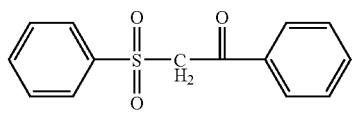
B-34

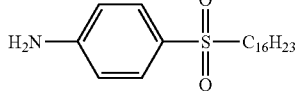
B-35

Next, the compounds represented by the formula (15) will be described.

In the above formula (15), $R^1$, $R^2$ and $R^3$ independently represent each a hydrogen atom or an alkyl group. As the alkyl group, an alkyl group having from 1 to 5 carbon atoms (for example, methyl, ethyl, propyl, isopropyl, butyl, amyl or isoamyl) is preferable. It is particularly preferable that at least one of $R^1$, $R^2$ and $R^3$ is an alkyl group having from 1 to 3 carbon atoms (for example, methyl, ethyl, propyl or isopropyl). X preferably represents a divalent linking group made up of one or more groups selected from among a single, —O—, —CO—, —NR$^4$— (wherein $R^4$ represents a hydrogen atom, an alkyl group, an aryl group or an aralkyl group), an alkylene group (preferably having from 1 to 6 carbon atoms, still preferably from 1 to 3 carbon atoms such as methylene, ethylene or propylene), or an arylene group (preferably having from 6 to 24 carbon atoms, still preferably from 6 to 12 carbon atoms such as phenylene, biphenylene or naphthylene). Y preferably represents a hydrogen atom, an alkyl group (preferably having from 2 to 25 carbon atoms, still preferably from 2 to 20 carbon atoms such as ethyl, isopropyl, t-butyl, hexyl, 2-ethylhexyl, t-octyl, dodecyl, cyclohexyl, dicyclohexyl or adamantyl), an aryl group (preferably having from 6 to 24 carbon atoms, still preferably from 6 to 18 carbon atoms such as phenyl, biphenyl or naphthyl), or an aralkyl group (preferably having from 7 to 30 carbon atoms, still preferably from 7 to 20 carbon atoms such as benzyl, cresyl, t-butylphenyl, diphenylmethyl or triphenylmethyl). An alkyl group, an aryl group or an aralkyl group is still preferable. Concerning the combination —Y—Y, it is preferable that the sum of the carbon atoms in —X—Y is form 0 to 40, still preferably form 1 to 30 and most desirably from 1 to 25. Next, preferable examples of the compounds represented by the formula (14) will be presented, though the invention is not restricted to these specific examples.

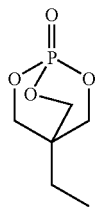
PL-1

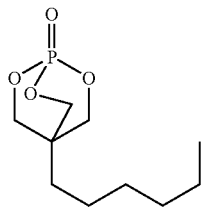
PL-2

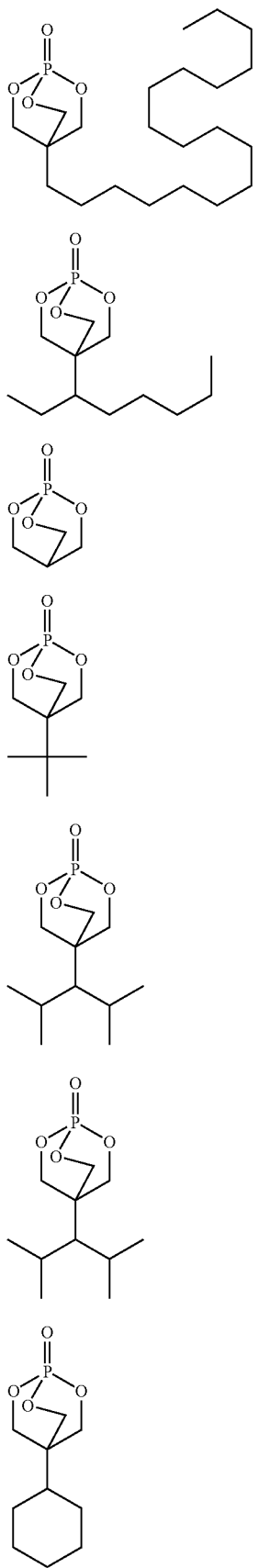
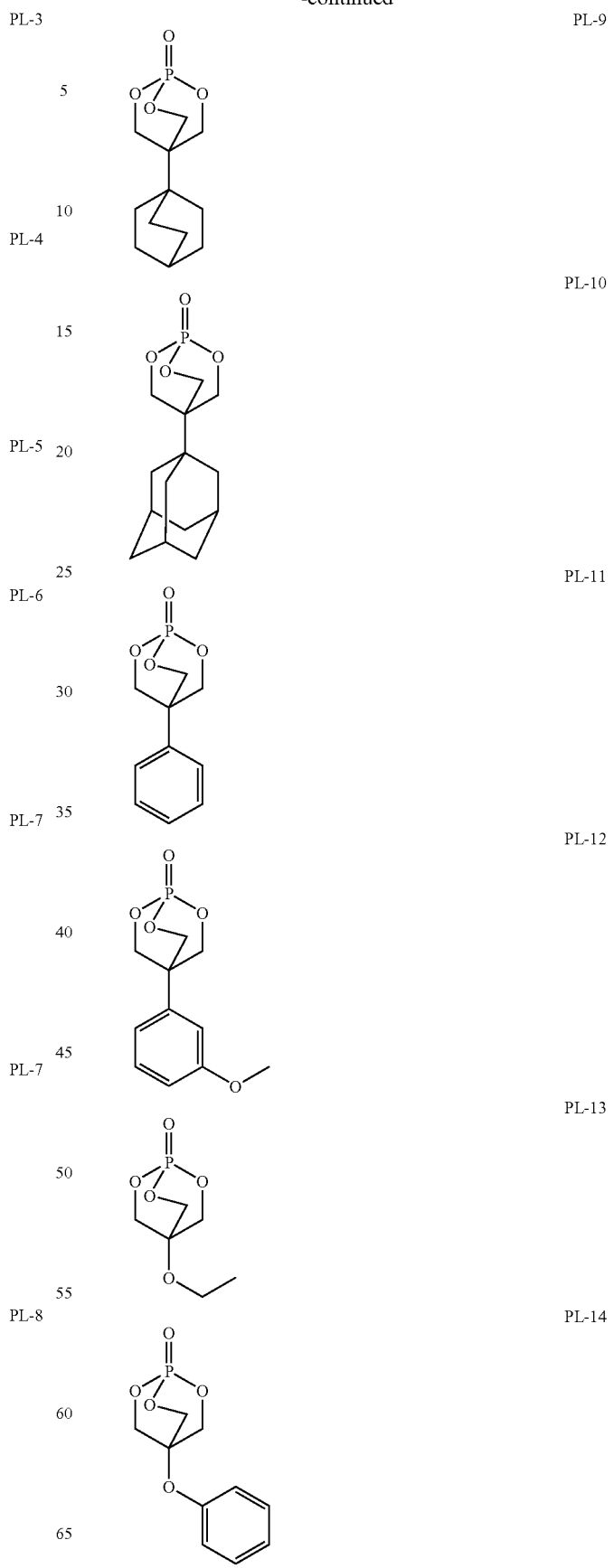

PL-15 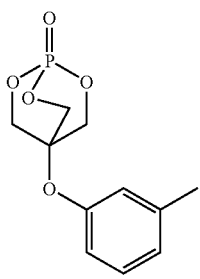
PL-16 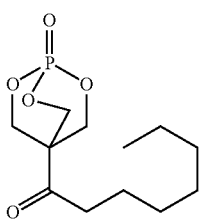
PL-17 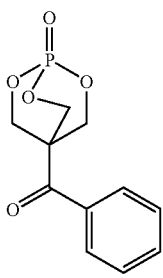
PL-18 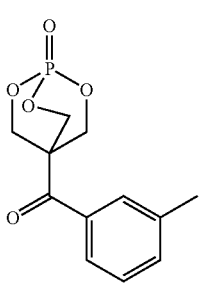
PL-19 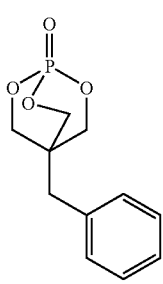
PL-20 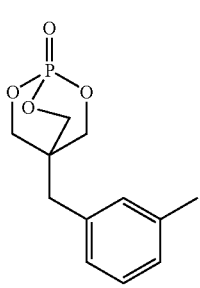
PL-21 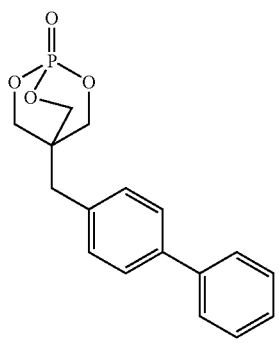
PL-22 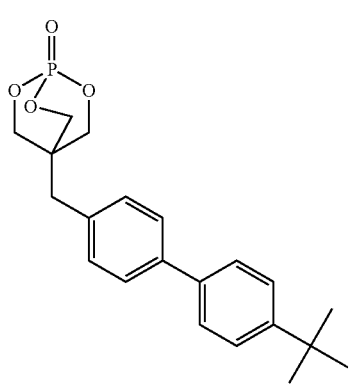
PL-23 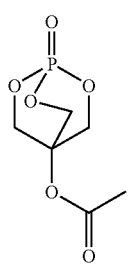
PL-24 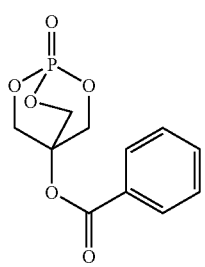
PL-25 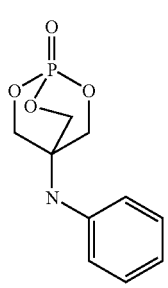

PL-26
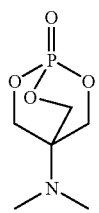
PL-27
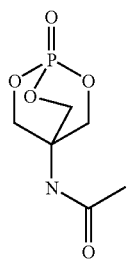
PL-28
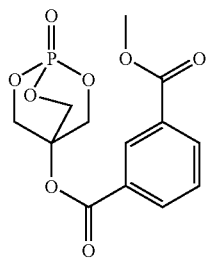
PL-29
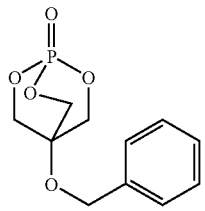
PL-30
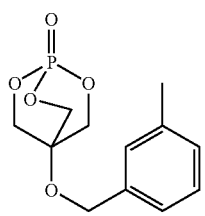
PL-31
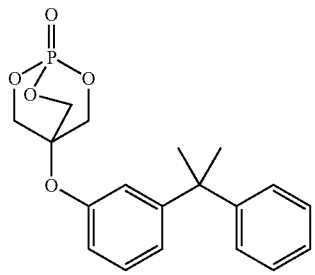
PL-32
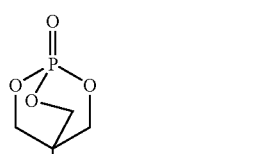
PL-33
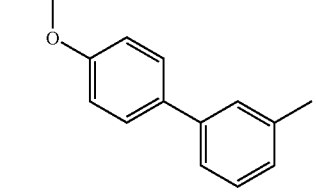
PL-34
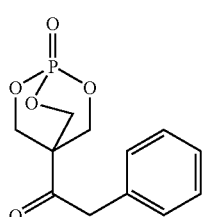
PL-35
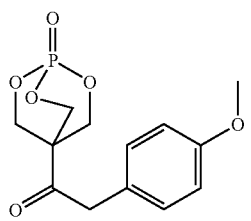
PL-36
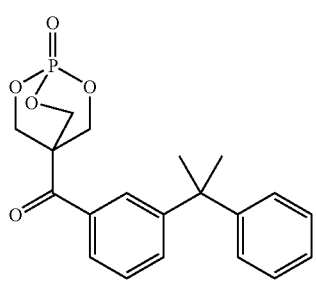
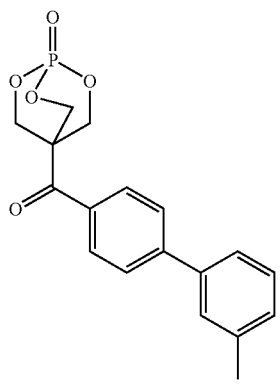

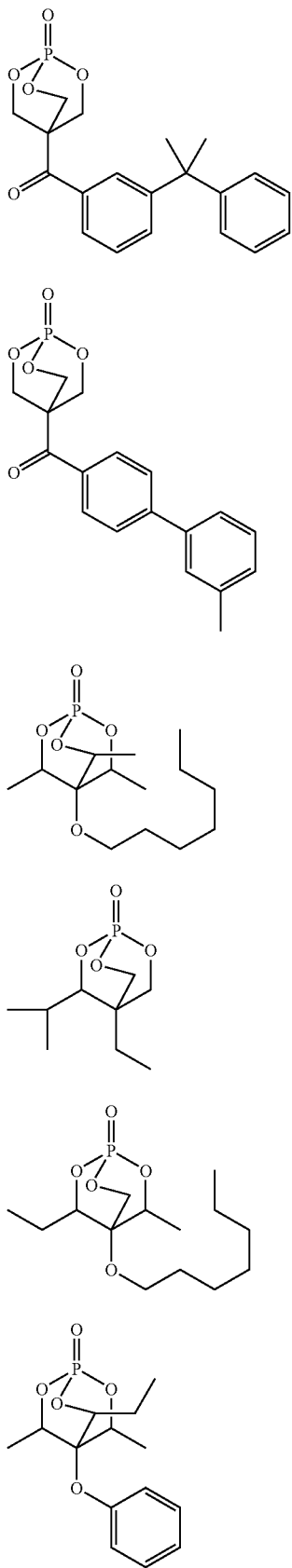

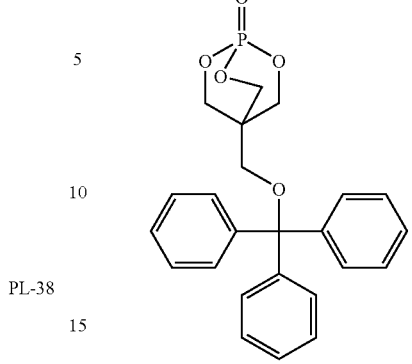

Now, the compounds of the formula (15) will be described.

Formula (16):

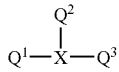

$Q^1$, $Q^2$ and $Q^3$ independently represent each a 5- or 6-membered ring which may be a hydrocarbon ring or a heterocycle. Such a ring may be a monocycle or form a fused ring together with another ring. Preferable examples of the hydrocarbon ring include substituted or unsubstituted cyclohexane rings, substituted or unsubstituted cyclopentane rings and aromatic hydrocarbon rings, still preferably aromatic hydrocarbon rings. Preferable examples of the heterocycle include 5- and 6-membered rings having at least one of oxygen, nitrogen and sulfur atoms. As the heterocycle, aromatic heterocycles having at least one of oxygen, nitrogen and sulfur atoms are still preferable.

Preferable examples of $Q^1$, $Q^2$ and $Q^3$ include aromatic hydrocarbon rings and aromatic heterocycles. Preferable examples of the aromatic hydrocarbon rings include monoclyclic and bicyclic aromatic hydrocarbon rings having from 6 to 30 carbon atoms (for example, benzene ring, naphthalene ring and so on), aromatic hydrocarbon rings having from 6 to 20 carbon atoms are still preferable, aromatic hydrocarbon rings having from 6 to 12 carbon atoms are still preferable and benzene ring is still preferable.

As the aromatic heterocycles, aromatic heterocycles having an oxygen atom, a nitrogen atom or a sulfur atom is preferable. Specific examples of the heterocycles include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthridine, phenazine, tetrazole, benzimidazole, benzoxazole, benzthiazole, benzotriazole, tetrazaindene and so on. Preferable examples of the aromatic heterocycles include pyridine, triazine and quinoline. It is preferable that $Q^1$, $Q^2$ and $Q^3$ are aromatic hydrocarbon rings, still preferably benzene rings. $Q^1$, $Q^2$ and $Q^3$ may have a substituent and examples of the substituent include the substituent T which will be described hereinafter.

X represents B, C—R (wherein R represents a hydrogen atom or a substituent), N, P or P=O. Preferable examples of X include B, C—R (wherein R preferably represents an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxy group, a. mercapto group, a halogen atom such as a fluorine atom, a chlorine atom, a. bromine atom or an iodine atom, and a carboxyl group, still preferably an aryl group, an alkoxy group, an aryloxy group, a hydroxy group or a halogen atom, and still preferably an alkoxy group or a hydroxy group, and particularly preferably a hydroxy group), and N. C—R is particularly preferable.

Preferable examples of the compounds of the formula (16) are compounds represented by the following formula (17).

Formula (17):

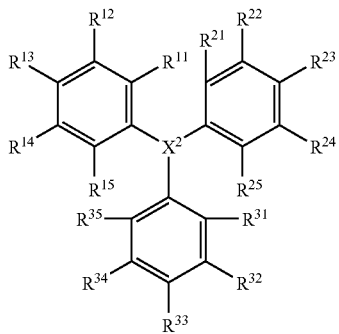

In the above formula, $X^2$ represents B, C—R (wherein R represents a hydrogen atom or a substituent), N, P or P=O. $R^{11}, R^{12}, R^{13}, R^{14}, R^{15}, R^{21}, R^{22}, R^{23}, R^{24}, R^{25}, R^{31}, R^{32}, R^{33}, R^{34}$ and $R^{35}$ represent each a hydrogen atom or a substituent.

$X^2$ represents B, C—R (wherein R represents a hydrogen atom or a substituent), N, P or P=O. Preferable examples of $X^2$ include B, C—R (wherein R preferably represents an aryl group, a substituted or unsubstituted amino group, an alkoxy group, an acyloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxy group, a mercapto group, a halogen atom such as a fluorine atom, a chlorine atom, a bromine atom or an iodine atom, and a carboxyl group, still preferably an aryl group, an alkoxy group, an aryloxy group, a hydroxy group or a halogen atom, and still preferably an alkoxy group or a hydroxy group, and particularly preferably a hydroxy group), N and P=O. C—R and N are still preferable and C—R is particularly preferable.

$R^{11}, R^{12}, R^{13}, R^{14}, R^{15}, R^{21}, R^{22}, R^{23}, R^{24}, R^{25}, R^{31}, R^{32}, R^{33}, R^{34}$ and $R^{35}$ represent each a hydrogen atom or a substituent. As examples of the substituent, the substituent T which will be described hereinafter may be cited. Preferable examples of $R^{11}, R^{12}, R^{13}, R^{14}, R^{15}, R^{21}, R^{22}, R^{23}, R^{24}, R^{25}, R^{31}, R^{32}, R^{33}, R^{34}$ and $R^{35}$ include allyl groups, alkenyl groups, alkenyl groups, alkynyl groups, aryl groups, substituted or unsubstituted amino groups, alkoxy groups, aryloxy groups, acyl groups, alkoxycarbonyl groups, aryloxycarbonyl groups, acyloxy groups, acylamino groups, alkoxycarbonylamino groups, aryloxycarbonylamino groups, sulfonylamino groups, sulfamoyl groups, carbamoyl groups, alkylthio groups, arylthio groups, sulfonyl groups, sulfinyl groups, ureido groups, phosphoramido group, hydroxy group, mercapto group, halogen atoms such as a fluorine atom, a chlorine atom, a bromine atom and an iodine atom, cyano group, sulfo group, carboxyl group, nitro group, hydroxamate group, sulfino group, hydrazino group, imino group, heterocyclic groups (preferably having from 1 to 30 carbon atoms, still preferably form 1 to 2 carbon atoms and having, for example, a nitrogen atom, an oxygen atom or a sulfur atom as the hetero atom, such as imidazolyl, pyridyl, quinolyl, furyl, piperidyl, morpholino, benzoxazolyl, benzimidazolyl and benzthiazolyl) and silyl group. Still preferable examples thereof include alkyl groups, aryl groups, substituted or unsubstituted amino groups, alkoxy groups and aryloxy groups. Among all, alkyl groups, aryl groups and alkoxy groups are particularly preferred.

These substituents may be further substituted. In the case of having two or more substituent, the substituents may be either the same or different. If possible, these substituents may be bonded together to from a ring.

Now, the substituent T as described above will be illustrated. Examples of the substituent T include alkyl groups (preferably having from 1 to 20 carbon atoms, still preferably from 1 to 12 carbon atoms and particularly preferably from 1 to 8 carbon atoms, such as methyl, ethyl, isopropyl, tert-butyl, n-octyl, n-decyl, n-hexadecyl, cyclopropyl, cyclopentyl and cyclohexyl), alkenyl groups (preferably having from 2 to 20 carbon atoms, still preferably from 2 to 12 carbon atoms and particularly preferably from 2 to 8 carbon atoms, such as vinyl, allyl, 2-butenyl and s-pentenyl), alkynyl groups (preferably having from 2 to 20 carbon atoms, still preferably from 2 to 12 carbon atoms and particularly preferably from 2 to 8 carbon atoms, such as propargyl and 3-pentynyl), aryl groups (preferably having from 6 to 30 carbon atoms, still preferably from 6 to 20 carbon atoms and particularly preferably from 6 to 12 carbon atoms, such as phenyl, p-methylphenyl and naphthyl), substituted or unsubstituted amino groups (preferably having from 0 to 20 carbon atoms, still preferably from 0 to 10 carbon atoms and particularly preferably from 0 to 6 carbon atoms, such as amino, methylamino, dimethylamino, diethylamino and dibenzylamino), alkoxy groups (preferably having from 1 to 20 carbon atoms, still preferably from 1 to 12 carbon atoms and particularly preferably from 1 to 8 carbon atoms, such as methoxy, ethoxy and butoxy), aryloxy groups (preferably having from 6 to 20 carbon atoms, still preferably from 6 to 16 carbon atoms and particularly preferably from 6 to 12 carbon atoms, such as phenyloxy and 2-naphthyloxy), acyl groups (preferably having from 1 to 20 carbon atoms, still preferably from 1 to 16 carbon atoms and particularly preferably from 1 to 12 carbon atoms, such as acetyl, benzoyl, formyl and pivaloyl), alkoxycarbonyl groups (preferably having from 2 to 20 carbon atoms, still preferably from 2 to 16 carbon atoms and particularly preferably from 2 to 12 carbon atoms, such as methoxycarbonyl and ethoxycarbonyl), aryloxycarbonyl groups (preferably having from 7 to 20 carbon atoms, still preferably from 7 to 16 carbon atoms and particularly preferably from 7 to 10 carbon atoms, such as phenyoxycarbonyl), acyloxy groups (preferably having from 2 to 20 carbon atoms, still preferably from 2 to 16 carbon atoms and particularly preferably from 2 to 10 carbon atoms, such as acetoxy and benzoyloxy), acylamino groups (preferably having from 2 to 20 carbon atoms, still preferably from 2 to 16 carbon atoms and particularly preferably from 2 to 10 carbon atoms, such as acetylamino and benzoylamino), alkoxycarbonylamino groups (preferably having from 2 to 20 carbon atoms, still preferably from 2 to 16 carbon atoms and particularly preferably from 2 to 12 carbon atoms, such as methoxycarbonylamino), aryloxycarbonylamino groups (preferably having from 7 to 20 carbon atoms, still preferably from 7 to 16 carbon atoms and particularly preferably from 7 to 12 carbon atoms, such as phenyloxycarbonylamino), sulfonylamino groups (preferably having from 1 to 20 carbon atoms, still preferably from 1 to 16 carbon atoms and particularly preferably from 1 to 12 carbon atoms, such as methanesulfonylamino and benzenesulfonylamino), sulfamoyl groups (preferably having from 0 to 20 carbon atoms, still preferably from 0 to 16 carbon atoms and particularly preferably from 0 to 12 carbon atoms, such as sulfamoyl, methylsulfamoyl, dimethylsulfamoyl and phenylsulfamoyl), carbamoyl groups (preferably having from 1 to 20 carbon atoms, still preferably from 1 to 16 carbon atoms and particularly preferably from 1 to 12 carbon atoms, such as carbamoyl, methylcarbamoyl, diethylcarbamoyl and phenylcarbamoyl), alkylthio groups (preferably having from 1 to 20 carbon atoms, still preferably from 1 to 16 carbon atoms and particularly preferably from 1 to 12 carbon atoms, such as methylthio and ethylthio), arylthio groups (preferably having from 6 to 20 carbon atoms, still preferably from 6 to 16 carbon atoms and particularly preferably from 6 to 12 carbon atoms, such as phenylthio), sulfonyl groups (preferably having from 1 to 20 carbon atoms, still preferably from 1 to 16 carbon atoms and particularly preferably from 1 to 12 carbon atoms, such as mesyl and tosyl), sulfinyl groups (preferably having from 1 to 20 carbon atoms, still preferably from 1 to 16 carbon atoms and particularly preferably from 1 to 12 carbon atoms, such as methanesulfinyl and benzenesulfinyl), ureido groups (preferably having from 1 to 20 carbon atoms, still preferably from 1 to 16 carbon atoms and particularly preferably from 1 to 12 carbon atoms, such as ureido, methylureido and phenylureido), phosphoramido groups (preferably having from 1 to 20 carbon atoms, still preferably from 1 to 16 carbon atoms and particularly preferably from 1 to 12 carbon atoms, such as diethylphosphoramido and phenylphosphoramido), hydroxy group, mercapto group, halogen atoms (for example, fluorine atom, chlorine atom, bromine atom and iodine atom), cyano group, sulfo group, carboxyl group, nitro group, hydroxamate group, sulfino group, hydrazino group, imino group, heterocyclic groups (preferably having from 1 to 30 carbon atoms, still preferably from 1 to 12 carbon atoms, and having a nitrogen atom, an oxygen atom or a sulfur atom as a hetero atom, such as imidazolyl, pyridyl, quinolyl, furyl, piperidyl, morpholino, benzoxazolyl, benzimidazolyl and benzthiazolyl), silyl groups (preferably having from 3 to 40 carbon atoms, still preferably from 3 to 30 carbon atoms and particularly preferably from 3 to 24 carbon atoms, such as trimethylsilyl and triphenylsilyl) and so on.

These substituents may be further substituted. In the case of having two or more substituent, the substituents may be either the same or different. If possible, these substituents may be bonded together to from a ring.

Next, the compounds represented by the formula (16) will be illustrated in greater detail by reference to specific examples thereof. However, it is to be understood that the invention is not restricted to these specific examples.

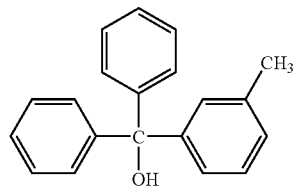
D-1

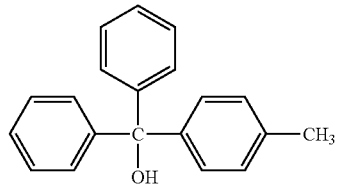
D-2

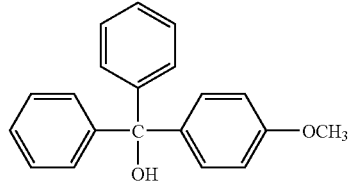
D-3

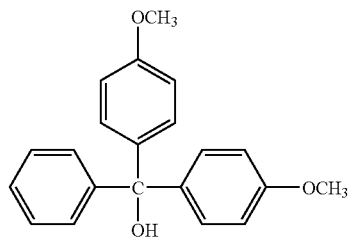
D-4

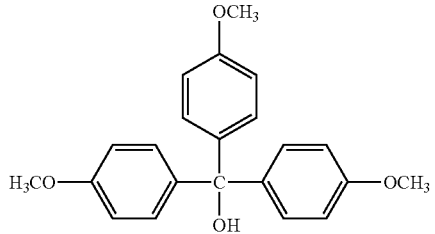
D-5

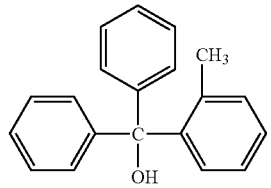
D-6

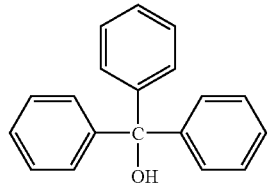
D-7

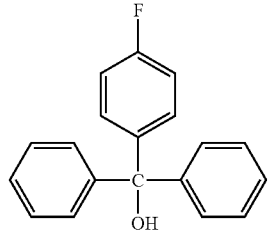
D-8

-continued
D-9
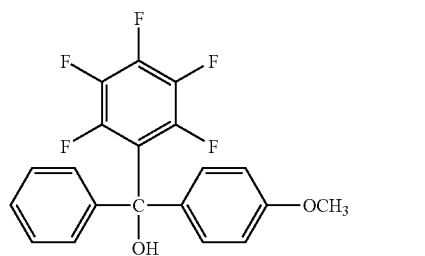
D-10
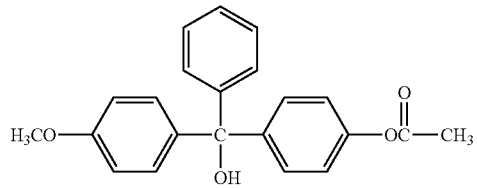
D-11
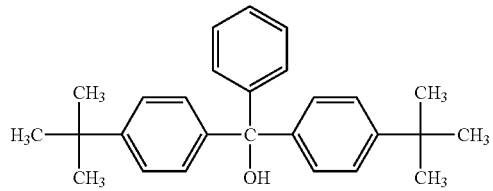
D-12
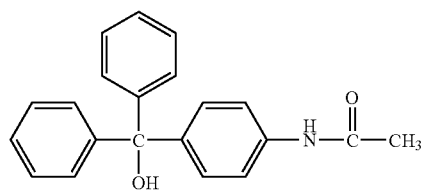
D-13
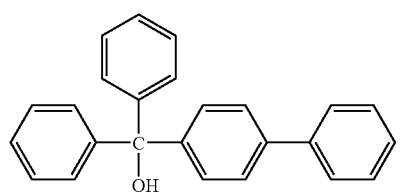
D-14
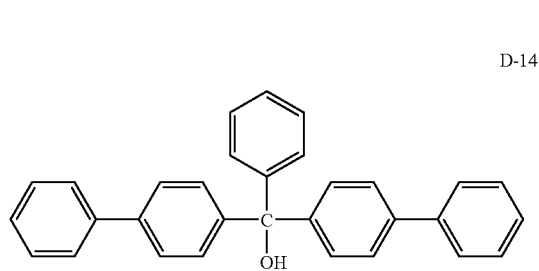
D-15
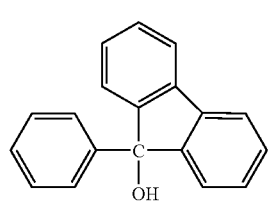
-continued
D-16
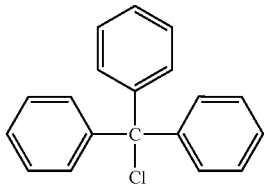
D-17
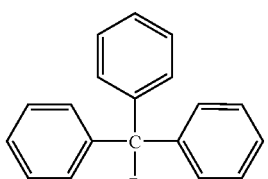
D-18
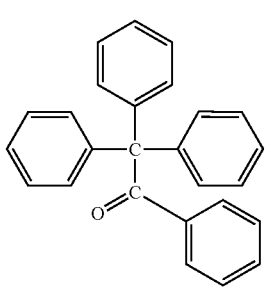
D-19
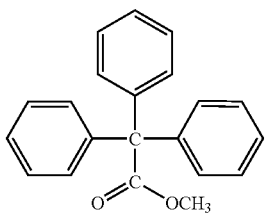
D-20
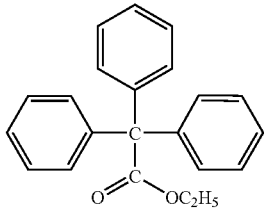
D-21
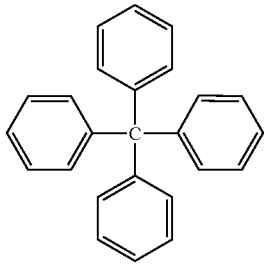
D-22
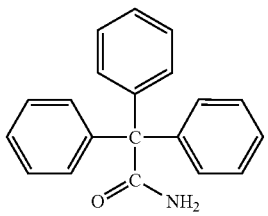

-continued
D-23
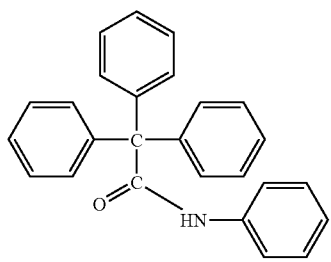
D-24
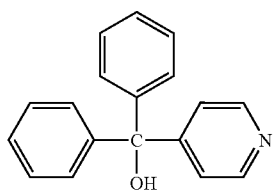
E-1
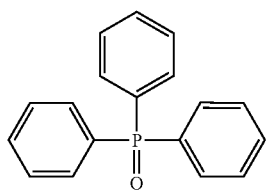
E-2
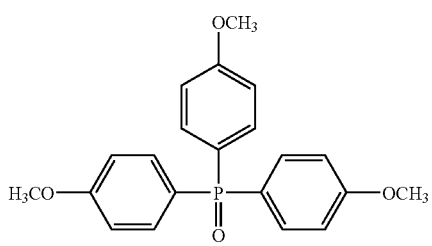
E-3
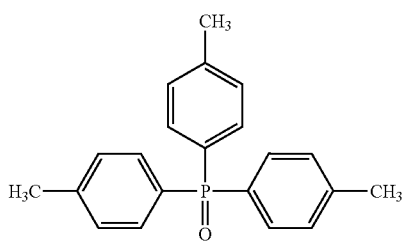
E-4
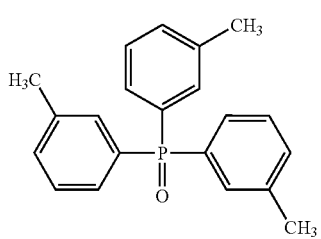
-continued
E-5
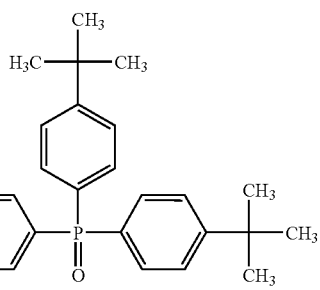
E-6
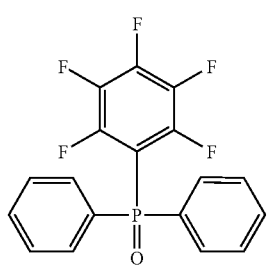
E-7
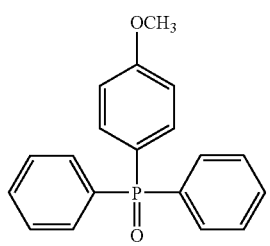
E-8
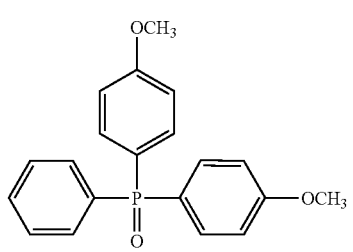
E-9
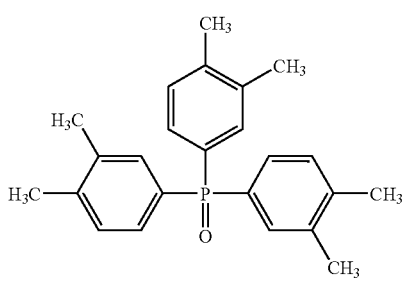
E-10
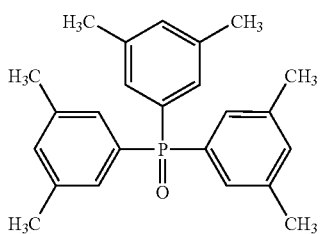

-continued
E-11
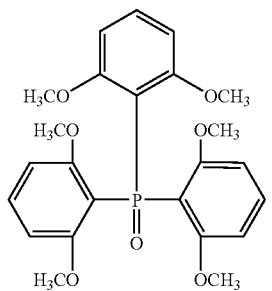
E-12
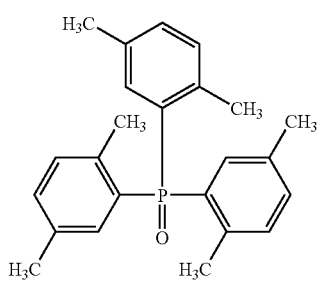
E-13
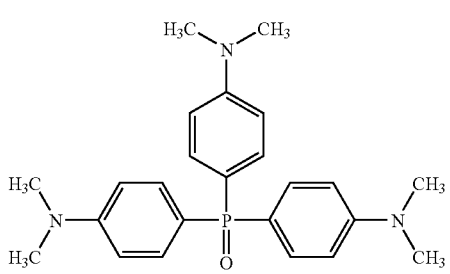
E-14
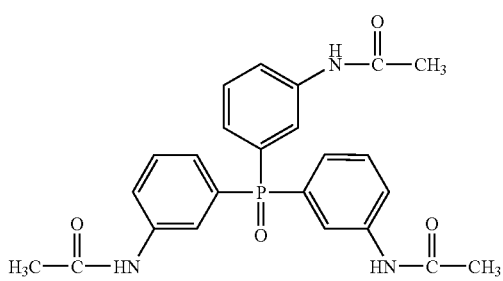
E-15
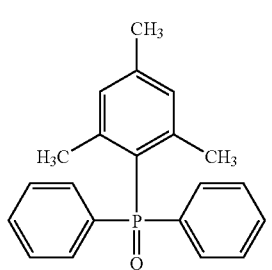
-continued
E-16
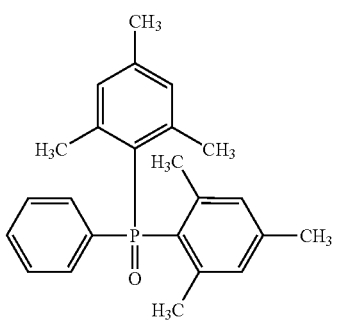
E-17
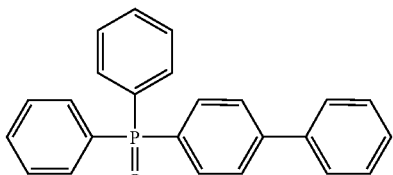
E-18
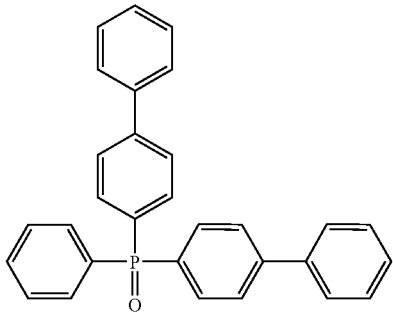
E-19
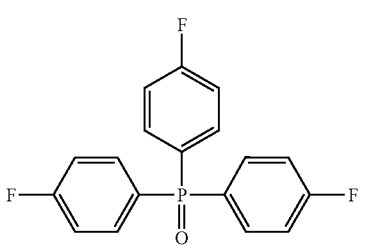
E-20
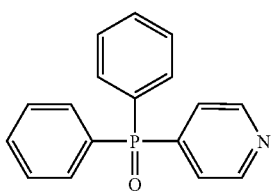
E-21
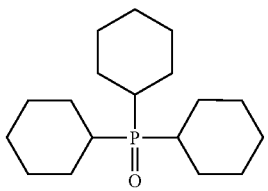

E-22 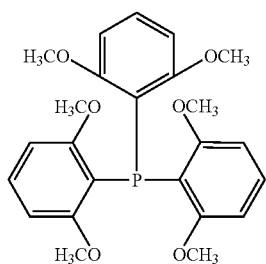
E-23 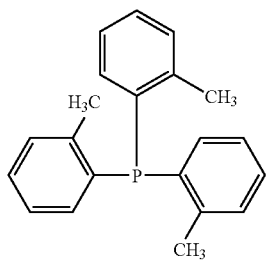
E-24 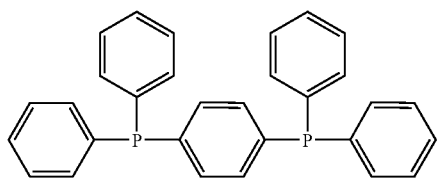
E-25 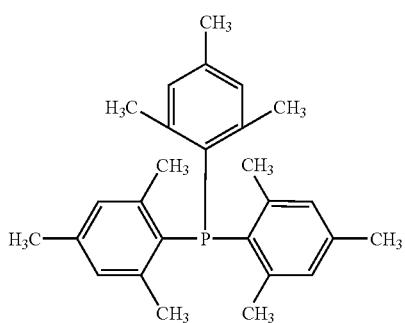
E-26 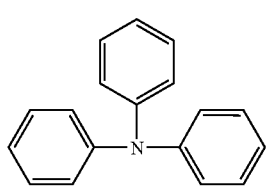
E-27 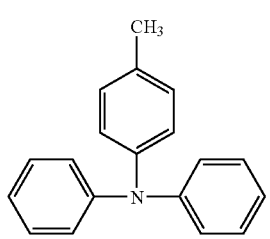
E-28 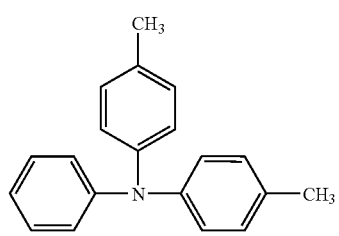
E-29 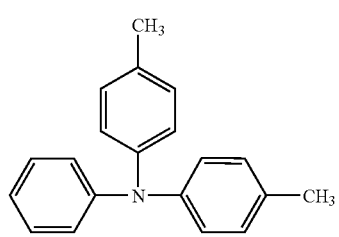
E-30 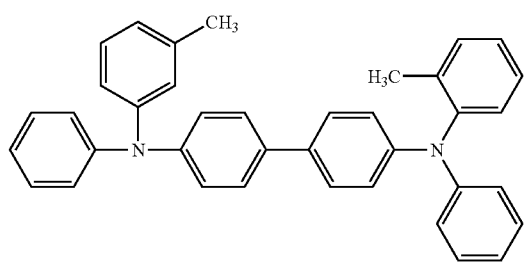
E-31 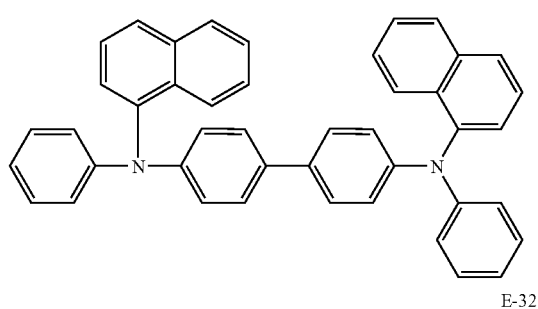
E-32 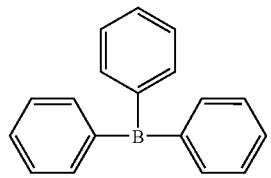
Next, preferable examples of the compounds represented by the formula (16) or the formula (19) will be illustrated. However, it is to be understood that the invention is not restricted to these specific examples.
FA-1 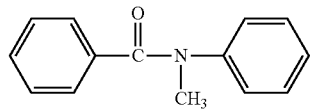

FA-2
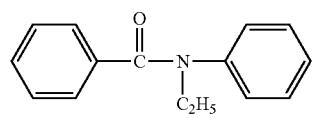
FA-3
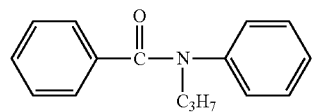
FA-4
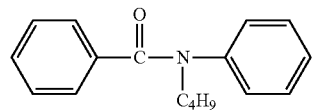
FA-5
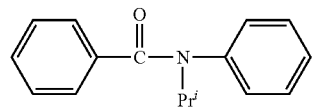
FA-6
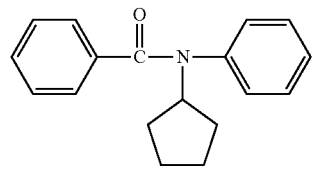
FA-7
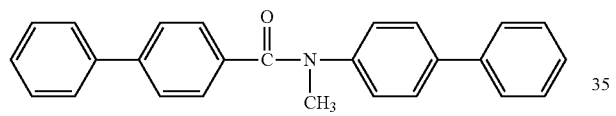
FA-8
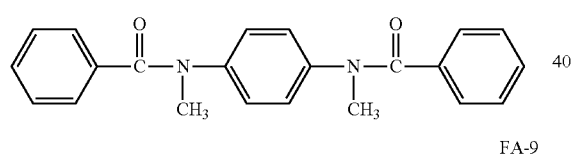
FA-9
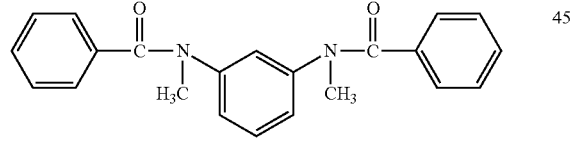
FA-10
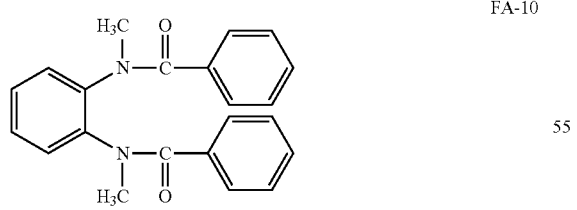
FA-11
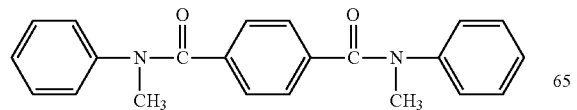
FA-12
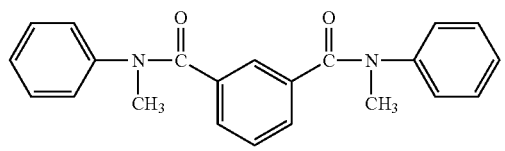
FA-13
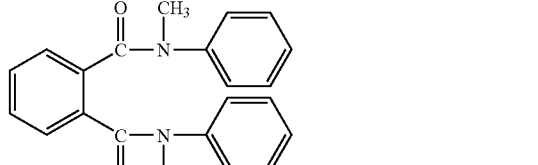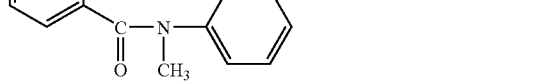
FA-14
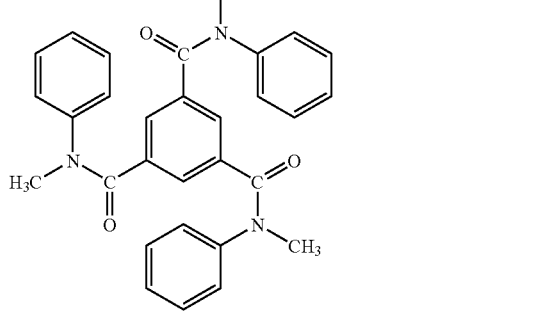
FA-15
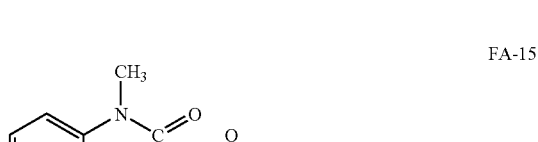
FA-16
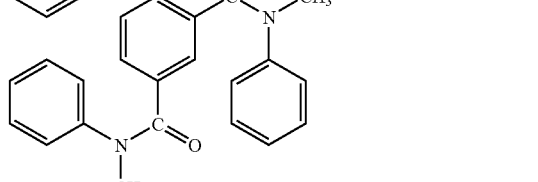
FA-17
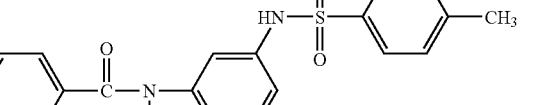
FA-18

FA-19
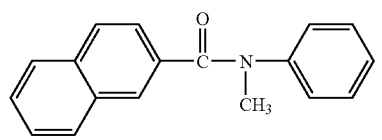
FA-20
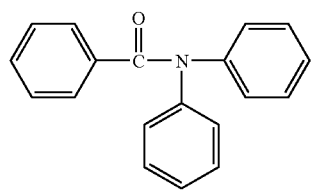
FA-21
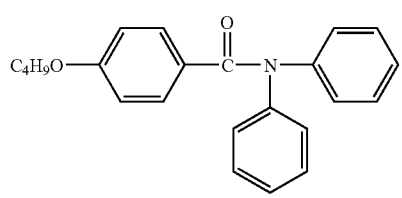
FA-22
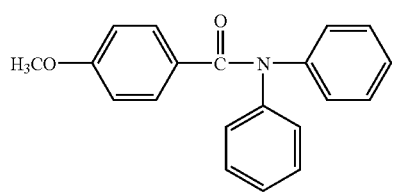
FA-23
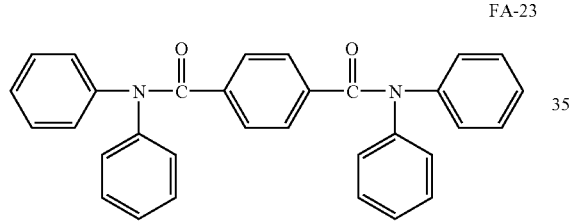
FA-24
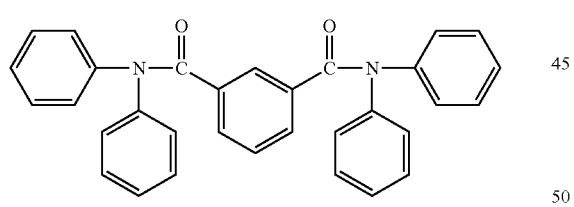
FA-25
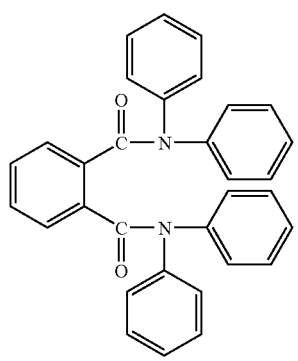
FA-26
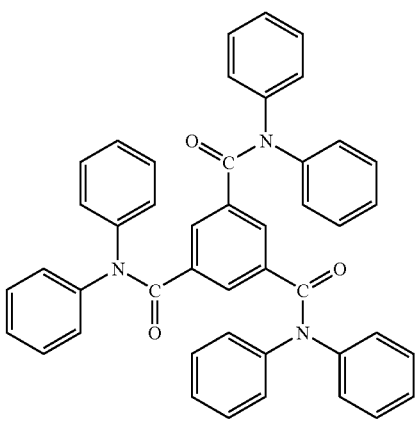
FA-27
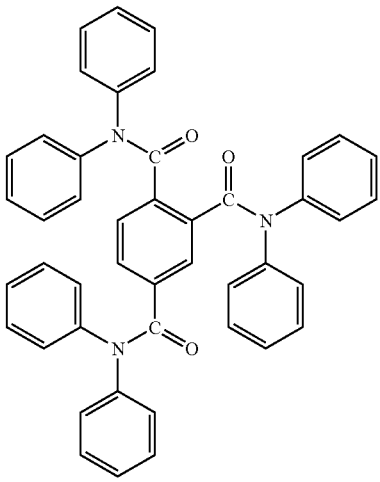
FA-28
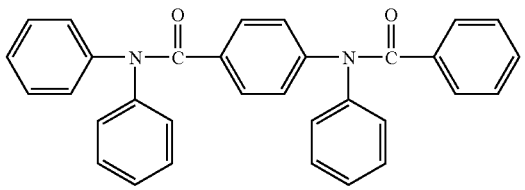
FB-1
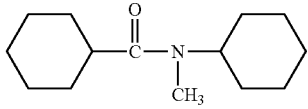
FB-2
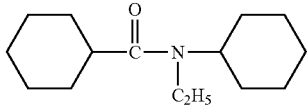
FB-3
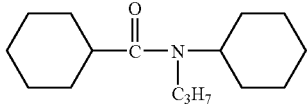
FB-4
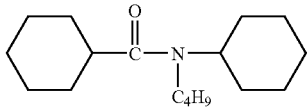

FB-5
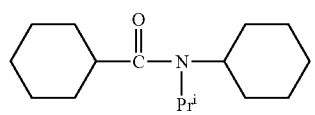
FB-6
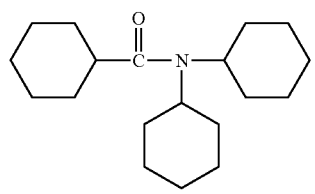
FB-7
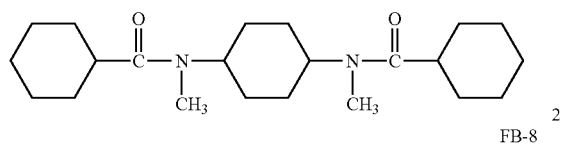
FB-8
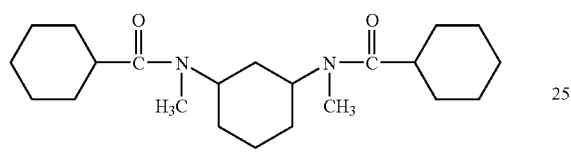
FB-9
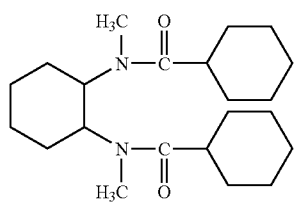
FB-10
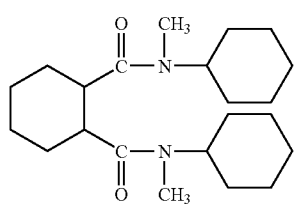
FB-11
FB-12
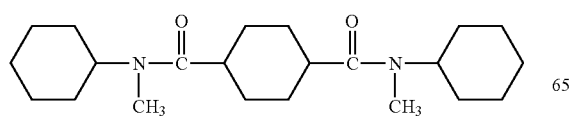
FB-13
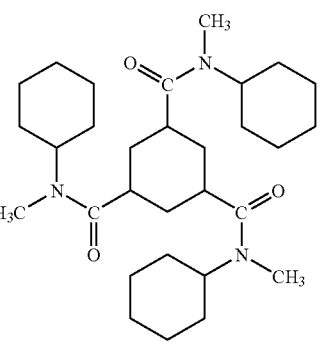
FB-14
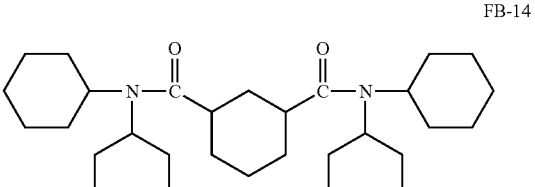
FB-15
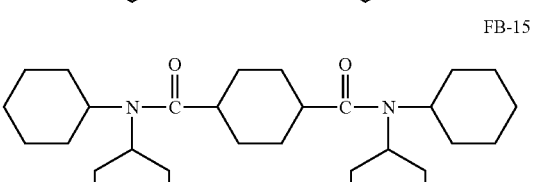
FB-16
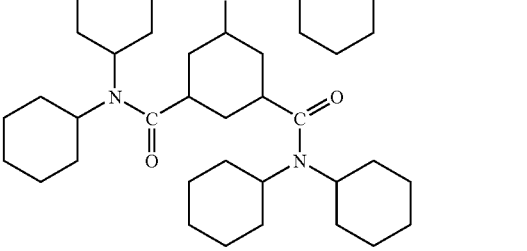
FB-17
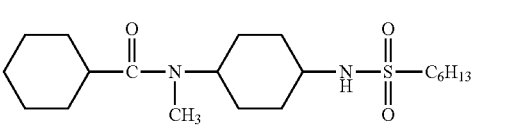
FB-18
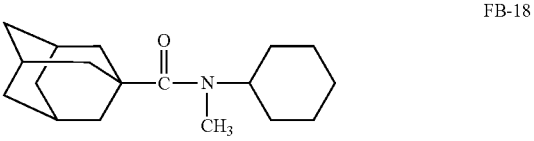
FB-19
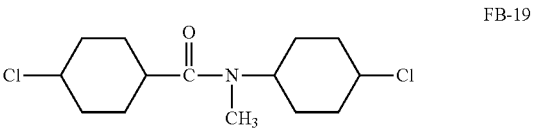

-continued
FB-20
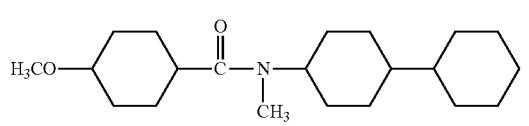
FB-21
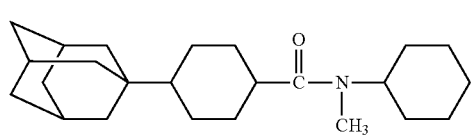
FB-22
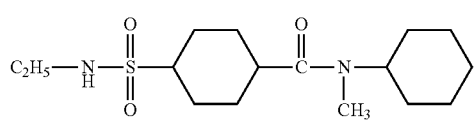
FB-23
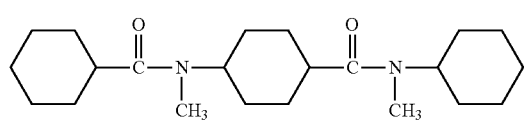
FB-24
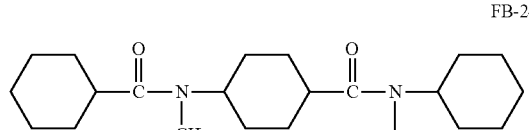
FC-1
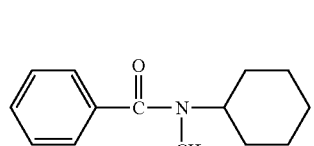
FC-2
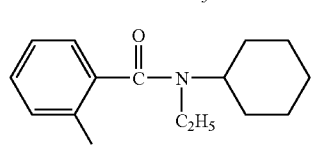
FC-3
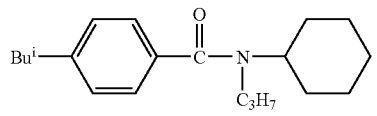
FC-4
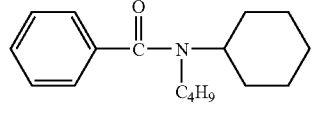
FC-5
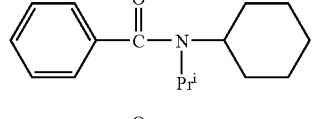
FA-6
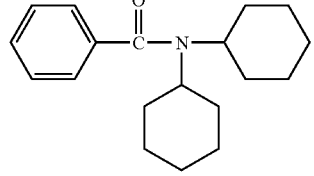
-continued
FC-7
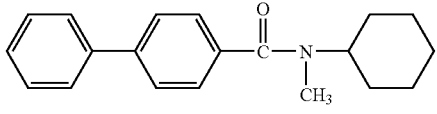
FC-8
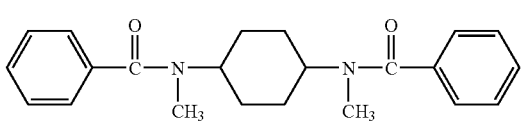
FC-9
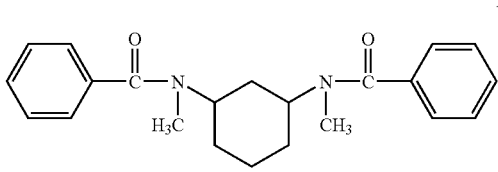
FC-10
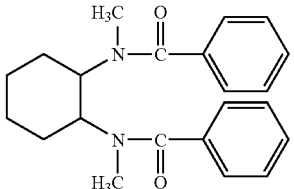
FC-11
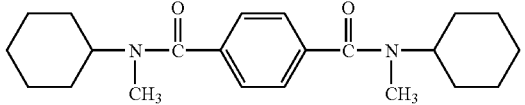
FC-12
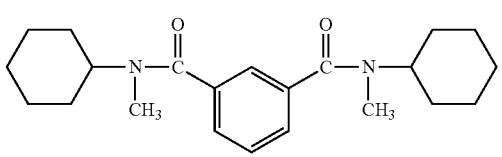
FC-13
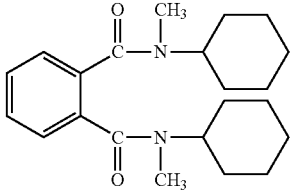
FC-14
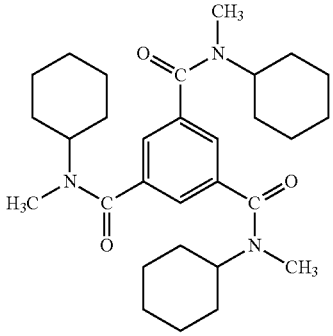

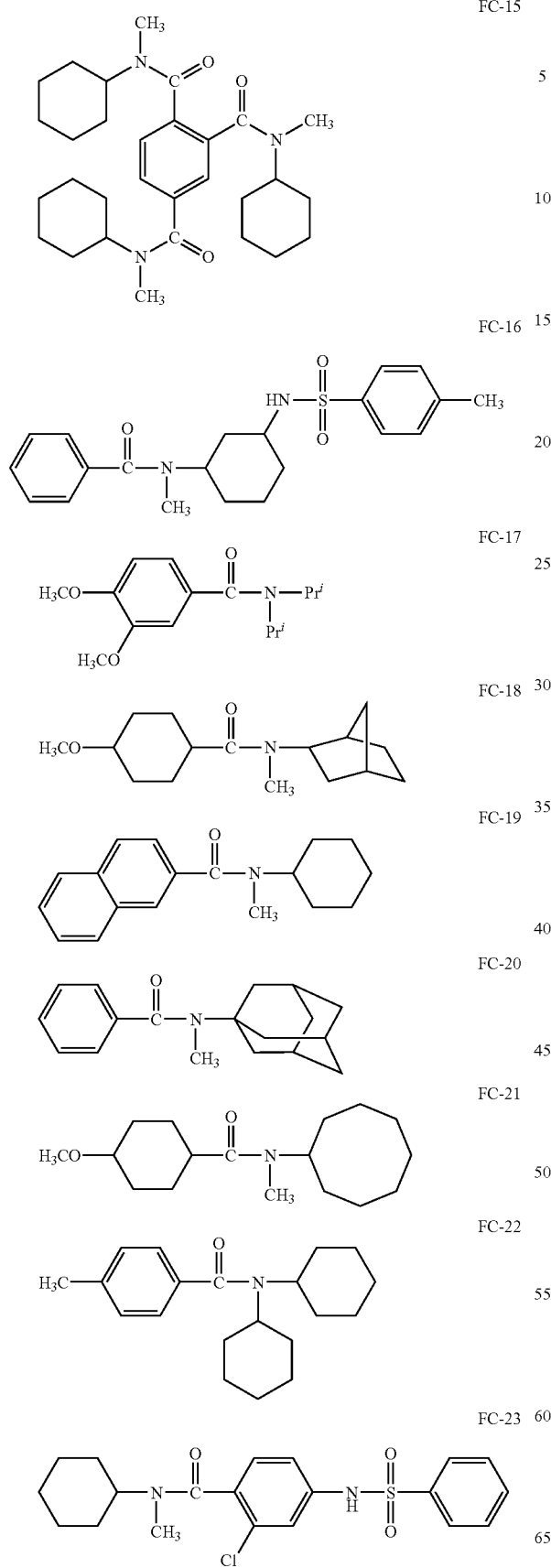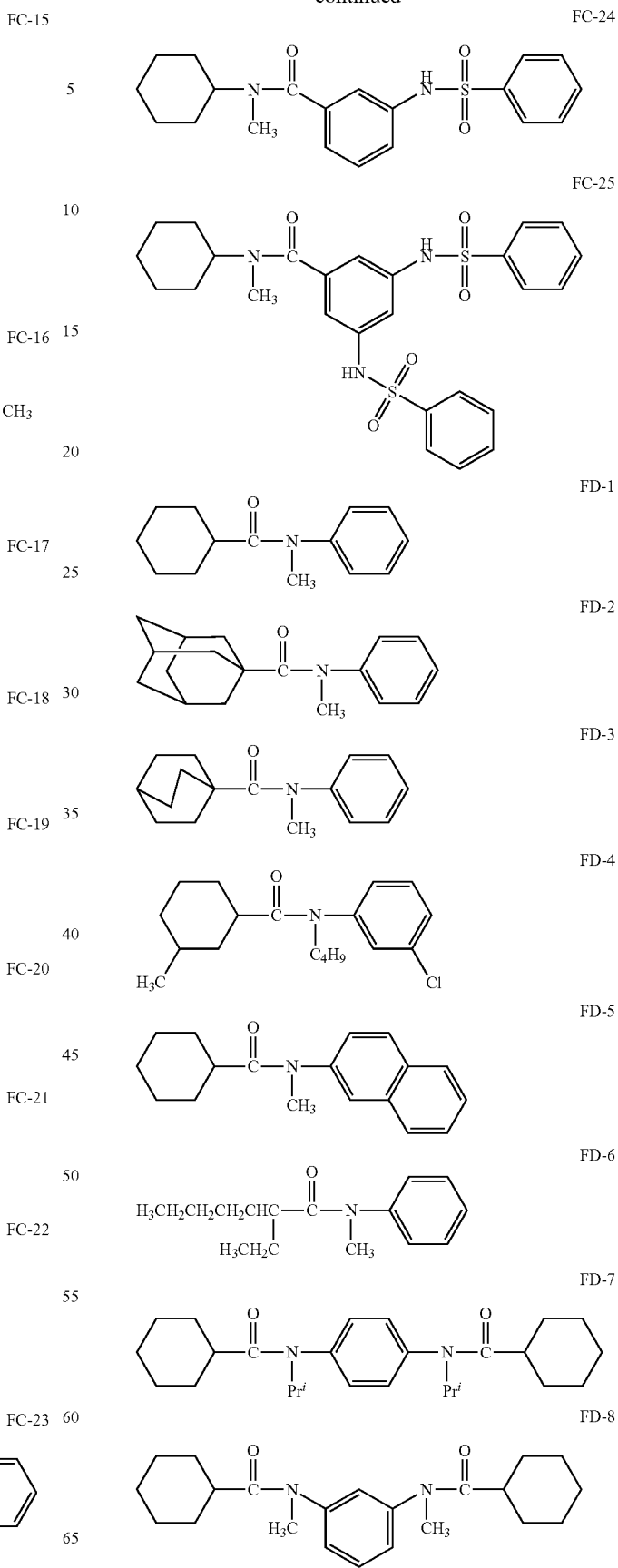

FD-9
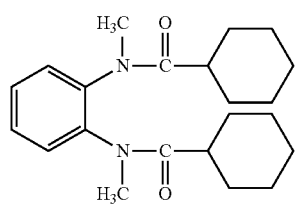
FD-10
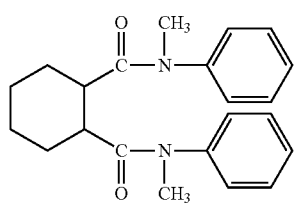
FD-11
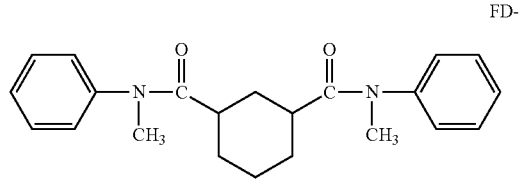
FD-12
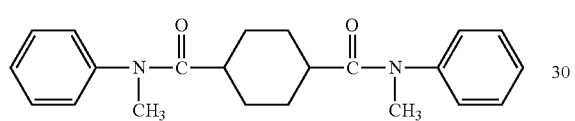
FD-13
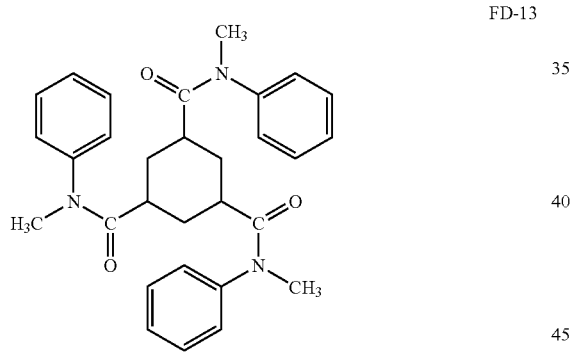
FD-14
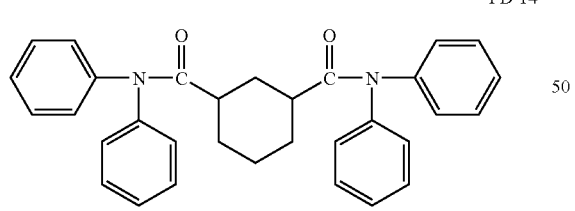
FD-15
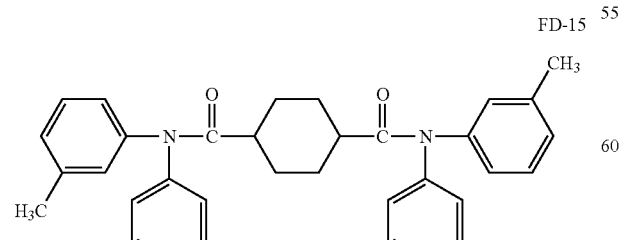
FD-16
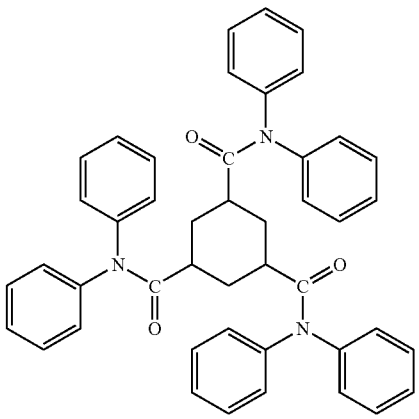
FD-17
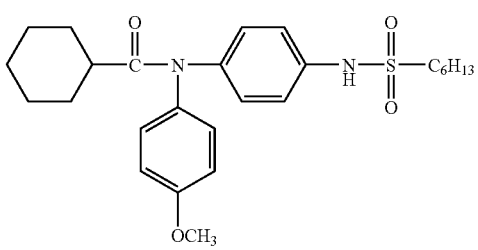
FD-18
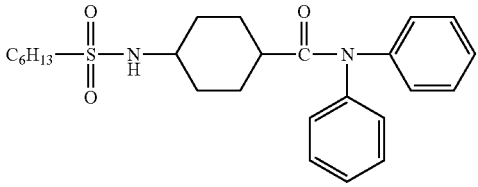
FD-19
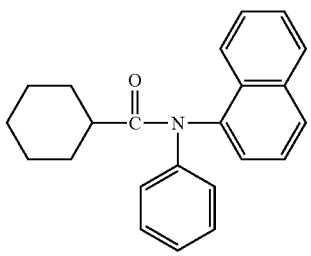
FD-20
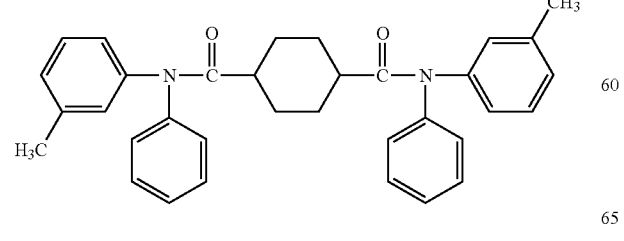

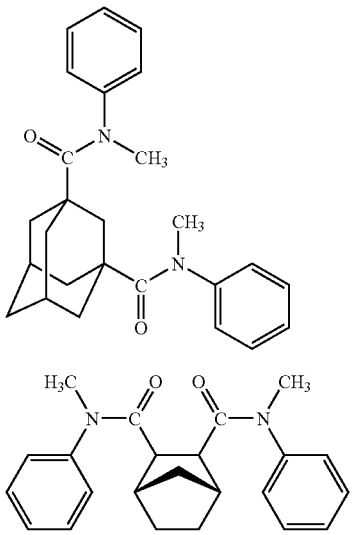

Next, examples of the Rth-lowering compound having an octanol-water partition coefficient (logP value) of from 0 to 7 will be presented, though the invention is not restricted to these specific examples.

(Polyhydric Alcohol Ester Compound)

A polyhydric alcohol ester compound is an ester of a dihydric or higher alcohol with one or more monocarboxylic acids. Next, examples of the polyhydric alcohol ester compound will be presented, though the invention is not restricted to these specific examples.

(Polyhydric Alcohol)

Preferable examples of the polyhydric alcohol include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, xylitol and so on. Particularly preferable examples thereof are triethylene glycol, tetraethylene glycol, dipropylene glycol, tripropylene glycol, sorbitol, trimethylolpropane and xylitol.

(Monocarboxylic Acid)

As the monocarboxylic acid in the polyhydric alcohol esters, use can be made of publicly known aliphatic monocarboxylic acids, alicyclic monocarboxylic acids, aromatic monocarboxylic acids and so on, without particular restriction. It is preferable to employ an alicyclic monocarboxylic acid or an aromatic monocarboxylic acid from the viewpoint of improving the vapor transmission rate, moisture content and retention of the cellulose acylate film.

Next, preferable examples of the monocarboxylic acid will be presented, though the invention is not restricted thereto.

As the aliphatic monocarboxylic acid, use may be preferably made of a chain type or branched fatty acid having from 1 to 32 carbon atoms, still preferably from 1 to 20 carbon atoms and particularly preferably from 1 to 10 carbon atoms. It is preferable to use acetic acid so as to improve the compatibility with the cellulose ester. It is also preferable to use a mixture of acetic acid with other monocarboxylic acids.

Preferable examples of the aliphatic monocarboxylic acid include saturated fatty acids such as acetic acid, propionic acid, butyric acid, valeric acid, caproic acid, enanthic acid, pelargonic acid, caprylic acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid, unsaturated fatty acids such as undecylenic acid, oleic acid, sorbic acid, linoleic acid, linolenic acid and arachidonic acid and so on. These fatty acids may have a substituent.

Preferable examples of the alicyclic monocarboxylic acid include cyclopentanecarboxylic acid, cyclohexanecarboxylic acid, cyclooctanecarboxylic acid and derivatives thereof.

Preferable examples of the aromatic monocarboxylic acid include benzoic acid, benzoic acid derivatives having an alkyl group introduced into the benzene ring such as toluic acid, aromatic monocarboxylic acids having two or more benzene rings such as biphenylcarboxylic acid, naphthalenecarboxylic acid and tetralincarboxylic acid and derivatives thereof. Among all, benzoic acid is preferable.

In the polyhydric alcohol ester, either a carboxylic acid or a mixture of two or more thereof may be used. OH groups in the polyhydric alcohol may be entirely esterified. Alternatively, some of them may remain as —OH groups. It is preferable that the polyhydric alcohol ester has three or more aromatic or cycloalkyl rings per molecule.

Now, examples of the polyhydric alcohol ester compounds will be presented, though the invention is not restricted to them.

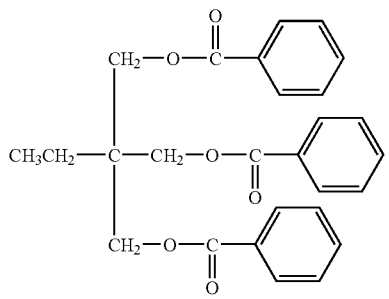

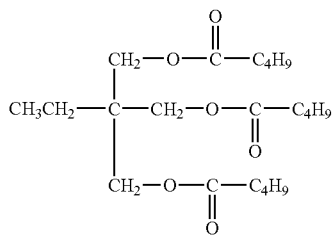

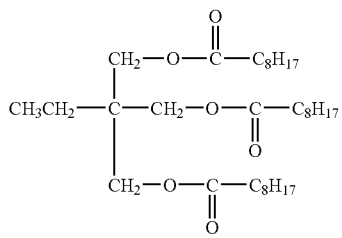

-continued

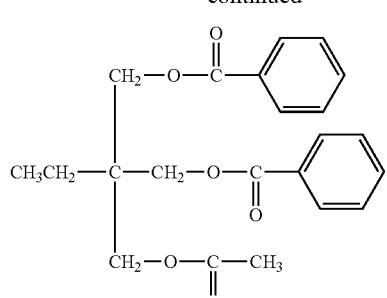

I-4

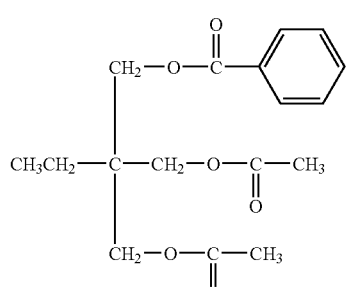

I-5

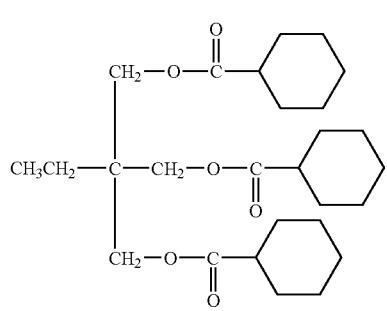

I-6

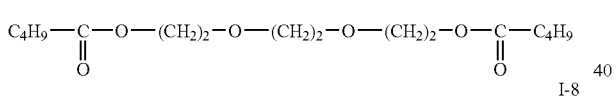

I-7

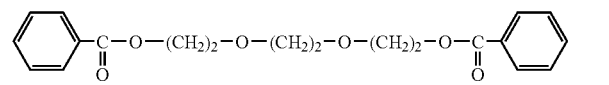

I-8

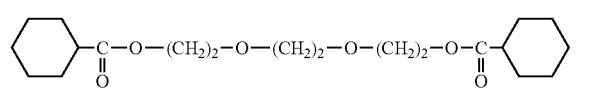

I-9

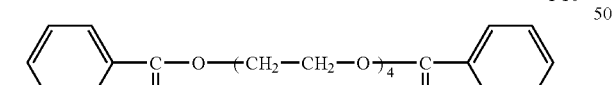

I-10

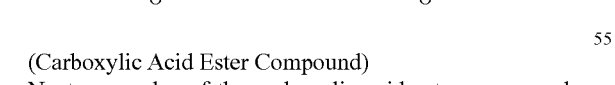

(Carboxylic Acid Ester Compound)

Next, examples of the carboxylic acid ester compounds will be presented. However, the invention is not restricted to them. Namely, specific examples thereof include phthalic acid esters, citric acid esters and so on. Examples of the phthalic acid esters include dimethyl phthalate, diethyl phthalate, dicyclohexyl phthalate, dioctyl phthalate, diethylhexyl phthalate and so on. Examples of the citric acid esters include acetyltriethyl citrate and acetyltributyl citrate. In addition, butyl oleate, methylacetyl licinolate, dibutyl sebacate, triacetin, trimethylolpropane tribenzoate and so on may be cited. Furthermore, use can be preferably made of alkyl phthalyl alkyl glycolates for this purpose. Alkyls in the alkyl phthalyl alkyl glycolates are alkyl groups having from 1 to 8 carbon atoms. Examples of the alkyl phthalyl alkyl glycolates include methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, propyl phthalyl ethyl glycolate, methyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate, methyl phthalyl ethyl glycolate and so on. It is preferable to use methyl phthalyl methyl glycolate, ethyl phthalyl ethyl glycolate, propyl phthalyl propyl glycolate, butyl phthalyl butyl glycolate or octyl phthalyl octyl glycolate. Ethyl phthalyl ethyl glycolate is particularly preferred. Use may be also made of a mixture of two or more of these alkyl phthalyl alkyl glycolates.

Next, examples of the carboxylic acid ester compounds will be presented. However, the invention is not restricted to them.

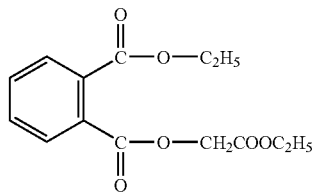

J-1

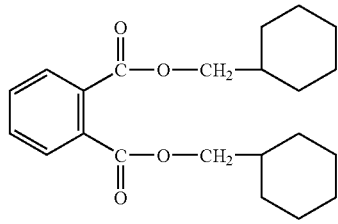

J-2

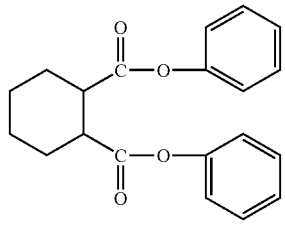

J-3

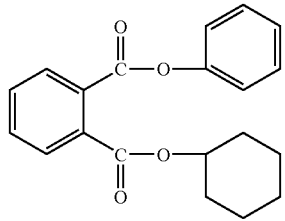

J-4

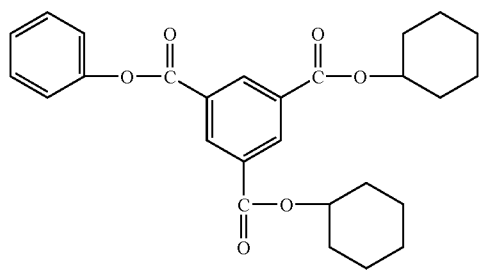

J-5

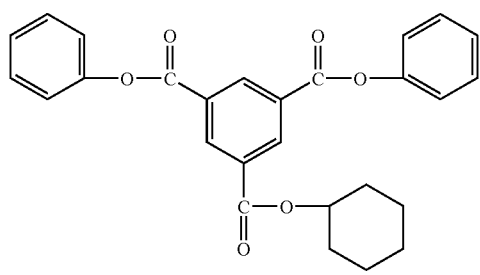

J-6

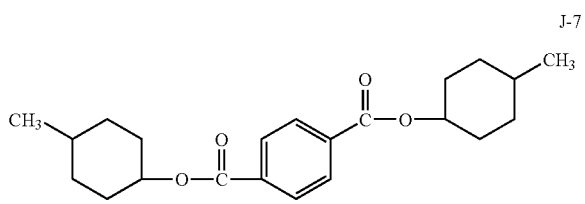

J-7

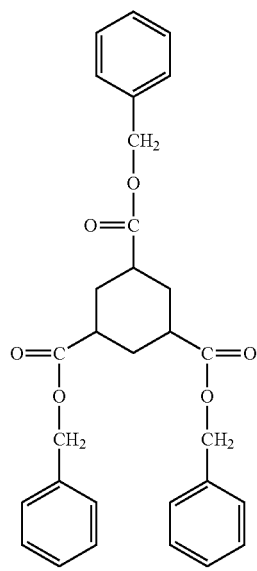

J-8

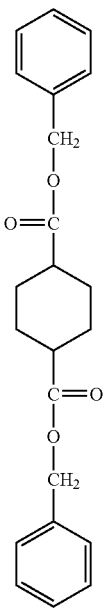

J-9

(Polycyclic Carboxylic Acid Compound)

It is preferable that the polycyclic carboxylic acid compound to be used in the invention has a molecular weight of 3000 or less, still preferably from 250 to 2000. Concerning the cyclic structure, it is preferable that a ring is composed of from 3 to 8 atoms and a 6-membered ring and/or a 5-membered ring are still preferred, though the ring size is not particularly restricted. These rings may further contain carbon, oxygen, nitrogen, silicon or other atoms. A ring may have an unsaturated bond as a part thereof. For example, the 6-membered ring may be a benzene ring or a cyclohexane ring. The compound to be used in the invention has a plural number of these cyclic structures. That is, use may be made of a compound having a benzene ring and a cyclohexane ring both in a single molecule, a compound having two cyclohexane rings, a naphthalene derivative, an anthracene derivative or the like. It is still preferable to use a compound having three or more such cyclic structures per molecule. It is also preferable that at least one of the cyclic structures has no unsaturated bond. Typical examples thereof include abietic acid and abietic acid derivatives such as dehdyroabietic acid and palustric acid. Next, chemical formulae of these compounds will be presented, though the invention is not restricted thereto.

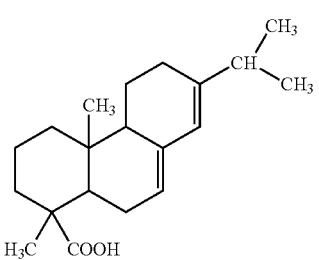

K-1

K-2 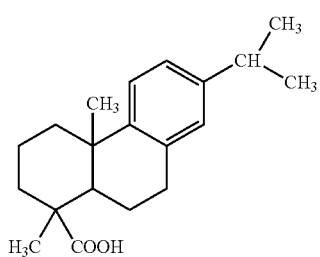

K-3 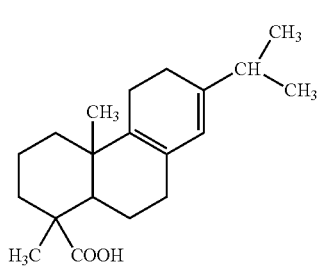

K-4 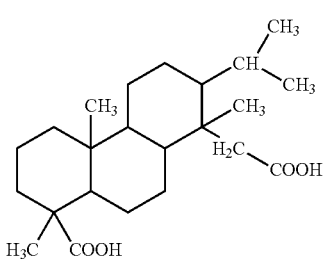

K-5 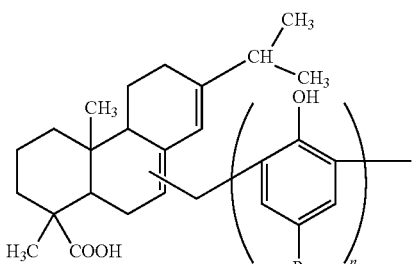

(Bisphenol Derivative)

The bisphenol derivative to be used in the invention preferably has a molecular weight of 10000 or less. Either a monomer, an oligomer or a polymer may be used within this range. Moreover, use may be made of a copolymer with another polymer or a compound modified with a reactive substituent at the terminus. Next, examples of the carboxylic acid ester compounds will be presented. However, the invention is not restricted to them.

L-1 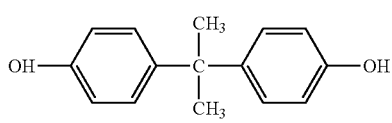

L-2 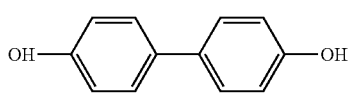

L-3 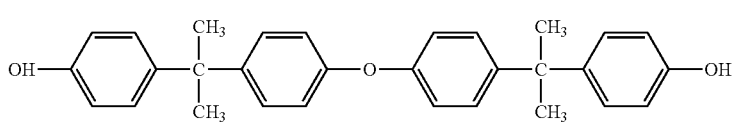

L-4 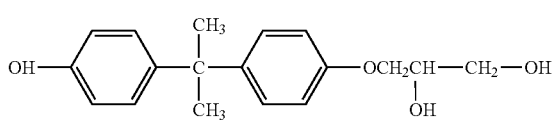

L-5 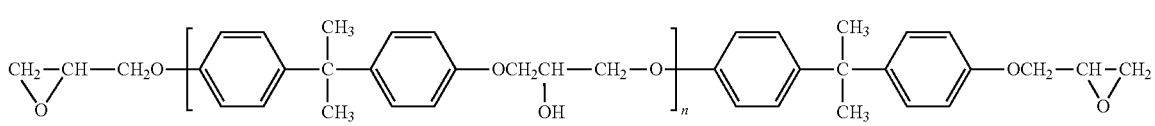

L-6 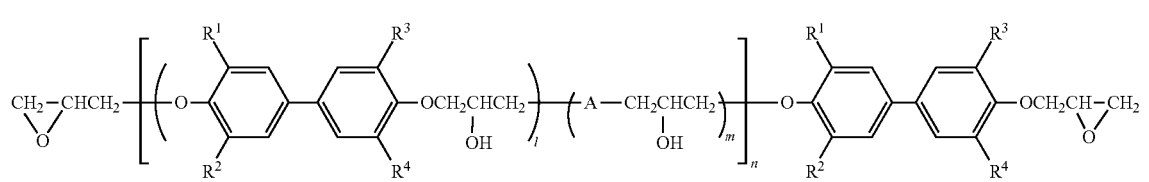

In the above examples of the bisphenol derivative, $R^1$ to $R^4$ represent each a hydrogen atom or an alkyl group having form 1 to 10 carbon atoms. 1, in and n represent each the number of the corresponding repeating unit. It is preferable that 1, in and n are each an integer of from 1 to 100, still preferably from 1 to 20, though the invention is not restricted thereto.

[Wavelength Dispersion Regulator]

Next, a compound lessening wavelength dispersion of the cellulose acylate film according to the invention (hereinafter referred to as a wavelength dispersion regulator) will be illustrated. To improve the wavelength dispersion of Rth of the cellulose acylate film, it is preferable to add at least one compound lowering the wavelength dispersion of Rth (ΔRth) represented by the following formula (XXI) within a range of fulfilling the following formulae (XKX) and (XX).

$$(\Delta Rth(B) - \Delta Rth(0))/B \leq -2.0 \qquad (XIX)$$

$$0.01 \leq B \leq 30 \qquad (XX)$$

$$\Delta Rth = |Rth_{(400)} - Rth_{(700)}| \qquad (XXI)$$

In the above formulae, ΔRth(B) is ΔRth (nm) of a film containing B % of the compound lowering ΔRth. ΔRth(0) is ΔRth (nm) of a film containing no compound lowering ΔRth. B is the mass (%) of the compound referring the mass of the polymer employed as the film material as to 100.

Concerning the above formulae (XIX) and (XX), it is still preferable:

$$(\Delta Rth(B) - \Delta Rth(0))/B \leq -3.0 \qquad (XXII)$$

$$0.05 \leq B \leq 25; \qquad (XXIII)$$

and it is still preferable:

$$(\Delta Rth(B) - \Delta Rth(0))/B \leq -4.0 \qquad (XXIV)$$

$$0.1 \leq B \leq 20. \qquad (XXV)$$

The wavelength dispersion regulator as described above has an absorption in an ultraviolet region of 200 to 400 nm. By adding the wavelength dispersion regulator in an amount of form 0.01 to 30% by mass based on the solid cellulose acylate content, the wavelength dispersion of Re and Rth of the cellulose acylate film can be controlled.

In general, the Re and Rth values of a cellulose acylate film are larger in the long wavelength side than in the short wavelength side. It is therefore required to smoothen the wavelength dispersion by enlarging the Re and Rth values, which are relatively small, in the short wavelength side. On the other hand, a compound having an absorption in an ultraviolet region of 200 to 400 nm have wavelength dispersion characteristics wherein the absorbance in the long wavelength side is larger than that in the short wavelength side. In the case where such a compound per se is isotropically present within the cellulose acylate film, it appears that the double refractive properties and, in its turn, the wavelength dispersions of Re and Rth are larger in the short wavelength side similar to the wavelength dispersion of the absorbance.

By using a compound having an absorption in an ultraviolet region of 200 to 400 urn and seemingly showing larger wavelength dispersions of Re and Rth in the short wavelength side as discussed above, the wavelength dispersion of the cellulose acylate film can be regulated. For this purpose, it is required that the compound for regulating wavelength dispersion is sufficiently and uniformly compatible with cellulose acylate. The absorption zone in the ultraviolet region of such a compound preferably ranges from 200 to 400 nm, still preferably 220 to 395 nm and still preferably form 240 to 390 nm.

In recent years, optical members having excellent transmittance are needed in liquid crystal display units for TV sets, laptops mobile phones and the like so as to elevate luminance at a small electrical power. In the case of adding a compound having an absorption in an ultraviolet region of 200 to 400 nm and being capable of lowering $|Re_{(400)} - Re_{(700)}|$ and $|Rth_{(400)} - Rth_{(700)}|$ of a cellulose acylate film, it is required from this viewpoint that the compound has an excellent spectral transmittance. In the cellulose acylate film according to the invention, it is desirable that the spectral transmittance at the wavelength of 380 nm is 45% or more but not more than 95% and the spectral transmittance at the wavelength of 350 nm is 10% or less.

From the viewpoint of vaporization properties, the molecular weight of the wavelength dispersion regulator preferably usable in the invention as described above preferably ranges from 250 to 1000, still preferably from 260 to 800, still preferably from 270 to 800 and particularly preferably from 300 to 800. So long as the molecular weight falls within this range, use may be made of either a specific monomer structure or an oligomer structure or a polymer structure having a plural number of such monomer units bonded together.

It is favorable that the wavelength dispersion regulator would not vaporize in the course of dope casting and drying in the production of the cellulose acylate film.

(Addition Level of Compound)

The wavelength dispersion regulator preferably employed in the invention is added preferably in an amount of from 0.01 to 30% by mass, still preferably from 0.1 to 20% by mass and particularly preferably from 0.2 to 10% by mass based on solid cellulose acylate content.

(Method of Adding Compound)

As the wavelength dispersion regulator, a single compound may be used. Alternatively, use can be made of a mixture of two or more compounds at an arbitrary ratio.

The wavelength dispersion regulator may be added at any step during the production of a dope. It may be added at the final sate of the dope preparation step.

Specific examples of the wavelength dispersion regulator preferably usable in the invention include benzotriazole compounds, benzophenone compounds, cayno-containing compounds, oxobenzophenone compounds, salicylic acid ester compounds, nickel complex salt compounds and so on, though the invention is not restricted to these compounds.

As the benzotriazole compounds, those represented by the formula (101) are preferably usable as the wavelength dispersion regulator in the invention.

$Q^1\text{-}Q^2\text{-OH}$            Formula (101)

In the above formulae, $Q^1$ represents a nitrogen-containing aromatic heterocycle, while $Q^2$ represents an aromatic ring.

$Q^1$ represents a nitrogen-containing aromatic heterocycle, preferably a 5- to 7-membered nitrogen-containing aromatic heterocycle and still preferably a 5- or 6-membered nitrogen-containing aromatic heterocycle such as imidazole, pyrazole, triazole, tetrazole, thiazole oxazole, selenazole, benzotriazole, benzothiazole, benzoxazole, benzoselenazole, thiadiazole, oxadiazole, naphthothiazole, naphtooxazole, azabenzimidazole, purine, pyridine, pyrazine, pyrimidine, pyridazine, triazine, triazaindene, tetrazaindene and so on. Still preferably, $Q^1$ represents a 5-membered nitrogen-containing aromatic heterocycle such as imidazole, pyrazole, triazole, tetrazole, thiazole, oxazole, benzotriazole, benzothiazole, benzoxazole, thiadiazole or oxadiazole, and benzotriazole is particularly preferable.

The nitrogen-containing aromatic heterocycle represented by $Q^1$ may have a substituent and examples of the substituent include the substituent T which will be described hereinafter. In the case of having a plural number of substituents, these substituents may be fused together to form an additional ring.

The aromatic ring represented by $Q^2$ may be either an aromatic hydrocarbon ring or an aromatic heterocycle. It may be a single ring or it may form a fused ring together with another ring.

Preferable examples of the aromatic hydrocarbon ring include monocyclic or bicyclic aromatic hydrocarbon rings having from 6 to 30 carbon atoms (for example, benzene ring, naphthalene ring and so on), still preferably an aromatic hydrocarbon ring having from 6 to 20 carbon atoms and still preferably an aromatic hydrocarbon ring having from 6 to 12 carbon atoms. A benzene ring is the most desirable one.

Preferable examples of the aromatic heterocycle include nitrogen atom-containing or sulfur atom-containing aromatic heterocycles. Specific examples of the heterocycle include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthridine, phenazine, tetrazole, benzimidazole, benzoxazole, benzthiazole, benzotriazole, tetrazaindene and so on. Preferable examples of the aromatic heterocycles include pyridine, triazine and quinoline.

The aromatic ring represented by $Q^2$ is preferably an aromatic hydrocarbon ring, still preferably a naphthalene ring or a benzene ring and particularly preferably a benzene ring. $Q^2$ may have a substituent and examples of the substituent include the substituent T which will be described hereinafter.

Examples of the substituent T include alkyl groups (preferably having from 1 to 20 carbon atoms, still preferably from 1 to 12 carbon atoms and particularly preferably from 1 to 8 carbon atoms, such as methyl, ethyl, isopropyl, tert-butyl, n-octyl, n-decyl, n-hexadecyl, cyclopropyl, cyclopentyl and cyclohexyl), alkenyl groups (preferably having from 2 to 20 carbon atoms, still preferably from 2 to 12 carbon atoms and particularly preferably from 2 to 8 carbon atoms, such as vinyl, allyl, 2-butenyl and s-pentenyl), alkynyl groups (preferably having from 2 to 20 carbon atoms, still preferably from 2 to 12 carbon atoms and particularly preferably from 2 to 8 carbon atoms, such as propargyl and 3-pentynyl), aryl groups (preferably having from 6 to 30 carbon atoms, still preferably from 6 to 20 carbon atoms and particularly preferably from 6 to 12 carbon atoms, such as phenyl, p-methylphenyl and naphthyl), substituted or unsubstituted amino groups (preferably having from 0 to 20 carbon atoms, still preferably from 0 to 10 carbon atoms and particularly preferably from 0 to 6 carbon atoms, such as amino, methylamino, dimethylamino, diethylamino and dibenzylamino), alkoxy groups (preferably having from 1 to 20 carbon atoms, still preferably from 1 to 12 carbon atoms and particularly preferably from 1 to 8 carbon atoms, such as methoxy, ethoxy and butoxy), aryloxy groups (preferably having from 6 to 20 carbon atoms, still preferably from 6 to 16 carbon atoms and particularly preferably from 6 to 12 carbon atoms, such as phenyloxy and 2-naphthyloxy), acyl groups (preferably having from 1 to 20 carbon atoms, still preferably from 1 to 16 carbon atoms and particularly preferably from 1 to 12 carbon atoms, such as acetyl, benzoyl, formyl and pivaloyl), alkoxycarbonyl groups (preferably having from 2 to 20 carbon atoms, still preferably from 2 to 16 carbon atoms and particularly preferably from 2 to 12 carbon atoms, such as methoxycarbonyl and ethoxycarbonyl), aryloxycarbonyl groups (preferably having from 7 to 20 carbon atoms, still preferably from 7 to 16 carbon atoms and particularly preferably from 7 to 10 carbon atoms, such as phenyoxycarbonyl), acyloxy groups (preferably having from 2 to 20 carbon atoms, still preferably from 2 to 16 carbon atoms and particularly preferably from 2 to 10 carbon atoms, such as acetoxy and benzoyloxy), acylamino groups (preferably having from 2 to 20 carbon atoms, still preferably from 2 to 16 carbon atoms and particularly preferably from 2 to 10 carbon atoms, such as acetylamino and benzoylamino), alkoxycarbonylamino groups (preferably having from 2 to 20 carbon atoms, still preferably from 2 to 16 carbon atoms and particularly preferably from 2 to 12 carbon atoms, such as methoxycarbonylamino), aryloxycarbonylamino groups (preferably having from 7 to 20 carbon atoms, still preferably from 7 to 16 carbon atoms and particularly preferably from 7 to 12 carbon atoms, such as phenyloxycarbonylamino), sulfonylamino groups (preferably having from 1 to 20 carbon atoms, still preferably from 1 to 16 carbon atoms and particularly preferably from 1 to 12 carbon atoms, such as methanesulfonylamino and benzenesulfonylamino), sulfamoyl groups (preferably having from 0 to 20 carbon atoms, still preferably from 0 to 16 carbon atoms and particularly preferably from 0 to 12 carbon atoms, such as sulfamoyl, methylsulfamoyl, dimethylsulfamoyl and phenylsulfamoyl), carbamoyl groups (preferably having from 1 to 20 carbon atoms, still preferably from 1 to 16 carbon atoms and particularly preferably from 1 to 12 carbon atoms, such as carbamoyl, methylcarbamoyl, diethylcarbamoyl and phenylcarbamoyl), alkylthio groups (preferably having from 1 to 20 carbon atoms, still preferably from 1 to 16 carbon atoms and particularly preferably from 1 to 12 carbon atoms, such as methylthio and ethylthio), arylthio groups (preferably having from 6 to 20 carbon atoms, still preferably from 6 to 16 carbon atoms and particularly preferably from 6 to 12 carbon atoms, such as phenylthio), sulfonyl groups (preferably having from 1 to 20 carbon atoms, still preferably from 1 to 16 carbon atoms and particularly preferably from 1 to 12 carbon atoms, such as mesyl and tosyl), sulfinyl groups (preferably having from 1 to 20 carbon atoms, still preferably from 1 to 16 carbon atoms and particularly preferably from 1 to 12 carbon atoms, such as methanesulfinyl and benzenesulfinyl), ureido groups (preferably having from 1 to 20 carbon atoms, still preferably from 1 to 16 carbon atoms and particularly preferably from 1 to 12 carbon atoms, such as ureido, methylureido and phenylureido), phosphoramido groups (preferably having from 1 to 20 carbon atoms, still preferably from 1 to 16 carbon atoms and particularly preferably from 1 to 12 carbon atoms, such as diethylphosphoramido and phenylphosphoramido), hydroxy group, mercapto group, halogen atoms (for example, fluorine atom, chlorine atom, bromine atom and iodine atom), cyano group, sulfo group, carboxyl group, nitro group, hydroxamate group, sulfino group, hydrazino group, imino group, heterocyclic groups (preferably having from 1 to 30 carbon atoms, still preferably from 1 to 12 carbon atoms, and having a nitrogen atom, an oxygen atom or a sulfur atom as a hetero atom, such as imidazolyl, pyridyl, quinolyl, furyl, piperidyl, morpholino, benzoxazolyl, benzimidazolyl and benzthiazolyl), silyl groups (preferably having from 3 to 40 carbon atoms, still preferably from 3 to 30 carbon atoms and particularly preferably from 3 to 24 carbon atoms, such as trimethylsilyl and triphenylsilyl) and so on. These substituents may be further substituted. In the case of having two or more substituent, the substituents may be either the same or different. If possible, these substituents may be bonded together to from a ring.

As the compounds represented by the formula (101), compounds represented the following formula (101-A) are preferable.

Formula (101-A):

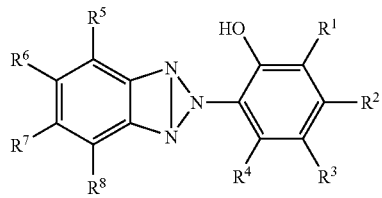

In the above formula, $R^1$, $R^2$, $R^3$, $R^4$, $R^5$, $R^6$, $R^7$ and $R^8$ independently represent each a hydrogen atom or a substituent.

$R^1$, $R^2$, $R^3$, $R^4$, $R^5$, $R^6$, $R^7$ and $R^8$ independently represent each a hydrogen atom or a substituent. As the substituent, the above-described substituents T may be used. These substituents may be further substituted by another substituent and substituents may be fused together to form a cyclic structure.

$R^1$ and $R^3$ preferably represent each a hydrogen atom, an alkyl group, an alkenyl group, an alkynyl group, an amyl group, a substituted or unsubstituted amino group, an alkoxy group, an aryloxy group, a hydroxy group or a halogen atom. It still preferably represents a hydrogen atom, an alkyl group, an aryl group, an aryloxy group or a halogen atom, still preferably a hydrogen atom or an alkyl group having from 1 to 12 carbon atoms and particularly preferably an alkyl group having from 1 to 12 (preferably from 4 to 12) carbon atoms.

$R^2$ and $R^4$ preferably represent each a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group, an aryl group, an alkyloxy group, an aryloxy group or a halogen atom, still preferably a hydrogen atom or an alkyl group having from 1 to 12 carbon atoms, particularly preferably a hydrogen atom or a methyl group and most desirably a hydrogen atom.

$R^5$ and $R^8$ preferably represent each a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group, an aryl group, an alkyloxy group, an aryloxy group or a halogen atom, still preferably a hydrogen atom or an alkyl group having from 1 to 12 carbon atoms, particularly preferably a hydrogen atom or a methyl group and most desirably a hydrogen atom.

$R^6$ and $R^7$ preferably represent each a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group, an aryl group, an alkyloxy group, an aryloxy group or a halogen atom, still preferably a hydrogen atom or a halogen atom and particularly preferably a hydrogen atom or a chlorine atom.

As the compounds represented by the formula (101), compounds represented the following formula (101-B) are still preferable.

Formula (101-B):

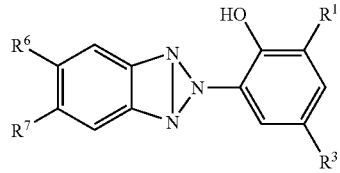

In the above formula, $R^1$, $R^3$, $R^6$ and $R^7$ have the same meanings as defined in the formula (101-A). Preferable ranges thereof are also the same.

Next, preferable examples of the compounds represented by the formula (101) will be presented, though the invention is not restricted to these specific examples.

UV-1

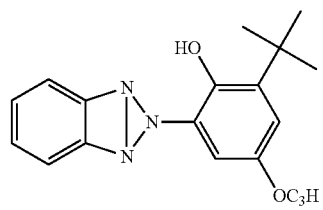

UV-2

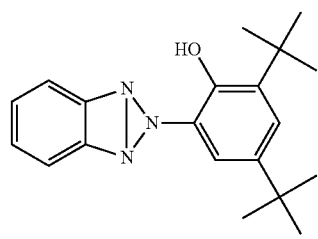

UV-3

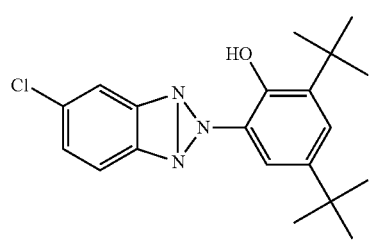

UV-4

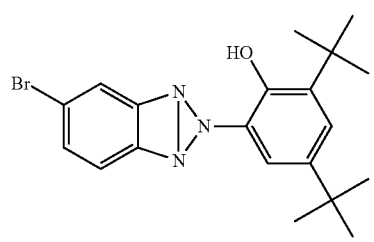

UV-5

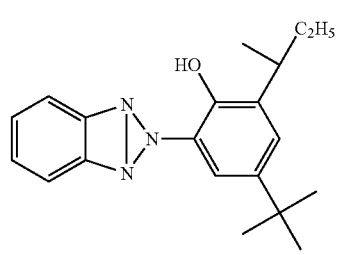

UV-6
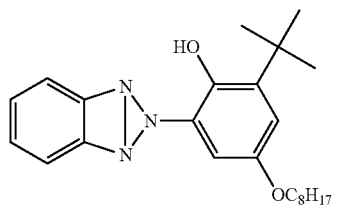
UV-7
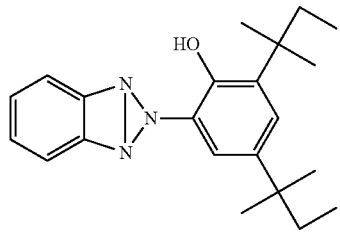
UV-8
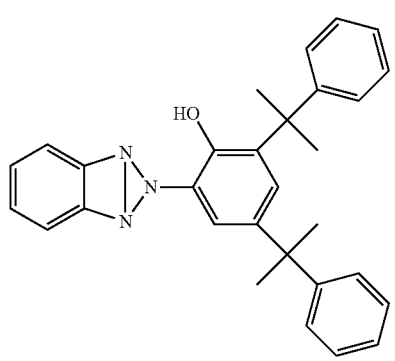
UV-9
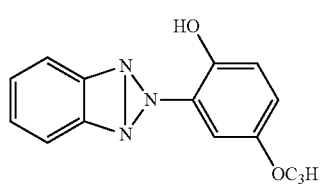
UV-10
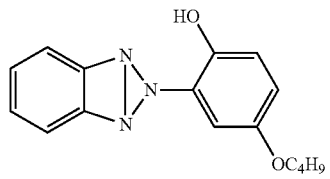
UV-11
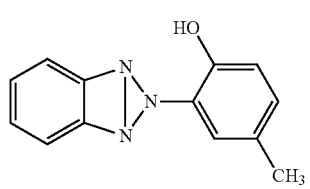
UV-12
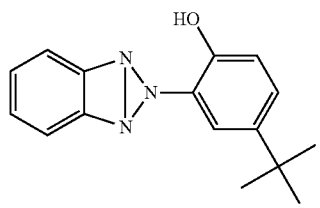
UV-13
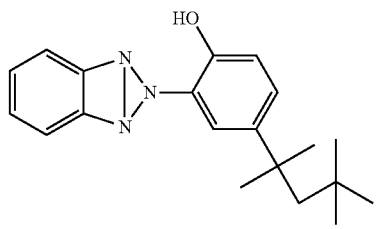
UV-14
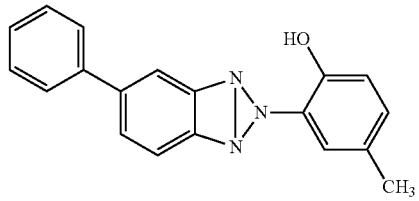
UV-15
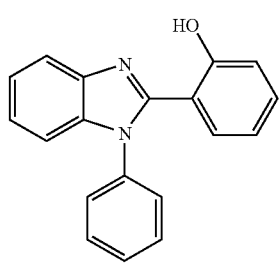
UV-16
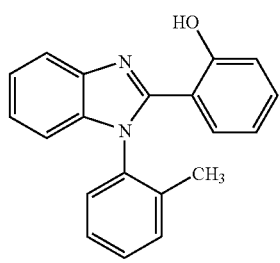
UV-17
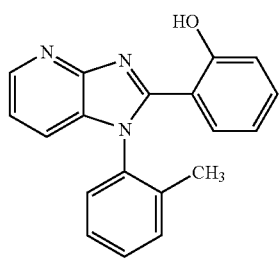
UV-18
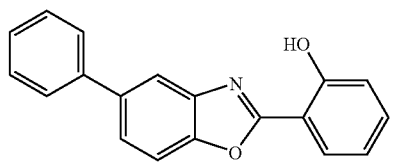
UV-19
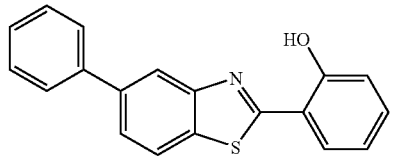

-continued

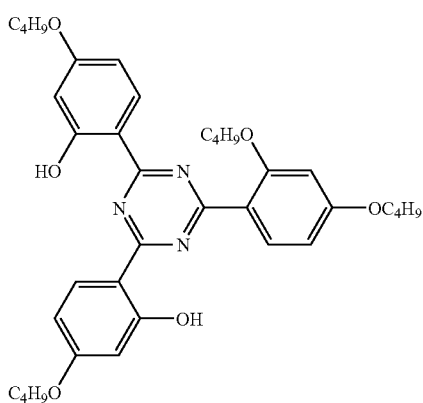

UV-20

UV-21

UV-22

UV-23

It is confirmed that the cellulose acylate film according to the invention containing a benzotriazole compound having a molecular weight of 320 or less, from among the benzotriazole compounds presented above, is advantageous from the viewpoint of retention.

As a benzophenone compound which is one of the wavelength dispersion regulators usable in the invention, it is preferable to employ a compound represented by the following formula (102).

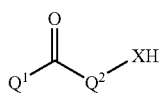

In the above formula, $Q^1$ and $Q^2$ and $Q^3$ independently represent each an aromatic ring. X represents NR (wherein R represents a hydrogen atom or a substituent).

The aromatic rings represented by $Q^1$ and $Q^2$ may be either aromatic hydrocarbon rings or aromatic heterocycles. They may be a single ring or form a fused ring together with another ring.

Preferable examples of the aromatic hydrocarbon ring represented by $Q^1$ and $Q^2$ include monocyclic or bicyclic aromatic hydrocarbon rings having from 6 to 30 carbon atoms (for example, benzene ring, naphthalene ring and so on), still preferably an aromatic hydrocarbon ring having from 6 to 20 carbon atoms and still preferably an aromatic hydrocarbon ring having from 6 to 12 carbon atoms. A benzene ring is the most desirable one.

Preferable examples of the aromatic heterocycle represented by $Q^1$ and $Q^2$ include aromatic heterocycles containing at least one of oxygen, nitrogen and sulfur atoms. Specific examples of the heterocycle include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthridine, phenazine, tetrazole, benzimidazole, benzoxazole, benzthiazole, benzotriazole, tetrazaindene and so on. Preferable examples of the aromatic heterocycles include pyridine, triazine and quinoline.

The aromatic rings represented by $Q^1$ and $Q^2$ are each preferably an aromatic hydrocarbon ring, still preferably an aromatic hydrocarbon ring having from 6 to 12 carbon atoms and still preferably a substituted or unsubstituted benzene ring and particularly preferably a benzene ring.

$Q^1$ and $Q^2$ may have a substituent and examples of the substituent include the substituent T which will be described hereinafter, provided that such a substituent never contains carboxylic acid, sulfonic acid or a quaternary ammonium salt. If possible, substituents may be bonded together to form a cyclic structure.

X represents NR (wherein R represents a hydrogen atom or a substituent which include the substituent T as will be described hereinafter), an oxygen atom or a sulfur atom. It is preferable that X is NR (wherein R preferably represents an acyl group or a sulfonyl group and such a substituent may further have a substituent) or an oxygen atom. An oxygen atom is particularly preferred.

Examples of the substituent T include alkyl groups (preferably having from 1 to 20 carbon atoms, still preferably from 1 to 12 carbon atoms and particularly preferably from 1 to 8 carbon atoms, such as methyl, ethyl, isopropyl, tert-butyl, n-octyl, n-decyl, n-hexadecyl, cyclopropyl, cyclopentyl and cyclohexyl), alkenyl groups (preferably having from 2 to 20 carbon atoms, still preferably from 2 to 12 carbon atoms and particularly preferably from 2 to 8 carbon atoms, such as vinyl, allyl, 2-butenyl and s-pentenyl), alkynyl groups (preferably having from 2 to 20 carbon atoms, still preferably from 2 to 12 carbon atoms and particularly preferably from 2 to 8 carbon atoms, such as propargyl and 3-pentynyl), aryl groups (preferably having from 6 to 30 carbon atoms, still preferably from 6 to 20 carbon atoms and particularly preferably from 6 to 12 carbon atoms, such as phenyl, p-methylphenyl and naphthyl), substituted or unsubstituted amino groups (preferably having from 0 to 20 carbon atoms, still preferably from 0 to 10 carbon atoms and particularly preferably from 0 to 6 carbon atoms, such as amino, methylamino, dimethylamino, diethylamino and dibenzylamino), alkoxy groups (preferably having from 1 to 20 carbon atoms, still preferably from 1 to 12 carbon atoms and particularly preferably from 1 to 8 carbon atoms, such as methoxy, ethoxy and butoxy), aryloxy groups (preferably having from 6 to 20 carbon atoms, still preferably from 6 to 16 carbon atoms and particularly preferably from 6 to 12 carbon atoms, such as phenyloxy and 2-naphthyloxy), acyl groups (preferably having from 1 to 20 carbon atoms, still preferably from 1 to 16 carbon atoms and particularly preferably from 1 to 12 carbon atoms, such as acetyl, benzoyl, formyl and pivaloyl), alkoxycarbonyl groups (preferably hav-

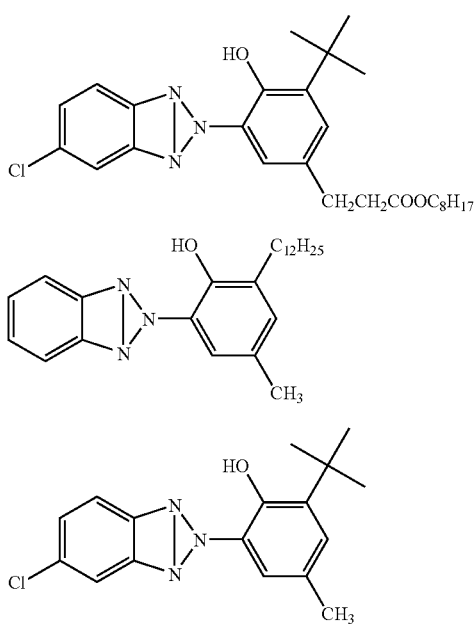

ing from 2 to 20 carbon atoms, still preferably from 2 to 16 carbon atoms and particularly preferably from 2 to 12 carbon atoms, such as methoxycarbonyl and ethoxycarbonyl), aryloxycarbonyl groups (preferably having from 7 to 20 carbon atoms, still preferably from 7 to 16 carbon atoms and particularly preferably from 7 to 10 carbon atoms, such as phenyoxycarbonyl), acyloxy groups (preferably having from 2 to 20 carbon atoms, still preferably from 2 to 16 carbon atoms and particularly preferably from 2 to 10 carbon atoms, such as acetoxy and benzoyloxy), acylamino groups (preferably having from 2 to 20 carbon atoms, still preferably from 2 to 16 carbon atoms and particularly preferably from 2 to 10 carbon atoms, such as acetylamino and benzoylamino), alkoxycarbonylamino groups (preferably having from 2 to 20 carbon atoms, still preferably from 2 to 16 carbon atoms and particularly preferably from 2 to 12 carbon atoms, such as methoxycarbonylamino), aryloxycarbonylamino groups (preferably having from 7 to 20 carbon atoms, still preferably from 7 to 16 carbon atoms and particularly preferably from 7 to 12 carbon atoms, such as phenyloxycarbonylamino), sulfonylamino groups (preferably having from 1 to 20 carbon atoms, still preferably from 1 to 16 carbon atoms and particularly preferably from 1 to 12 carbon atoms, such as methanesulfonylamino and benzenesulfonylamino), sulfamoyl groups (preferably having from 0 to 20 carbon atoms, still preferably from 0 to 16 carbon atoms and particularly preferably from 0 to 12 carbon atoms, such as sulfamoyl, methylsulfamoyl, dimethylsulfamoyl and phenylsulfamoyl), carbamoyl groups (preferably having from 1 to 20 carbon atoms, still preferably from 1 to 16 carbon atoms and particularly preferably from 1 to 12 carbon atoms, such as carbamoyl, methylcarbamoyl, diethylcarbamoyl and phenylcarbamoyl), alkylthio groups (preferably having from 1 to 20 carbon atoms, still preferably from 1 to 16 carbon atoms and particularly preferably from 1 to 12 carbon atoms, such as methylthio and ethylthio), arylthio groups (preferably having from 6 to 20 carbon atoms, still preferably from 6 to 16 carbon atoms and particularly preferably from 6 to 12 carbon atoms, such as phenylthio), sulfonyl groups (preferably having from 1 to 20 carbon atoms, still preferably from 1 to 16 carbon atoms and particularly preferably from 1 to 12 carbon atoms, such as mesyl and tosyl), sulfinyl groups (preferably having from 1 to 20 carbon atoms, still preferably from 1 to 16 carbon atoms and particularly preferably from 1 to 12 carbon atoms, such as methanesulfinyl and benzenesulfinyl), ureido groups (preferably having from 1 to 20 carbon atoms, still preferably from 1 to 16 carbon atoms and particularly preferably from 1 to 12 carbon atoms, such as ureido, methylureido and phenylureido), phosphoramido groups (preferably having from 1 to 20 carbon atoms, still preferably from 1 to 16 carbon atoms and particularly preferably from 1 to 12 carbon atoms, such as diethylphosphoramido and phenylphosphoramido), hydroxy group, mercapto group, halogen atoms (for example, fluorine atom, chlorine atom, bromine atom and iodine atom), cyano group, sulfo group, carboxyl group, nitro group, hydroxamate group, sulfino group, hydrazino group, imino group, heterocyclic groups (preferably having from 1 to 30 carbon atoms, still preferably from 1 to 12 carbon atoms, and having a nitrogen atom, an oxygen atom or a sulfur atom as a hetero atom, such as imidazolyl, pyridyl, quinolyl, furyl, piperidyl, morpholino, benzoxazolyl, benzimidazolyl and benzthiazolyl), silyl groups (preferably having from 3 to 40 carbon atoms, still preferably from 3 to 30 carbon atoms and particularly preferably from 3 to 24 carbon atoms, such as trimethylsilyl and triphenylsilyl) and so on. These substituents may be further substituted. In the case of having two or more substituent, the substituents may be either the same or different. If possible, these substituents may be bonded together to from a ring.

As the compounds represented by the formula (102), compounds represented the following formula (102-A) are preferable.

Formula (102-A):

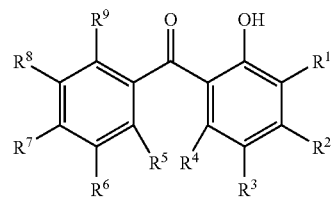

In the above formula, $R^1$, $R^2$, $R^3$, $R^4$, $R^5$, $R^6$, $R^7$, $R^8$ and $R^9$ independently represent each a hydrogen atom or a substituent.

$R^1$, $R^2$, $R^3$, $R^4$, $R^5$, $R^6$, $R^7$, $R^8$ and $R^9$ independently represent each a hydrogen atom or a substituent. As the substituent, the above-described substituents T may be used. These substituents may be further substituted by another substituent and substituents may be fused together to form a cyclic structure.

$R^1$, $R^3$, $R^4$, $R^5$, $R^6$, $R^8$ and $R^9$ preferably represent each a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group, an aryl group, an alkyloxy group, an aryloxy group or a halogen atom, still preferably a hydrogen atom or an alkyl group having from 1 to 12 carbon atoms and particularly preferably a hydrogen atom or a methyl group. A hydrogen atom is the most desirable one.

$R^2$ preferably represents a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms or a hydroxy group, still preferably an alkoxy group having from 1 to 20 carbon atoms and particularly preferably an alkoxy group having from 1 to 12 carbon atoms.

$R^7$ preferably represents a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms or a hydroxy group, still preferably a hydrogen atom or an alkyl group having from 1 to 20 carbon atoms (preferably from 1 to 12 carbon atoms, still preferably from 1 to 8 carbon atoms, and still preferably a methyl group). A methyl group or a hydrogen atom is particularly preferred.

As the compounds represented by the formula (102), compounds represented the following formula (102-B) are still preferable.

Formula (102-B):

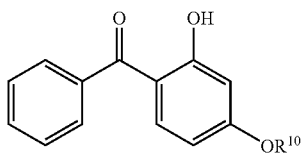

In the above formula, $R^{10}$ represents a hydrogen atom, a substituted or unsubstituted alkyl group, a substituted or unsubstituted alkenyl group, a substituted or unsubstituted alkynyl group or a substituted or unsubstituted aryl group.

$R^{10}$ represents a hydrogen atom, a substituted or unsubstituted alkyl group, a substituted or unsubstituted alkenyl group, a substituted or unsubstituted alkynyl group or a substituted or unsubstituted aryl group. As the substituent, the substituent T as described above may be used.

$R^{10}$ preferably represents a substituted or unsubstituted alkyl group, still preferably a substituted or unsubstituted alkyl group having from 5 to 20 carbon atoms, still preferably a substituted or unsubstituted alkyl group having from 5 to 12 carbon atoms (for example, n-hexyl, 2-ethylhexyl, n-octyl, n-decyl, n-dodecyl or benzyl group), and particularly preferably a substituted or unsubstituted alkyl group having from 5 to 12 carbon atoms (for example, 2-ethylhexyl, n-octyl, n-decyl, n-dodecyl or benzyl group).

The compounds represented by the formula (102) can be synthesized by a publicly known method reported in JP-A-11-12219.

Next, specific examples of the compounds represented by the formula (102) will be presented, though the invention is not restricted to these specific examples.

UV-101
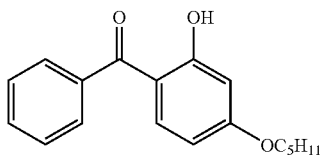

UV-102
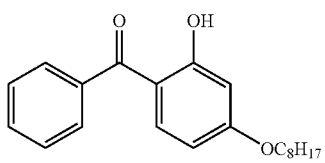

UV-103
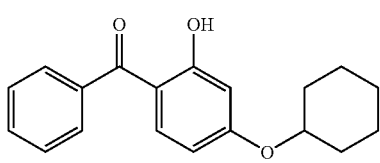

UV-104
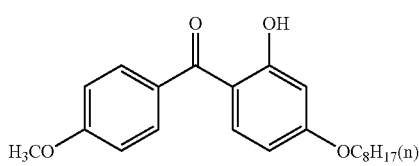

UV-105
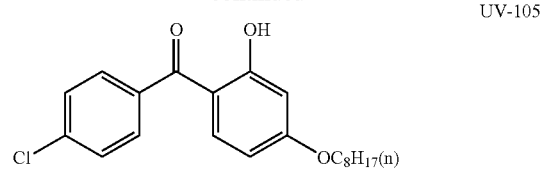

UV-106
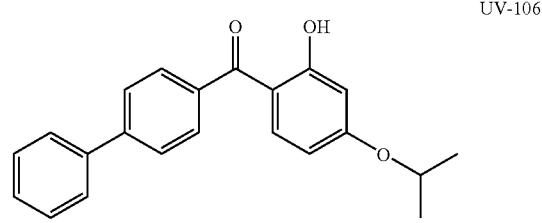

UV-107
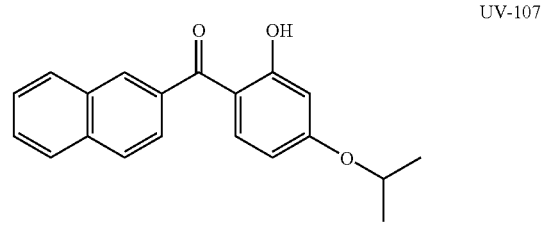

UV-108
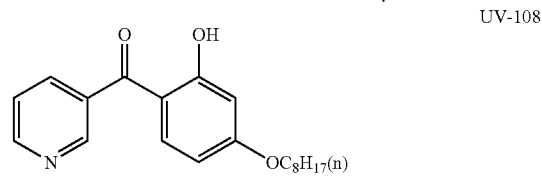

UV-109
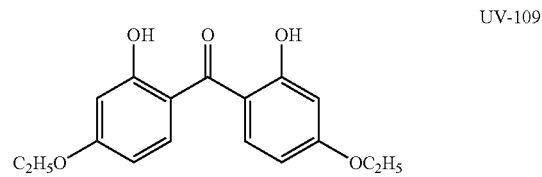

UV-110
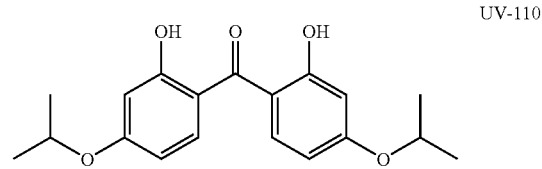

UV-111
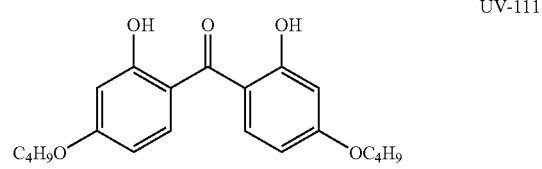

UV-112
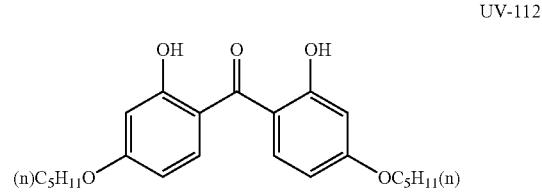

UV-113
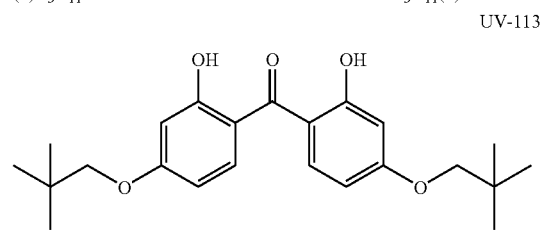

-continued

UV-114
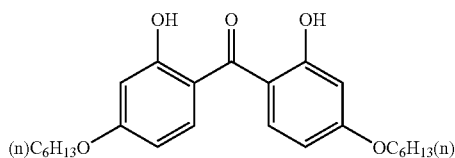

UV-115
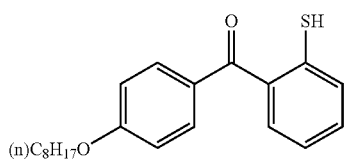

UV-116
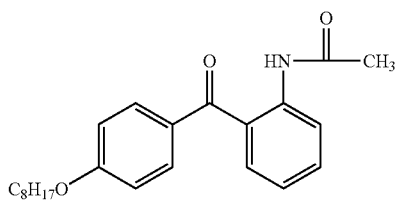

UV-117
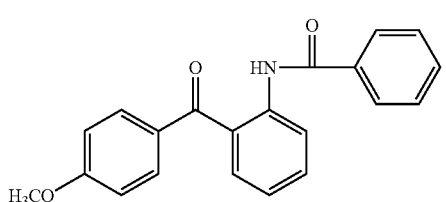

UV-117
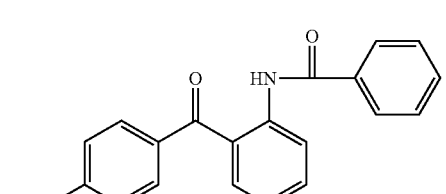

UV-118
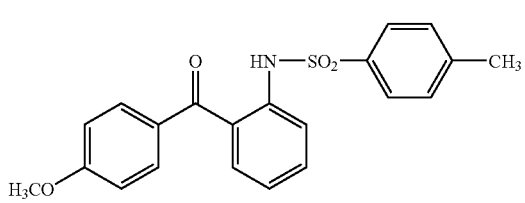

UV-119
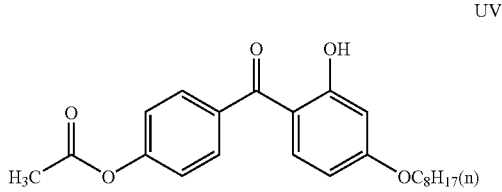

UV-120
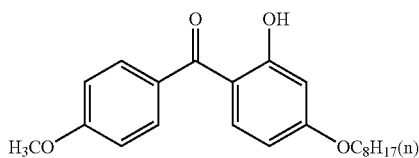

-continued

UV-121
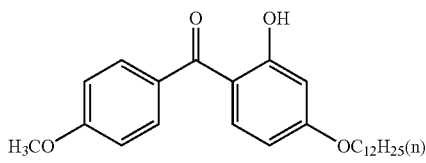

In the invention, Use can be also made of a cyano group-containing compound as the wavelength dispersion regulator. As such a cyano group-containing compound, compounds represented by the formula (103) are preferred.

Formula (103):

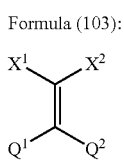

In the above formula, $Q^1$ and $Q^2$ independently represent each an aromatic ring. $X^1$ and $X^2$ represent each a hydrogen atom or a substituent, provided that at least one of them represents a cyano group, a carbonyl group, a sulfonyl group or an aromatic heterocycle. The aromatic rings represented by $Q^1$ and $Q^2$ may be either aromatic hydrocarbon rings or aromatic heterocycles. They may be a single ring or form a fused ring together with another ring.

Preferable examples of the aromatic hydrocarbon ring include monocyclic or bicyclic aromatic hydrocarbon rings having from 6 to 30 carbon atoms (for example, benzene ring, naphthalene ring and so on), still preferably an aromatic hydrocarbon ring having from 6 to 20 carbon atoms and still preferably an aromatic hydrocarbon ring having from 6 to 12 carbon atoms. A benzene ring is the most desirable one.

Preferable examples of the aromatic heterocycle include aromatic heterocycles containing a nitrogen atom or a sulfur atom. Specific examples of the heterocycle include thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthylidine, quinoxaline, quinazoline, cinnoline, pteridine, acridine, phenanthridine, phenazine, tetrazole, benzimidazole, benzoxazole, benzthiazole, benzotriazole, tetrazaindene and so on. Preferable examples of the aromatic heterocycles include pyridine, triazine and quinoline.

The aromatic rings represented by $Q^1$ and $Q^2$ are each preferably an aromatic hydrocarbon ring, and still preferably a benzene ring.

$Q^1$ and $Q^2$ may have a substituent and examples of the substituent include the substituent T which will be described hereinafter. Examples of the substituent T include alkyl groups (preferably having from 1 to 20 carbon atoms, still preferably from 1 to 12 carbon atoms and particularly preferably from 1 to 8 carbon atoms, such as methyl, ethyl, isopropyl, tert-butyl, n-octyl, n-decyl, n-hexadecyl, cyclopropyl, cyclopentyl and cyclohexyl), alkenyl groups (preferably having from 2 to 20 carbon atoms, still preferably from 2 to 12 carbon atoms and particularly preferably from 2 to 8 carbon atoms, such as vinyl, allyl, 2-butenyl and s-pentenyl), alkynyl groups (preferably having from 2 to 20 carbon atoms, still preferably from 2 to 12 carbon atoms and particularly preferably from 2 to 8 carbon atoms, such as propargyl and 3-pentynyl), aryl groups (preferably having from 6 to 30 carbon atoms, still preferably from 6 to 20 carbon atoms and particularly preferably from 6 to 12 carbon atoms, such as phenyl, p-methylphenyl and naphthyl), substituted or unsubstituted amino groups (preferably having from 0 to 20 carbon atoms, still preferably from 0 to 10 carbon atoms and particularly preferably from 0 to 6 carbon atoms, such as amino, methylamino, dimethylamino, diethylamino and dibenzylamino), alkoxy groups (preferably having from 1 to 20 carbon atoms, still preferably from 1 to 12 carbon atoms and particularly preferably from 1 to 8 carbon atoms, such as methoxy, ethoxy and butoxy), aryloxy groups (preferably having from 6 to 20 carbon atoms, still preferably from 6 to 16 carbon atoms and particularly preferably from 6 to 12 carbon atoms, such as phenyloxy and 2-naphthyloxy), acyl groups (preferably having from 1 to 20 carbon atoms, still preferably from 1 to 16 carbon atoms and particularly preferably from 1 to 12 carbon atoms, such as acetyl, benzoyl, formyl and pivaloyl), alkoxycarbonyl groups (preferably having from 2 to 20 carbon atoms, still preferably from 2 to 16 carbon atoms and particularly preferably from 2 to 12 carbon atoms, such as methoxycarbonyl and ethoxycarbonyl), aryloxycarbonyl groups (preferably having from 7 to 20 carbon atoms, still preferably from 7 to 16 carbon atoms and particularly preferably from 7 to 10 carbon atoms, such as phenyoxycarbonyl), acyloxy groups (preferably having from 2 to 20 carbon atoms, still preferably from 2 to 16 carbon atoms and particularly preferably from 2 to 10 carbon atoms, such as acetoxy and benzoyloxy), acylamino groups (preferably having from 2 to 20 carbon atoms, still preferably from 2 to 16 carbon atoms and particularly preferably from 2 to 10 carbon atoms, such as acetylamino and benzoylamino), alkoxycarbonylamino groups (preferably having from 2 to 20 carbon atoms, still preferably from 2 to 16 carbon atoms and particularly preferably from 2 to 12 carbon atoms, such as methoxycarbonylamino), aryloxycarbonylamino groups (preferably having from 7 to 20 carbon atoms, still preferably from 7 to 16 carbon atoms and particularly preferably from 7 to 12 carbon atoms, such as phenyloxycarbonylamino), sulfonylamino groups (preferably having from 1 to 20 carbon atoms, still preferably from 1 to 16 carbon atoms and particularly preferably from 1 to 12 carbon atoms, such as methanesulfonylamino and benzenesulfonylamino), sulfamoyl groups (preferably having from 0 to 20 carbon atoms, still preferably from 0 to 16 carbon atoms and particularly preferably from 0 to 12 carbon atoms, such as sulfamoyl, methylsulfamoyl, dimethylsulfamoyl and phenylsulfamoyl), carbamoyl groups (preferably having from 1 to 20 carbon atoms, still preferably from 1 to 16 carbon atoms and particularly preferably from 1 to 12 carbon atoms, such as carbamoyl, methylcarbamoyl, diethylcarbamoyl and phenylcarbamoyl), alkylthio groups (preferably having from 1 to 20 carbon atoms, still preferably from 1 to 16 carbon atoms and particularly preferably from 1 to 12 carbon atoms, such as methylthio and ethylthio), arylthio groups (preferably having from 6 to 20 carbon atoms, still preferably from 6 to 16 carbon atoms and particularly preferably from 6 to 12 carbon atoms, such as phenylthio), sulfonyl groups (preferably having from 1 to 20 carbon atoms, still preferably from 1 to 16 carbon atoms and particularly preferably from 1 to 12 carbon atoms, such as mesyl and tosyl), sulfinyl groups (preferably having from 1 to 20 carbon atoms, still preferably from 1 to 16 carbon atoms and particularly preferably from 1 to 12 carbon atoms, such as methanesulfinyl and benzenesulfinyl), ureido groups (preferably having from 1 to 20 carbon atoms, still preferably from 1 to 16 carbon atoms and particularly preferably from 1 to 12 carbon atoms, such as ureido, methylureido and phenylureido), phosphoramido groups (preferably having from 1 to 20 carbon atoms, still preferably from 1 to 16 carbon atoms and particularly preferably from 1 to 12 carbon atoms, such as diethylphosphoramido and phenylphosphoramido), hydroxy group, mercapto group, halogen atoms (for example, fluorine atom, chlorine atom, bromine atom and iodine atom), cyano group, sulfo group, carboxyl group, nitro group, hydroxamate group, sulfino group, hydrazino group, imino group; heterocyclic groups (preferably having from 1 to 30 carbon atoms, still preferably from 1 to 12 carbon atoms, and having a nitrogen atom, an oxygen atom or a sulfur atom as a hetero atom, such as imidazolyl, pyridyl, quinolyl, furyl, piperidyl, morpholino, benzoxazolyl, benzimidazolyl and benzthiazolyl), silyl groups (preferably having from 3 to 40 carbon atoms, still preferably from 3 to 30 carbon atoms and particularly preferably from 3 to 24 carbon atoms, such as trimethylsilyl and triphenylsilyl) and so on. These substituents may be further substituted. In the case of having two or more substituent, the substituents may be either the same or different. If possible, these substituents may be bonded together to from a ring.

$X^1$ and $X^2$ represent each a hydrogen atom or a substituent, provided that at least one of them represents a cyano group, a carbonyl group, a sulfonyl group or an aromatic heterocycle. As the substituents represented by $X^1$ and $X^2$ may be the substituents T as described above. The substituents represented by $X^1$ and $X^2$ may be substituted by another substituent. $X^1$ and $X^2$ may be fused together to form a cyclic structure.

Preferable examples of $X^1$ and $X^2$ include hydrogen atom, alkyl groups, aryl groups, cyano group, nitro group, carbonyl group, sulfonyl groups and aromatic heterocycles, still preferably cyano group, carbonyl group, sulfonyl groups and aromatic heterocycles, still preferably cyano group and carbonyl group, and particularly preferably cyano group and alkoxycarbonyl groups (—C(=O)OR wherein R represents an alkyl group having from 1 to 20 carbon atoms, an aryl group having from 6 to 12 carbon atoms or a combination thereof).

As the compounds represented by the formula (103), compounds represented the following formula (103-A) are preferable.

Formula (103-A):

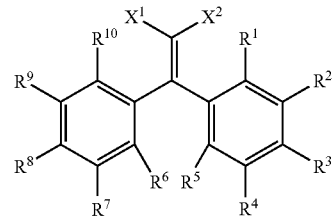

In the above formula, $R^1$, $R^2$, $R^3$, $R^4$, $R^5$, $R^6$, $R^7$, $R^8$, $R^9$ and $R^{10}$ independently represent each a hydrogen atom or a substituent. $X^1$ and $X^2$ have the same meanings as in the formula (20) and preferable ranges thereof are also the same.

$R^1$, $R^2$, $R^3$, $R^4$, $R^5$, $R^6$, $R^7$, $R^8$, $R^9$ and $R^{10}$ independently represent each a hydrogen atom or a substituent. As the substituent, the above-described substituents T may be used. These substituents may be further substituted by another substituent and substituents may be fused together to form a cyclic structure.

$R^1$, $R^2$, $R^4$, $R^5$, $R^6$, $R^7$, $R^9$ and $R^{10}$ preferably represent each a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group, an aryl group, an alkyloxy group, an aryloxy group or a halogen atom, still preferably a hydrogen atom or an alkyl group having from 1 to 12 carbon atoms and particularly preferably a hydrogen atom or a methyl group. A hydrogen atom is the most desirable one.

$R^3$ and $R^8$ preferably represent each a hydrogen atom, an alkyl group, an alkenyl group, an alkynyl group, an aryl group, a substituted or unsubstituted amino group, an alkoxy group, an aryloxy group, a hydroxy group or a halogen atom. It still preferably represents a hydrogen atom, an alkyl group having from 1 to 20 carbon atoms, an amino group having from 0 to 20 carbon atoms, an alkoxy group having from 1 to 12 carbon atoms, an aryloxy group having from 6 to 12 carbon atoms or a hydroxy group, still preferably a hydrogen atom, an alkyl group having form 1 to 12 carbon atoms or an alkoxy group having from 1 to 12 carbon atoms, and particularly preferably a hydrogen atom.

As the compounds represented by the formula (103), compounds represented the following formula (103-B) are still preferable.

Formula (103-B):

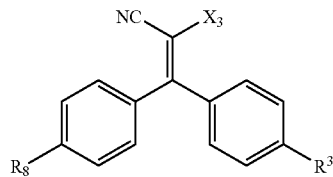

In the above formula, $R^3$ and $R^8$ have the same meanings as in the formula (103-A) and the preferable ranges thereof are also the same. $X_3$ represents a hydrogen atom or a substituent.

$X_3$ represents a hydrogen atom or a substituent and the above-described substituent T may be used as the substituent. If possible, it may be further substituted by another substituent. $X_3$ preferably represents a hydrogen atom, an alkyl group, an aryl group, a cyano group, a nitro group, a carbonyl group, a sulfonyl group or an aromatic heterocycle, still preferably a cyano group or a carbonyl group, and particularly preferably a cyano group or an alkoxycarbonyl group (—C(=O)CR wherein R represents an alkyl group having from 1 to 20 carbon atoms, an aryl group having from 6 to 12 carbon atoms or a combination thereof).

As the compounds represented by the formula (103), compounds represented the following formula (103-C) are still preferable.

Formula (103-C):

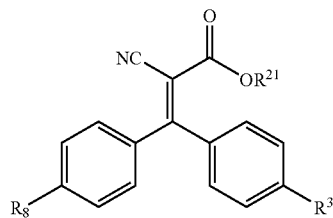

In the above formula, Wand $R^8$ have the same meanings as in the formula (103-A) and the preferable ranges thereof are also the same. $R^{21}$ represents an alkyl group having from 1 to 20 carbon atoms.

In the case where Wand $R^8$ are both hydrogen atoms, $R^{21}$ preferably represents an alkyl group having from 2 to 12 carbon atoms, still preferably an alkyl group having from 4 to 12 carbon atoms, still preferably an alkyl group having from 6 to 12 carbon atoms and particularly preferably an n-octyl group, a tert-octyl group, a 2-ethylhexyl group, an n-decyl group or an n-dodecyl group. A 2-ethylhexyl group is the most desirable.

In the case where $R^3$ and $R^8$ are both not hydrogen atoms, $R^{21}$ preferably represents an alkyl group having not more than 20 carbon atoms and making the molecular weight of the compound of the formula (103-C) 300 or more.

The compounds represented by the formula (103) can be synthesized by a method described in Journal of America Chemical Society, vol. 63, p. 3452 (1941).

Next, specific examples of the compounds represented by the formula (103) will be presented, though the invention is not restricted to these specific examples.

UV-201

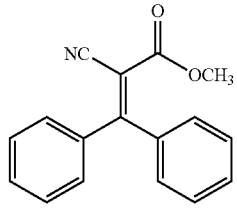

UV-202

UV-203

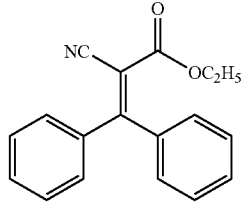

UV-204

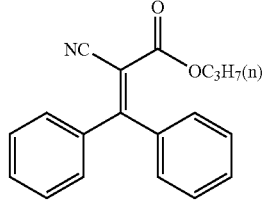

UV-205

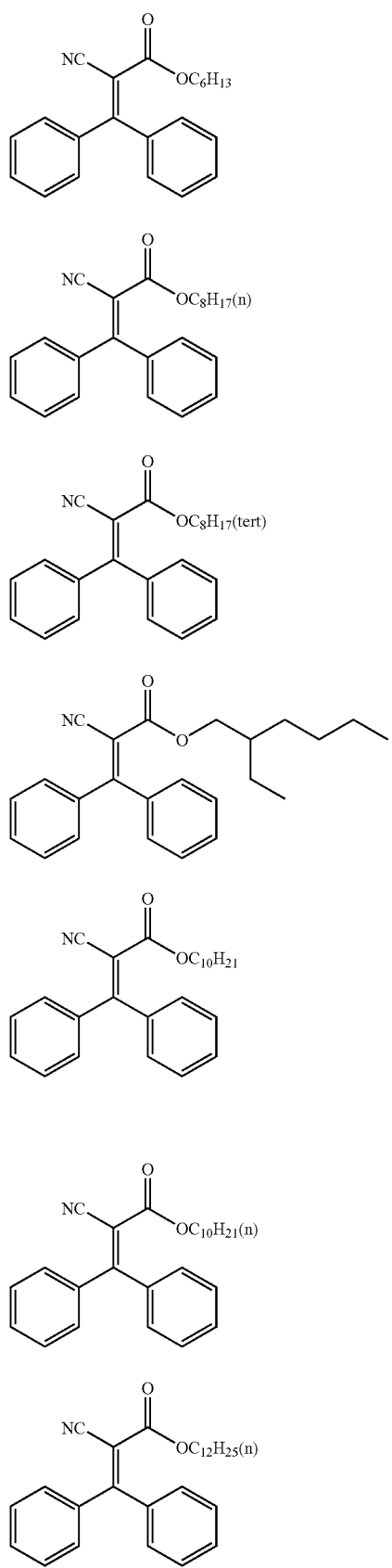
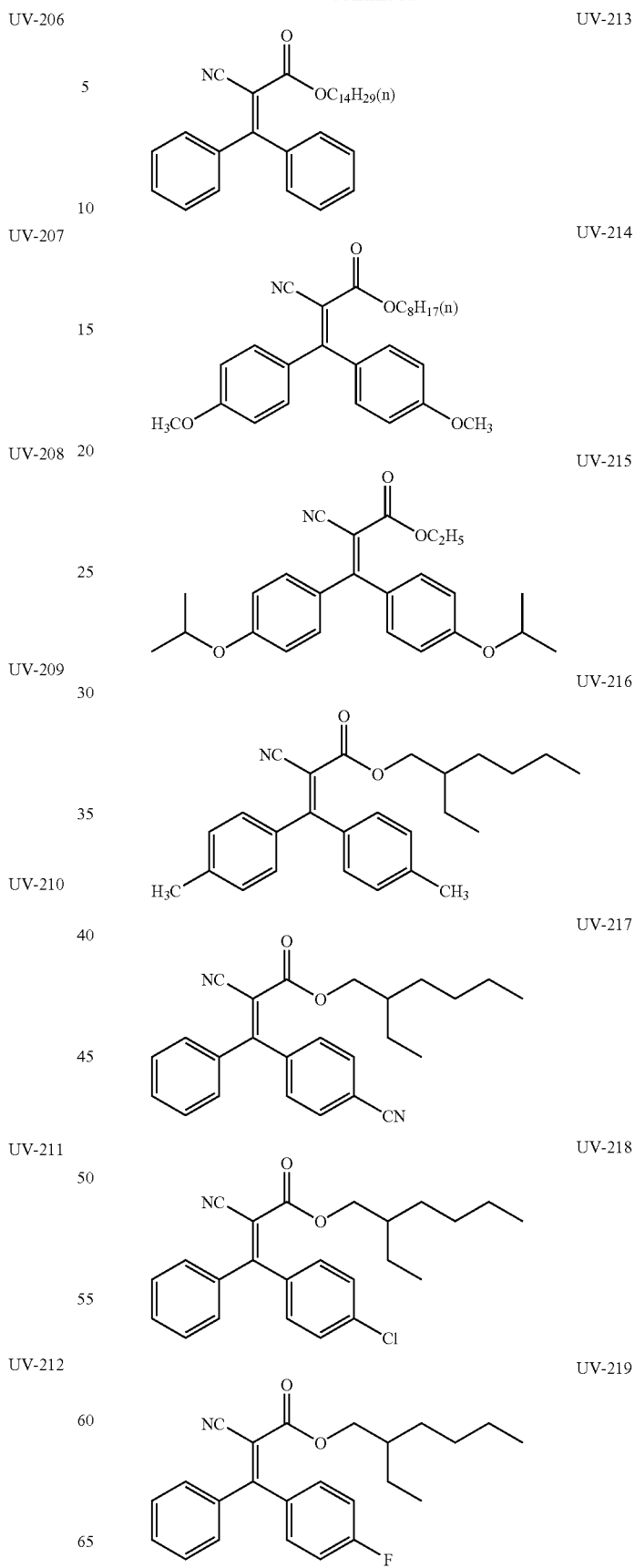

UV-220
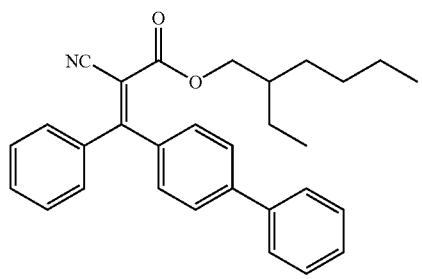

UV-221
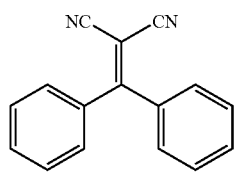

UV-222
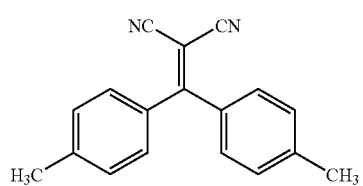

UV-223
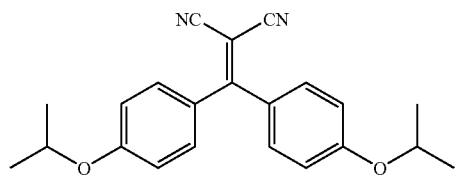

UV-224
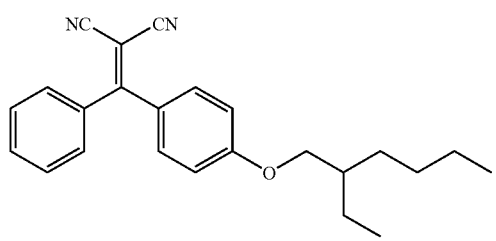

UV-225
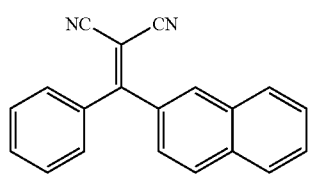

UV-226
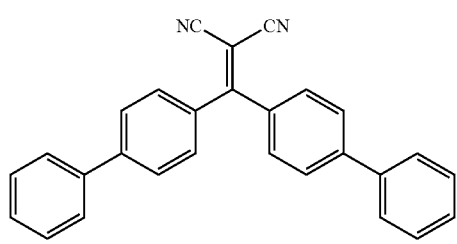

UV-227
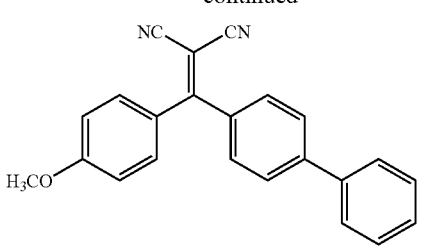

UV-228
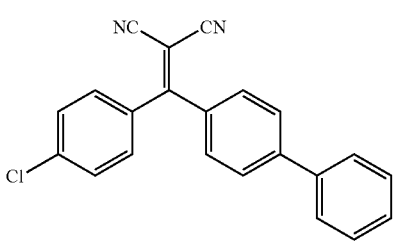

UV-229
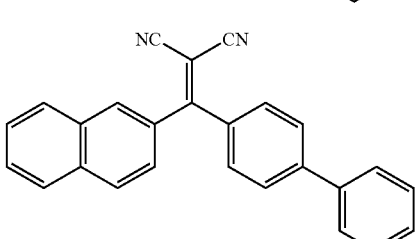

UV-230
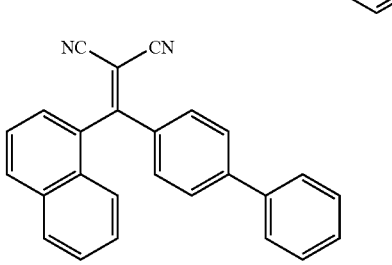

UV-231
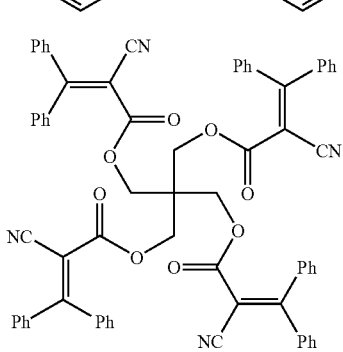

[Fine Particles of Matting Agent]

It is preferable that the cellulose acylate film according to the invention contains fine particles as a matting agent. Examples of the fine particles usable in the invention include silicon dioxide, titanium dioxide, aluminum oxide, zirconium oxide, calcium carbonate, talc, clay, baked kaolin, baked calcium silicate, hydrated calcium silicate, aluminum silicate, magnesium silicate and calcium phosphate. Fine particles containing silicon are preferred because of having a low cloudiness. In particular, silicon dioxide is preferred. It is preferable that fine particles of silicone dioxide have an average primary particle size of 20 nm or less and an apparent specific gravity of 70 g/l or more. Fine particles having a small average primary particle size of 5 to 16 nm are still preferable, since the haze of the resultant film can be lowered thereby. The apparent specific gravity is preferably form 90 to 200 g/l or more and still preferably from 100 to 200 g/l or more. A higher apparent specific gravity makes it possible to prepare a dispersion having the higher concentration, thereby improving haze and aggregates.

These fine particles form aggregates having an average secondary particle size of from 0.1 to 3.0 µm. In a film, these fine particles occur as aggregates of the primary particles and provides irregularities of 0.1 to 3.0 µm in height on the film surface. It is preferred that the average secondary particle size is from 0.2 µm to 1.5 µm, still preferably from 0.4 µm to 1.2 µm and most desirably from 0.6 µm to 1.1 µm. The primary or secondary particle size is determined by observing a particle in the film under a scanning electron microscope and referring the diameter of its circumcircle as the particle size. 200 particles are observed at various sites and the mean is referred to as the average particle size.

As the fine particles of silicon dioxide, use can be made of marketed products such as AEROSIL R972, R972V, R974, R812, 200, 200V, 300, 8202, OX$^{50}$ and TT600 (each manufactured by NIPPON AEROSIL). As the fine particles of zirconium oxide, use can be made of products marketed under the trade name of, for example, AEROSIL R976 and R811 (each manufactured by NIPPON AEROSIL).

Among these products, AEROSIL 200V and AEROSIL 8972 are particularly preferable, since they are fine particles of silicon dioxide having an average primary particle size of 20 nm or less and an apparent specific gravity of 70 g/l or more and exert an effect of largely lowering the coefficient of friction while maintaining the cloudiness of the optical film at a low level.

To obtain a cellulose acylate film having particles with a small average secondary particle size, some techniques may be proposed in the step of preparing a dispersion of the fine particles in the invention. For example, the fine particles are mixed with a solvent under stirring to preliminarily give a fine particle dispersion. Then this fine particle dispersion is added to a small amount of a cellulose acylate solution having been prepared separately and dissolved therein under stirring. Then it is further mixed with a main cellulose acylate dope solution. This is a preferable preparation method from the viewpoints of achieving a high dispersibility of the fine particles of silicon dioxide while causing little re-aggregation of the fine particles of silicon dioxide. An alternative method comprises adding a small amount of a cellulose ester to a solvent, dissolving it under stirring, then adding fine particles thereto, dispersing the fine particles in a dispersing machine to give a solution of the fine particle additive, and then sufficiently mixing the solution of the fine particle additive with a dope solution in an in-line mixer. Although the invention is not restricted to these methods, it is preferable in the step of mixing and dispersing the fine particles of silicon dioxide in, for example, a solvent that the silicon oxide concentration ranges from 5 to 30% by mass, preferably from 10 to 25% by mass and most desirably from 15 to 20% by mass. A higher dispersion concentration is preferred, since the solution cloudiness is lowered and haze and aggregation are unproved thereby. The final content of the cellulose acylate in the dope solution preferably ranges from 0.01 to 1.0 g/m$^2$, still preferably from 0.03 to 0.3 g/m$^2$ and most desirably from 0.08 to 0.16 g/m$^2$.

Preferable examples of lower alcohols usable as the solvent include methyl alcohol, ethyl alcohol, propyl alcohol, isopropyl alcohol and butyl alcohol. Solvents other than lower alcohols are not particularly restricted, though it is favorable to use solvents which have been employed in forming cellulose ester films.

[Plasticizer, Antidegradant and Peeling Accelerator]

In addition to the compound lowering optical anisotropy and the wavelength dispersion regulator as described above, the cellulose acylate film according to the invention may contain various additives (for example, a plasticizer, an ultraviolet blocking agent, an antidegradant, a peeling accelerator and an infrared absorbing agent) added at various stages of the preparation depending on the purpose. These additives may be either solid substances or oily substances. Namely, they are not particularly restricted in melting point or boiling point. For example, it is possible to use a mixture of an ultraviolet absorbing agent having a melting point of 20° C. or lower with another ultraviolet absorbing agent having a melting point of 20° C. or higher. Similarly, use can be made of a mixture of plasticizers as reported by, for example, JP-A-2001-151901. Examples of the infrared absorbing dye are given in, for example, JP-A-2001-194522. Although these additives may be added at any stage during the dope preparation, a preparation step of adding the additives may be further employed as the final step of the dope preparation process. The addition level of each material is not particularly restricted, so long as the desired effect thereof can be achieved. In the case of a multilayered cellulose film, moreover, individual layers may contain different types of additives in various amounts. These techniques have been conventionally known, as reported by, for example, JP-A-2001-151902. Concerning additives, moreover, use can be optionally made of the substances described in detail in Japan Institute of Invention and Innovation Journal of Technical Disclosure No. 2001-1745 (2001 Mar. 15, Japan Institute of Invention and Innovation), from p. 16.

[Addition Ratio of Compounds]

In the cellulose acylate film according to the invention, the sum of the contents of compounds having a molecular weight of 3000 or less preferably amounts to 5 to 45%, still preferably from 10 to 40% and still preferably from 15 to 30%, based on the mass of cellulose acylate. As discussed above, these compounds involve a compound lowering optical anisotropy, a wavelength dispersion regulator, an ultraviolet blocking agent, a plasticizer, an antidegradant, fine particles, a peeling accelerator, an infrared absorbing agent and so on. It is preferable that these compounds have molecular weight of 3000 or less, still preferably 2000 or less and still preferably 1000 or less. In the case where the total content of these compounds is less than 5%, the properties of cellulose acylate per se are markedly expressed, which brings about some problems such that the optical performance and physical strength frequently vary depending on changes in temperature and humidity. In the case where the total content of these compounds exceeds 45%, the compounds are not compatible the cellulose acylate any more. As a result, there frequently arises sedimentation of these compounds and thus the film becomes cloudy (i.e., bleeding out from the film).

[Organic Solvent of Cellulose Acylate Solution]

The cellulose acylate film according to the invention is obtained preferably by film-forming with the use of the cellulose acylate solution as described above. Concerning a film-forming method, use can be made of the solvent cast film-forming method by using a cellulose acylate solution dissolved in an organic solvent (a dope). As preferable examples of organic solvents to be used as the main solvent in the invention, use may be preferably made of solvents selected from among esters, ketones, ethers, alcohols and hydrocarbons having from 3 to 12 carbon atoms and halogenated hydrocarbons having form 1 to 7 carbon atoms. These esters, ketones, ethers and alcohols may have cyclic structure. It is also possible to use, as the main solvent, compounds having two or more functional groups (i.e., —O—, —CO— and —COO—) of esters, ketones and ethers and these compounds may have another functional group such as alcoholic hydroxyl group at the same time. In the case of a main solvent having two or more types of functional groups, the carbon atom number falling within the range as specified above concerning a compound having one of the functional groups.

As described above, the cellulose acylate film according to the invention may comprise, as the main solvent, either a chlorine-based halogenated hydrocarbon or a nonchlorinated organic solvent as described in Japan Institute of Invention and Innovation Journal of Technical Disclosure No. 2001-1745 (2001 Mar. 15, Japan Institute of Invention and Innovation), p. 12 to 16. The invention is not restricted thereto.

Other solvents for the cellulose acylate solution and film according to the invention and dissolution methods therefore are disclosed in the following patents which are preferred embodiments: for example, JP-A-2000-95876, JP-A-12-95877, JP-A-10-324774, JP-A-8-152514, JP-A-10-330538, JP-A-9-95538, JP-A-9-95557, JP-A-10-235664, JP-A-12-63534, JP-A-11-21379, JP-A-10-182853, JP-A-10-278056, JP-A-10-279702, JP-A-10-323853, JP-A-10-237816, JP-A-11-60807, JP-A-11-152342, JP-A-11-292988, JP-A-11-60752 and so on. According to these patents, not only preferable solvents but also solution properties thereof and substances to coexist are reported, thereby presenting preferred embodiments of the invention.

[Process for Producing Cellulose Acylate Film]
[Dissolution Step]

Next, the preparation of a cellulose acylate solution (dope) will be illustrated. The cellulose acylate is dissolved by an arbitrary method without restriction, i.e., by room-temperature dissolution, cold dissolution, hot dissolution or a combination thereof. Concerning the preparation of the cellulose acylate solution according to the invention, concentration of the solution in association with the dissolution and filtration, it is preferable to employ the process described in, for example, Japan Institute of Invention and Innovation Journal of Technical Disclosure No. 2001-1745 (2001 Mar. 15, Japan Institute of Invention and Innovation), p. 22 to 25.

(Transparency of Dope Solution)

It is preferable that the transparency of the dope of the cellulose acylate solution according to the invention is 85% or higher, still preferably 88% or higher and still preferably 90% or higher. In the invention, it is confirmed that various additives have been sufficiently dissolved in the cellulose acylate dope solution. The dope transparency in practice is determined by pouring the dope solution into a glass cell (1 cm×1 cm), measuring the absorbance at 550 nm with a spectrophotometer (UV-3150, manufactured by Shimadzu), separately measuring the solvent alone as a blank, and then calculating the transparency based on the ratio to the absorbance of the blank.

[Casting, Drying and Winding Steps]

The cellulose acylate film according to the invention can be obtained by film-forming with the use of the cellulose acylate solution as described above. Concerning a film-forming method and apparatus, use can be made of the solvent cast film-forming method and a solvent cast film-forming apparatus conventionally employed in forming cellulose acylate films. A dope (a cellulose acylate solution) prepared in a dissolution machine (a pot) is once stored in a storage pot and, after defoaming, the dope is subjected to the final preparation. Then the dope is discharged from a dope exhaust and fed into a pressure die via, for example, a pressure constant-rate pump whereby the dope can be fed at a constant rate at a high accuracy depending on the rotational speed. From the pipe sleeve (slit) of the pressure die, the dope is uniformly cast onto a metallic support continuously running in the casting section. At the peeling point where the metallic support has almost rounded, the half-dried dope film (also called a web) is peeled from the metallic support. The obtained web is clipped at both ends and dried by carrying with a tenter while maintaining the width at a constant level. Subsequently, it is carried with rolls in a dryer to terminate the drying and then wound with a winder in a definite length. Combination of the tenter and the rolls in the dryer may vary depending on the purpose. It is preferable that the cellulose acylate film according to the invention has a slow axis in the transverse direction (TD) perpendicular to the machine direction (MD) of the film. In the solvent cast film-forming method to produce functional protective films for electronic displays or silver halide photosensitive materials (i.e., the main uses of the cellulose acylate film according to the invention), a coater is frequently employed, in addition to the solvent cast film-forming apparatus, so as to process the film surface by providing, for example, an undercoating layer, an antistatic layer, an antihalation layer or a protective layer. These layers are described in detail in Japan Institute of Invention and Innovation Journal of Technical Disclosure No. 2001-1745 (2001 Mar. 15, Japan Institute of Invention and Innovation), p. 25 to 30. The techniques given in this document, which are itemized as casting (including co-casting), metallic supports, drying, peeling and so on, are preferably usable in the invention.

The thickness of the cellulose acylate film preferably ranges from 10 to 120 μm, still preferably from 40 to 100 μm and still preferably from 60 to 80 μm.

[Optical Compensation Layer]

As the optical compensation layer, an arbitrary layer fulfilling the requirements in the Nz value and the in-plane phase contrast $R_{e1}$ value as defined above may be employed without specific restriction. For example, use can be made of a double refractive high-molecular weight polymer film, an oriented liquid crystal polymer film, and an oriented low-molecular weight liquid crystal film.

Examples of the high-molecular weight polymer include acrylic polymers such as polymethyl methacrylate, styrene polymers such as polystyrene and acrylonitrie/styrene copolymer (AS resin), polyolefins such as polycarbonate and polypropylene, polyesters such as polyethylene terephthalate and polyethylene naphthalate, alicyclic polyolefins such as polynorbornene, polyvinyl alcohol, polyvinyl butyral, polymethyl vinyl ether, polyhydroxyethyl acrylate, hydroxyethylcellulose, hydronpropylcellulose, methylcellulose, polyallylate, polysulfone, polyether sulfonic, polyphenylene sulfide, polyphenylene oxide, polyallylsulfone, polyvinyl alcohol, polyamide, polyimide, polyvinyl chloride, cellulose polymers, various copolymers (binary/tertiary systems), graft copolymers and blends thereof. Among all, polymers having negative intrinsic double refraction value such as polystyrene and polymethyl methacrylate are preferred. It is particularly desirable to use a graft copolymer (referred to as (C)) obtained by addition-polymerizing a polymer having unsaturated double bond (referred to as (A)) and at least one styrene monomer (referred to as (B)). The polymer (A) may have the unsaturated double bond either in its main chain or a side chain thereof.

It is also preferable to employ a polymer having a positive intrinsic double refraction value such as polyamide, polyimide, polyester, polyether ketone, polyamide imide or polyester imide.

Next, the polymer (A) constituting the so-called main chain skeleton of the graft copolymer (C) will be illustrated.

More specifically speaking, the polymer (A) is a polymer having an unsaturated bond repeating unit in its main or side chain. It is preferable that this repeating unit is derived by polymerizing a monomer having a conjugated diene structure.

Preferable examples of the monomer having a conjugated diene structure include 1,3-butadiene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-α-naphthyl-1,3-butadiene, 1-β-naphthyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene and 2-cyano-1,3-butadiene. Among these compounds, 1,3-butadiene, isoprene and 2-chloro-1,3-butadiene are particularly preferable.

The polymer (A) constituting the so-called main chain skeleton of the graft copolymer (C) may be a copolymer of such a monomer having the diene structure as described above with a hydrophobic monomer different therefrom.

Examples of the hydrophobic monomer include ethylene, propylene, 1-butene, isobutene, styrene, α-methyl styrene, vinyl ketone, monoethylenically unsaturated hydrocarbon (alkene) esters of aliphatic acids (for example, vinyl acetate and allyl acetate), ethylenically unsaturated monocarboxylic acid or dicarboxylic acid esters (for example, methyl methacrylate, ethyl methacrylate, n-butyl methacrylate, n-hexyl methacrylate, cyclohexyl methacrylate, benzyl methacrylate, n-butyl acrylate, n-hexyl acrylate, 2-ethylhexyl acrylate, t-butyl methacrylate, dodecyl methacrylate, 2-hydroxyethyl acrylate, 2-hydroxyethyl methacrylate, 2-hydroxypropyl methacrylate), ethylenically unsaturated monocarboxylic acid or dicarboxylic acid amides (for example, t-butylacrylamide, 7-butylmethacrylamide), monoethylenically unsaturated compounds (for example, acrylonitrile, methacrylonitrile) and so on. Among these monomers, ethylene, propylene, styrene, α-methylstyrene, acrylic acid or methacrylic acid esters, acrylonitrile and methacrylonitrile are particularly preferred.

Use may be made of two or more of the monomers having the conjugated structure and two or more of the hydrophobic monomers different therefrom as described above. The unsaturated structure introduced into the polymer (A) by the polymerization of the monomer having the conjugated structure may have any of cis-1,4-bond, trans-1,4-bond or trans-1,2-bond as well known in the art.

The optical compensation layer can be obtained regulating the refractive index in the thickness direction by, for example, biaxially stretching a high-molecular weight polymer film in the plane direction, or monoaxially or biaxially stretching the film in the plane direction followed by stretching in the thickness direction too. Alternatively, it can be obtained by bonding a heat-shrinkage film to a high-molecular weight polymer film and then stretching and/or shrinking the polymer film under the action of the heat-shrinkage force to induce inclined orientation.

Examples of the liquid crystal polymer include various ones of the main chain type and the side chain type wherein a conjugating linear atomic group (a mesogen) imparting liquid crystal orientation properties is introduced into the main chain or a side chain. Specific examples of liquid crystal polymers of the main chain type include polyester liquid crystal polymers of nematic orientation, discotic polymers and cholesteric polymers. Examples of liquid crystal polymers of the side chain type include those having polysiloxane, polyacrylate, polymethacrylate or polymalonate as the main chain skeleton and para-substituted cyclic compound unit capable of imparting nematic orientation properties as a side chain via a mesogen part comprising a conjugating atomic group. Among these oriented liquid crystal polymer films, one in which a liquid crystal polymer is oriented (in particular, inclinedly oriented) by, for example, spreading a liquid crystal polymer solution on an oriented face (for example, surface-rubbed thin film of polyimide or polyvinyl alcohol formed on a glass plate, or a face with oblique evaporation of silicon oxide) followed by heating.

As examples of the low-molecular weight liquid crystal, rod-like and disc-like (discotic) liquid crystal compounds may be cited. It is preferable that a rod-like or disc-like liquid crystal compound is perpendicularly oriented to the transparent protective film.

(Discotic Liquid Crystal Compound)

Examples of the discotic liquid crystal compound usable in the invention include compounds reported in various documents (C. Destrade et al., *Mol. Crysr. Liq. Cryst.*, vol. 71, p. 111 (1981); Japan Society of Chemistry, *Kikan Kagaku Sosetsu*, No. 22, *Ekisho no Kagaku*, chap. 5, chap. 10(2) (1994); B. Kohne et al., *Angew. Chem. Soc. Chem. Comm.*, p. 1794 (1985); and J. Zhang et al., *J. Am. Chem. Soc.*, vol. 116, p. 2655 (1994)).

In the optical compensation layer, it is preferable that discotic liquid crystal molecules are fixed in the oriented state, most desirably having been fixed by polymerization. It is preferable in the invention that the discotic liquid crystal molecules are oriented and fixed perpendicularly to the transparent protective film face. Polymerization of discotic liquid crystal molecules is described in JP-A-8-27284. To fix discotic liquid crystal molecules by polymerization, it is needed to attach a polymerizable group, as a substituent, to the disc core of a discotic liquid crystal molecule. When the polymerizable group is attached directly to the disc core, however, the orientated state can be hardly maintained during the polymerization. Therefore, a linking group is introduced between the disc core and the polymerizable group. Discotic liquid crystal molecules having polymerizable group are disclosed in JP-A-2001-4387.

(Rod-Like Liquid Crystal Compound)

Examples of the rod-like liquid crystal compound usable in the invention include azomethines, azoxys, cyanobiphenyls, cyanophenyl esters, benzoic acid esters, cyclohexanecarboxlic acid phenyl esters, cyanophenylcyclohexanes, cyano-substituted phenylpyrimidines, alkoxy-substituted phenylpyrimidines, phenyldioxanes, tolans and alkenylcyclohexylbenzonitriles. In addition to these low-molecular weight liquid crystal compounds, use can be also made of high-molecular weight liquid crystal compounds.

In the optical compensation layer, it is preferable that rod-like liquid crystal molecules are fixed in the oriented state, most desirably having been fixed by polymerization. It is preferable in the invention that the rod-like liquid crystal molecules are oriented and fixed perpendicularly to the transparent protective film face. Examples of the polymerizable rod-like liquid crystal compound usable in the invention include compounds described in *Makromol. Chem.*, vol. 190, p. 255 (1989), *Advanced Materials*, vol. 5, p. 107 (1993), U.S. Pat. No. 4,683,327, U.S. Pat. No. 5,622,648, U.S. Pat. No. 5,770,107, WO 95/22586, WO 95/24455, WO 97/00600, WO 98/23580, WO 98/52905, JP-A-1-272551, JP-A-6-16616, JP-A-7-110469, JP-A-11-80081 and JP-A-2001-328973.

(Polarizer)

As the polarizer, use may be made of various types without specific restriction. Examples of the polarizer include products obtained by allowing a hydrophilic polymer film (for example, a polyvinyl alcohol-base film, a partly formalized polyvinyl alcohol-base film or a partly saponified ethylene/vinyl acetate copolymer-base film) to adsorb a dichromatic substance such as iodine or a dichromatic dye and then monoaxially stretching the film, and a polyene-base oriented film made of, for example, dehydrated polyvinyl alcohol or dehydrochlorinated polyvinyl chloride. Among these polarizers, a polarizer comprising a polyvinyl alcohol-base film with a dichromatic substance such as iodine is appropriate. Such a polarizer generally has a thickness of from about 5 to 80 µm, though the invention is not restricted thereto.

A polarizer comprising a polyvinyl alcohol-base film dyed with iodine and monoaxially stretched can be constructed by, for example, dyeing polyvinyl alcohol by dipping in an aqueous iodine solution and then stretched 3- to 7-fold. If necessary, the film may be dipped in an aqueous solution of potassium iodide or the like optionally containing boric acid, zinc sulfate, zinc chloride or the like. If necessary, it is also possible to wash the polyvinyl alcohol-base film with water by dipping in water before dyeing. By washing the polyvinyl alcohol-base film with water, dusts and debris and the blocking inhibitor remaining on the film surface can be washed away. Furthermore, an effect of preventing nonuniformity such as irregularities can be established thereby due to the swelling of the polyvinyl alcohol-base film. Stretching may be carried out after dyeing the film with iodine. Alternatively, stretching and dyeing may be carried out simultaneously or dyeing may be performed after the completion of stretching. It is also possible to stretch the film in an aqueous solution of boric acid or potassium iodide or in a water bath.

The transparent protective film may be processed in the face on which no polarizer is adhered (i.e., the face having no coating layer as described above) to form a hard coat layer or prevent reflection, sticking, diffusion or glareness (antiglare). It is preferable in the invention to form at least one of a hard coat layer, an antiglare layer and an antireflective layer.

Hardcoating treatment is performed to prevent the polarizer surface from scuffmarks. A hardcoat layer can be formed by forming a hardened film made an appropriate ultraviolet-hardening resin which is excellent in hardness, slipperiness and so on (for example, an acrylic or silicone resin) on the surface of the transparent protective film. Antireflective treatment, which is performed to prevent reflection of outside light on the polarizer surface, can be carried out by a method commonly employed in the art, for example, forming an antireflective film. Antisticking treatment is performed to prevent close adhesion to the adjacent layer.

Antiglare treatment, which is performed to prevent the phenomenon of inhibiting the observation of light transmitting through the polarizer due to the reflection of outside light on the polarizer surface, can be made by forming fine peaks and valleys on the transparent protective film surface in an appropriate manner of for example, roughening the surface by sandblasting or embossing or adding fine transparent particles.

As the fine particles to be added for forming fine peaks and valleys on the transparent protective film surface, use may be made of transparent fine particles such as inorganic fine particles optionally having electrical conductivity and having an average particle size of from 0.5 to 50 µm made of silica, alumina, titania, zirconia, tin oxide, indium oxide, cadmium oxide, antimony oxide or the like or organic fine particles made of crosslinked or non-crosslinked polymers or the like. In the case of forming fine peaks and valleys on the surface, these fine particles may be added generally in an amount of from 2 to 50 parts by mass, preferably from 5 to 25 parts by mass per 100 parts by mass of the transparent resin on which the fine peaks and valleys are to be formed. The antiglare layer may also serve as a diffusion layer for diffusing light transmitting through the polarizing plate to thereby enlarge the viewing angle (viewing angle-enlargement effect, etc.).

The antireflective layer, antisticking layer, diffusion layer, antiglare layer and so on as described above may be formed on the transparent protective film per se. Alternatively, these layers may be formed as optical layers separately form the transparent protective film.

[Surface Treatment]

If necessary, the cellulose acylate film according to the invention may be surface-treated to thereby improve the adhesion thereof to various functional layers (for example, an undercoating layer and a back layer). As the surface treatment, use can be made of glow discharge treatment, ultraviolet irradiation treatment, corona discharge treatment, flame treatment and acid- or alkali-treatment. The glow discharge treatment as used herein may be either low-temperature plasma treatment under a low gas pressure of $10^{-3}$ to 20 Torr or plasma treatment under atmospheric pressure. Examples of a plasma excitation gas, which is a gas plasma excited under the above conditions, include argon, helium, neon, krypton, xenon, nitrogen, carbon dioxide, chlorofluorocarbons such as tetrafluoromethane and mixtures thereof. These gases are described in detail in Japan Institute of Invention and Innovation Journal of Technical Disclosure No. 2001-1745 (2001 Mar. 15, Japan Institute of Invention and Innovation), p. 30 to 32, which are preferably usable in the invention.

[Contact Angle of Film Surface by Alkali Saponification Treatment]

Alkali saponification treatment may be cited as one of effective means of surface treatment of the transparent protective film in the invention. In this case, the alkali-saponified film surface has a contact angle of preferably 55° or less, still preferably 50° or less and still preferably 45° or less. The contact angle is determined by a conventional method for evaluating hydrophilic/hydrophobic nature which comprises dropping a water drop of 3 mm in diameter on the alkali-saponified film surface and measuring the angle between the film surface and the water drop.

The polarizer is adhered to the transparent protective film by, after the completion of the surface treatment as described above, using an isocyanate-base adhesive, a polyvinyl alcohol-base adhesive, a gelatin-base adhesive, a vinyl-base latex, an aqueous polyester or the like.

The optical compensation layer may be laminated on the polarizing plate by an arbitrary method without restriction. Namely, the lamination can be made by bonding the optical compensation layer to the transparent protective film with the use of an adhesive layer or a pressure-sensitive adhesive layer. The pressure-sensitive adhesive constituting the pressure-sensitive adhesive layer may be appropriately selected from among, for example, those having base polymers such as acrylic polymers, silicone polymers, polyesters, polyurethanes, polyethers, fluoropolymers or rubbers, though the invention is not restricted thereto. In particular, it is preferable to use an acrylic pressure-sensitive adhesive, since it is excellent in optical transparency, shows appropriate pressure-sensitive adhesion properties including wettability, cohesion properties and adhesiveness and is excellent in weatherability and heat resistance.

[Construction of Polarizing Plate]

A polarizing plate can be obtained by laminating the transparent protective film on both faces of the polarizer. The transparent protective film may be laminated by any method without particular restriction. In the case of bonding the above-described transparent protective film to a polarizer, use is made of an adhesive or a pressure-sensitive adhesive. As the adhesive or the pressure-sensitive adhesive, it is preferable to employ one which contains little volatile components, does not need a high temperature for hardening and drying and can be treated within a short period of time, considering changes in the moisture content and characteristics of the polarizing plate.

As the adhesive or the pressure-sensitive adhesive, it is preferable to employ an aqueous adhesive. For example, use can be made of isocyanate-base adhesives, polyvinyl alcohol-base adhesives, gelatin-base adhesives, vinyl-base latexes, aqueous polyesters and so on. The aqueous adhesive is usually used as an adhesive in the form of an aqueous solution containing from 0.5 to 60% by weight of solid matters.

The face of the transparent protective film to be adhered to the polarizer can be treated so as to facilitate the adhesion. Thus, the adhesive force can be enhanced. The treatment for facilitating adhesion can be carried out by drying or applying a material for facilitating adhesion. Examples of the drying treatment include corona treatment, gas corona treatment, plasma treatment, low-pressure UV treatment and so on. Examples of the material for facilitating adhesion include cellulose ester-base resins, urethane-denatured copolymer polyester resins, silane coupling agents and so on. It is also possible to combine the drying treatment with the application of the material for facilitating adhesion. Moreover, it is possible to saponify the transparent protective film with, for example, an aqueous solution of sodium hydroxide to thereby enhance the adhesive force. It is also possible to carry out saponification after the treatment for facilitating adhesion.

The transparent protective film may be bonded to the polarizer by using a roll laminator or the like. An adhesive, etc. may be applied either to the transparent protective film or the polarizing plate. It may be applied to both of them. After bonding, it is dried to thereby form an adhesive layer comprising the dried coating layer. The thickness of the adhesive layer usually ranges form about 0.1 to 5 μm, though the invention is not restricted thereto.

After bonding the transparent protective film and the optical compensation layer on both faces of the polarizer, the above-described polarizing plate according to the invention is dried. The drying temperature is usually from 20 to 100° C., preferably 30 to 80° C., though it varies depending on the type of the adhesive, etc. The drying time is from 1 to 30 minutes, preferably form 1 to 15 minutes. Under such drying conditions, the adhesive can be hardened and moisture can be removed.

The optical compensation polarizing plate and the layers such as the adhesive layers may have a function of absorbing ultraviolet light which is imparted by treating an ultraviolet absorbing agent such as a salicylic acid ester compound, a benzophenol compound, a benzotriazole compound, a cyanoacrylate compound or a nickel complex salt compound.

The optical compensation polarizing plate according to the invention is appropriately usable in a liquid crystal display unit of the IPS mode. A liquid crystal display unit of the IPS mode has a liquid crystal cell which is provided with a pair of substrates holding a liquid crystal layer between them, electrodes formed on one of the substrates, a liquid crystal composition layer having dielectric anisotropy hold between the substrates, an orientation regulating layer for aligning the molecules of the liquid crystal composition which is formed opposite to the substrates and a driving means for applying driving voltage on the electrodes. The electrodes have an alignment structure allowing the application of an electric field almost parallel with the interface between the orientation regulating layer and the liquid crystal composition layer.

The optical compensation polarizing plate according to the invention is provided in the viewing side or the light incidence side. It is preferable that the optical compensation layer side of the optical compensation polarizing plate is located in. the liquid crystal cell side. On the side of the liquid crystal cell opposite to the optical compensation polarizing plate, a polarizing plate is located. The absorption axis of the polarizing plate and the absorption axis of the optical compensation polarizing plate, which are provided in both sides of the cell substrate, are in perpendicular to each other. As the polarizing plate, use is made of the same polarizer having transparent protective films laminated on both faces as in the optical compensation polarizing plate. As the transparent protective film, it is preferable to employ a cellulose acylate film and a cellulose triacetate film is particularly preferable. It is preferable to use a cellulose acylate film with $|Re| \leq 10$ and $|Rth| \leq 25$ which is employed in the optical compensation polarizing plate according to the invention, in at least one side of the polarizer.

In the case of providing the optical compensation polarizing plate in the viewing side of the liquid crystal cell of the IPS mode, it is preferable to locate the polarizing plate in the cell substrate of the opposite side (light incidence side) to the viewing side in such a manner that the major axis direction of liquid crystal molecules in the liquid crystal cell is in perpendicular to the absorption axis direction of the polarizing plate under no voltage application.

In the case of providing the optical compensation polarizing plate in the light incidence side of the liquid crystal cell of the IPS mode, it is preferable to locate the polarizing plate in the cell substrate of the viewing side in such a manner that the major axis direction of liquid crystal molecules in the liquid crystal cell is in perpendicular to the absorption axis direction of the polarizing plate under no voltage application.

In the case of using in practice, other optical layers may be laminated on the optical compensation polarizing plate and the polarizing plate. Although such optical layers are not particularly restricted, use may be made of one or more optical layers employed in forming liquid crystal display units and so on, for example, a reflective plate, a semitransmission plate, a phase contrast plate (including ½ and ¼ wavelength plates) and the like. A reflective polarizing plate or a semitransmission polarizing plate having a reflective plate or a semitransmission plate laminated on a polarizing plate and a polarizing plate having a luminance improving film laminated on a polarizing plate are preferred.

A reflective polarizing plate, which has a reflective plate laminated on a polarizing plate, is used for forming a liquid crystal display unit by which display is made due to the reflection of incident light form the viewing side (display side). It is advantageous in that no inner light source (a back light, etc.) is needed and thus the unit thickness can be reduced. The reflective polarizing plate can be constructed by an appropriate method, for example, by forming a reflective layer made of a metal or the like on one face of a polarizing plate via a transparent protective layer, etc., if needed.

Specific examples of reflective polarizing plate include a polarizing plate which has a reflective layer formed by a foil or a deposition film made of a reflective metal such as aluminum on one face of a transparent protective film having been matted if necessary, and a polarizing plate which has a transparent protective film having a surface structure with fine peaks and valleys formed by adding fine particles to a transparent protective film as described above and a reflective layer having a surface structure with fine peaks and valleys provided thereon. The reflective layer having a surface structure with fine peaks and valleys is advantageous in reducing directivity and preventing glare appearance by diffusing incident light and relieve irregularities in lightness. The transparent protective film containing fine particles is advantageous in that incident light and reflecting light are diffused upon transmission and thus irregularities in lightness can be relieved. Such a reflective layer having a surface structure with fine peaks and valleys derived from the surface structure with fine peaks and valleys of the transparent protective film may be formed directly forming a metallic layer on the transparent protective layer by an appropriate method (for example, the vacuum deposition method, the sputtering method, the ion plating method or the like).

As a substitute for the system of directly forming a reflective plate on the transparent protective film of the polarizing plate as described above, use can be also made of a reflective sheet comprising an appropriate film corresponding to the transparent film and a reflective layer formed thereon. Since a reflective layer is usually made of a metal, it is preferable to coat the reflective face thereof with a transparent protective film, a polarizing plate or the like so that prevent a lowering in reflectance due to oxidation and, in its turn, sustain the initial reflectance over a long time without resort to any separate protective layer.

A semitransmission polarizing plate can be obtained by employing a semitransmission reflective layer such as a half mirror, which allows the reflection and transmission of light, as the reflective layer as described above. Such a semitransmission polarizing plate is usually provided in the back side of a liquid crystal cell. In the case of using a liquid crystal display unit or the like in a relatively light atmosphere, image display is made due to the reflection of incident light from the viewing side (display side). In a relatively dark atmosphere, on the other hand, image display is made by using an inner light source such as a back light. Namely, the semitransmission polarizing plate is useful in forming a liquid crystal display unit in which energy for the light source such as a back light can be saved in a light atmosphere and image display is made by using a inner light source even in a relatively dark atmosphere.

Next, an optical compensation polarizing plate having an optical compensation layer laminated on a polarizing plate will be illustrated. An optical compensation layer is employed in order to convert linear polarized light into ellipse or circular polarized light, convert ellipse or circular polarized light into linear polarized light, or change the polarization direction of linear polarized light. As an optical compensation layer for converting linear polarized light into circular polarized light or circular polarized light into linear polarized light, in particular, use is made of a so called ¼ wavelength plate (also called a λ/4 plate). A ½ wavelength plate (also called a λ/2 plate) is usually employed in changing the polarization direction of linear polarized light.

An optical compensation polarizing plate is effectively used in the case of compensating (preventing) a coloration (blue, yellow, etc.) caused by double refraction in the liquid crystal layer of a liquid crystal display unit to give monochromic display free form the coloration. It is still preferable to regulate three-dimensional refractive index, since coloration occurring in looking from an angle can be also compensated (prevented) thereby. An optical compensation polarizing plate is effectively usable in, for example, controlling the color tone of an image in a reflective liquid crystal display unit with multicolor image display. It also has a function of preventing reflection.

A polarizing plate comprising a polarizing plate and a luminance-improving film bonded thereto is usually provided in the back side of a liquid crystal cell. A luminance-improving film reflects linear polarized light with a definite polarization angle or circular polarization in a definite direction and allows transmission of other light upon the incidence of natural light. By using the polarizing plate having such a luminance-improving film laminated on a polarizing plate, polarized light in a definite polarization state can be obtained from incident light from a light source such as a back light while reflecting light not in the definite polarization state. The light reflecting on this luminance-improving film face is further reversed via a reflective layer or the like provided in the backside and then made to enter the luminance-improving film again. Then the re-incident light is partly or entirely allowed to transmit as light in the definite polarization state. Thus, the light quantity transmitting the luminance-improving film can be enlarged and polarized light hardly absorbed by a polarizer is supplied to thereby enlarge the light quantity usable in a liquid crystal display unit or the like and improve luminance. In other words, in the case of incident light passing through a polarizer or the like from, for example, a back light provided in the back side of a liquid crystal cell without using a luminance-improving film, light having a polarization direction differing from the polarization axis of the polarizer is mostly absorbed by the polarizer and cannot transmit the polarizer. Namely, about 50% of light is absorbed by the polarizer, though it varies depending on the characteristics of the polarizer employed. As a result, the quantity of light usable in liquid crystal image display or the like is decreased and the obtained image becomes dark. In using the luminance-improving film, light having a polarization direction absorbable by a polarizer does not enter but once reflects on the luminance-improving film. Then the light is reversed via a reflective layer or the like provided in the back side and then made to enter the luminance-improving film again. By repeating these procedures, polarized light having a polarization direction allowing the transmission through the polarizer alone passes and supplied to the polarizer. Owing to this system, light from a backlight or the like can be efficiently used in image display of a liquid crystal display unit and the screen can be brightened.

It is also possible to provide a diffusion plate between the luminance-improving film and the reflective layer. Light reflecting on the luminance-improving film moves toward the reflective layer or the like. The diffusion plate makes it possible to uniformly diffuse the transmission light and release the polarization state, thereby bringing about the non-polarized state. That is to say, the diffusion plate convert polarized light into natural light. The light in the non-polarized state (i.e., natural state) moves toward the reflective layer and reflects again on the reflective layer. Subsequently, the light passes through the diffusion plate again and enters again the luminance-improving film. These procedures are repeated. By providing the diffusion layer, which converts polarized light into natural light, between the luminance-improving film and the reflective layer or the like as described above, the brightness of display screen can be maintained at a certain level and, at the same time, irregularities in the brightness of the display screen can be lessened. Thus, a uniform and bright display screen can be obtained. It appears that, by providing such a diffusion plate, the repeating number of the initial incident light can be appropriately elevated to thereby achieve a synergistic effect of providing a uniform and bright display screen together with the diffusion function of the diffusion plate.

As the luminance-improving film as described above, use can be made of a film allowing the transmission of linear polarized light with a definite polarization axis but reflects other light such as dielectric multilayered film or a multilayer lamination composed of thin films differing in reflective anisotropy (for example, D-BEF manufactured by 3M), and a film capable of reflecting circular polymerized light of either clockwise or counterclockwise direction and allowing the transmission of other light such as an oriented film of a cholesteric liquid crystal polymer and a film having this oriented liquid crystal layer on a film base (for example, PCF350 manufactured by NITTO DENKO and Transmax manufactured by Merck).

In a luminance-improving film allowing the transmission of linear polarized light with a definite polarization axis as described above, therefore, transmission light enters a polarizer as such while controlling the polarization axis. Thus, the light can be efficiently transmitted while regulating the absorption by the polarizing plate. In a luminance-improving film allowing the transmission of circular polarized light such as a cholesteric liquid crystal layer, light can enter a polarizing plate as such. From the viewpoint of regulating absorption loss, however, it is preferable that the circular polarized light is converted into linear polarized light via a phase contrast plate prior to the incidence to the polarizing plate. As the phase contrast plate, a ¼ wavelength plate can be used so as to convert the circular polarized light into linear polarized light.

A phase contrast plate acting as a ¼ wavelength plate over a wide wavelength range can be obtained by piling a phase contrast layer serving as a ¼ wavelength plate for faint color light of, for example 550 nm upon a phase contrast layer showing different phase contrast characteristics such as a phase contrast layer serving as a ½ wavelength plate. Namely, the phase contrast plate to be provided between the polarizing plate and the luminance-improving film may comprise one or more phase contrast layers.

In the case of a cholesteric liquid crystal layer, two or more layers differing in reflective wavelength may be piled upon each other. Owing to this structure, circular polarized light over a wide wavelength range (for example, the visible light region) can be reflected and, in its turn, transmission circular polarized light over a wide wavelength range can be obtained.

As the above-described polarizing plate for separating polarized light, a polarizing plate may comprise two or more optical layers laminated together. Therefore, use may be made of a reflective ellipse polarizing plate or a semitransmission ellipse polarizing plate comprising a combination of the reflective polarizing plate or the semitransmission polarizing plate as described above with the phase contrast plate.

The optical compensation layer can be formed by successively and separately laminating in the course of producing a liquid crystal display unit or the like. Alternatively, it may be preliminarily laminated on the transparent protective film to give an optical compensation polarizing plate. This method is advantageous in being excellent in quality stability and fabricating performance and this contributing to the improvement in the production process for a liquid crystal display unit or the like. Lamination is made with the use of an appropriate adhesion means such as a pressure-sensitive adhesive layer.

A liquid crystal display unit can be constructed in a conventional manner. Generally speaking, a liquid crystal display unit is constructed by appropriately assembling required parts such as an illumination system and integrating a driving circuit. In the invention, a liquid crystal display unit can be constructed in a conventional manner without specific restriction but using the optical film as described above. Various types of liquid crystal cells such as one of the IPS mode as cited above, one of the VA type and one of the 7t type can be arbitrarily used.

As the liquid crystal display unit, use can be made of an appropriate liquid crystal display unit, for example, one having an illumination system or a reflective plate. In constructing a liquid crystal display unit, appropriate parts (for example, a diffusion plate, an antiglare layer, an antireflective film, a protective plate, a prism array, a lens array sheet, a light diffusion plate, a back light and so on) can be provided at appropriate sites to give one or more layers.

This application is based on Japanese Patent application JP 2004-148335, filed May 18, 2004, Japanese Patent application JP 2004-380722, filed Dec. 28, 2004, and Japanese Patent application JP 2005-68096, filed Mar. 10, 2005, the entire contents of which are hereby incorporated by reference, the same as if set forth at length.

EXAMPLES

Now, the invention will be illustrated in greater detail by reference to the following EXAMPLES. However, it is to be understood that the invention is not construed as being restricted to these EXAMPLES.

(Retardation Value in Plane Re)

A sample (30 mm×40 mm) was conditioned at 25° C. 60% RH for 2 hours. Then Re value at 590 nm was measured in the normal direction with the use of an automatic double refract meter KOBRA 21 ADH (manufactured by OJI KEISOKU KIKI). In the case of determining wavelength dispersion $|Re_{(400)}-Re_{(700)}|$ or the like, measurement was made at different wavelengths.

(Retardation in Film Thickness Direction Rth)

A sample (30 mm×40 mm) was conditioned at 25° C. 60% RH for 2 hours. Then Rth value at 590 nm was determined with the use of an automatic double refractometer KOBRA 21 ADH (manufactured by OJI KEISOKU KIKI) by using retardation values measured by incident light in the normal direction at 590 nm and in directions inclining at 10°, 20°, 30°, 40° and 50° to the normal direction of the film using the slow axis in the plane as the incline angle (rotation angle) and a presumptive average refractive index and the film thickness. As the presumed average refractive index, use can be made of data given in POLYMER HANDBOOK, JOHN WILEY & SONS, INC) and catalogs of various optical films. In the case where average refractive index is unknown, it can be measured with the use of an Abbe refractometer. Average refractive indexes of major optical films are as follows: cellulose acylate (1.48), cycloolefin polymer (1.52), polycarbonate (1.59), polymethyl methacrylate (1.49), polystyrene (1.59).

In the case of determining wavelength dispersion $|Rth_{(400)}-Rth_{(700)}|$ or the like, measurement was made at different wavelengths.

(Measurement of Nz)

$Nz=(nx-nz)/(nx-ny)$ was calculated by determining nx, ny and nz mined with the use of an automatic double refractometer KOBRA 21 ADH (manufactured by Oil KEISOKU KIKI) by using retardation values measured by incident light in the normal direction at 590 tun and in directions inclining at 10°, 20°, 30°, 40° and 50° to the normal direction of the film using the slow axis in the plane as the incline angle (rotation angle) and a presumptive average refractive index and the film thickness.

(Haze of Film)

Haze was measured by using a haze meter (manufactured by NIPPON DENSHOKU).

(Measurement of Moisture Content of Film)

Moisture content was determined by the Karl Fisher method.

(Measurement of Vapor Transmission Rate)

Vapor transmission rate was measured by the cup method.

Example 1

Production of Transparent Protective Film

| | |
|---|---|
| A cellulose acetate powder (flakes) was gradually added to a solvent mixture solution comprising the following components in a stainless dissolution tank (4000 L) provided with stirring blade while thoroughly stirring and dispersing until the total amount attained 2000 kg. Individual compound lowering optical anisotropy according to the inventions and wavelength dispersion regulators according to the invention (as listed in Table 1) were added to give samples 101 to 106. cellulose triacetate (degree of substitution shown in Table 1) | 17.0 parts by mass |
| methylene chloride | 70.5 parts by mass |
| methanol | 10.5 parts by mass |
| compound imparting optical isotropy (as listed in Table 1) | 2.0 parts by mass |
| compound regulating wavelength dispersion (as listed in Table 1) | 0 or 8 parts by mass |

A transparent protective film had a phase contrast value in plane of $|Re| \leq 10$ nm and a phase contrast in the thickness direction of $|Rth| \leq 25$ nm.

It also had $|Re_{(400)} - Re_{(700)}| \leq 10$ nm and $|Rth_{(400)} - Rth_{(700)}| \leq 35$ nm.

(Lamination of Optical Compensation Layer)

After surface-saponifying the cellulose acylate samples 101 to 106 as described above, it was confirmed that the contact angles of these samples were 38°. Next, a coating solution for orientation film of the following composition was applied on each film with a wire bar coater at 20 ml/m² and dried under a hot air stream at 60° C. for 60 seconds and then under a hot air stream at 100° C. for 120 seconds. Next, the thus formed film was rubbed in the direction parallel with the slow axis direction of the film.

| Composition of coating solution for orientation film | |
|---|---|
| denatured polyvinyl alcohol shown below | 15 parts by mass |
| water | 334 parts by mass |
| methanol | 100 parts by mass |
| glutaraldehyde | 1 part by mass |
| para-toluenesulfonic acid | 0.3 part by mass |

Denatured polyvinyl alcohol:

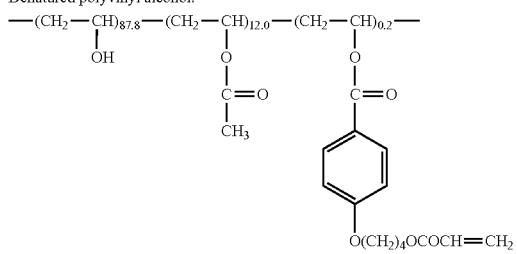

On the thus oriented film, a solution prepared by dissolving 1.8 g of the following discotic liquid crystal compound, 0.2 g of ethylene oxide-denatured trimethylolpropane triacrylate (V#360, manufactured by OSAKA ORGANIC CHEMICAL INDUSTRIES), 0.06 g of a photopolymerization initiator (Irgacure 907, manufactured by Ciba-Geigy), 0.02 g of a sensitizer (Kayacure DETX, manufactured by NIPPON KAYAKU Co., Ltd.) and 0.01 g of the following perpendicular orientation agent in the atmosphere-interface side in 3.9 g of methyl ethyl ketone was coated with a #3.4 wire bar. The obtained product was bonded to a metallic frame and heated in a thermostat at 125° C. for 3 minutes to thereby orientated the discotic liquid crystal compound. Subsequently, it was UV-irradiated at 100° C. with the use of a high-pressure mercury lamp at 120 W/cm for 30 seconds to thereby crosslink the discotic liquid crystal compound and then cooled to room temperature by allowing to stand. Thus, an optical compensation layer was laminated.

Discotic liquid crystal compound:

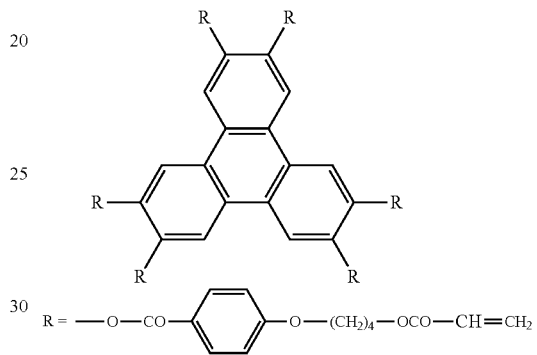

Perpendicular orientation agent in the atmosphere-interface side:

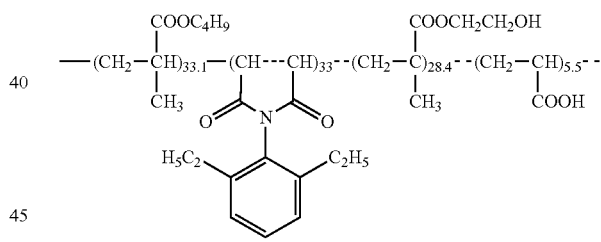

When the optical characteristics of the discotic liquid crystal phase contrast layer alone were calculated, $R_{e1}$ was 200 nm while the Nz value was 0.54. Thus, it was confirmed that the discotic liquid crystals are oriented perpendicularly to the film face. The slow axis direction was parallel with the rubbing direction.

(Construction of Optical Compensation Polarizing Plates 1 to 6)

Individual transparent protective film films having the optical compensation layers laminated thereon (the samples 101 to 106) and a tack film TD80UF (manufactured by FUJI PHOTOFILM Co., Ltd., 80 μm) were laminated on both faces of a film (polarizer: 20 μm), which was produced by allowing a polyvinyl alcohol-base film to adsorb iodine and oriented, with the use of an adhesive to give optical compensation polarizing plates 1 to 6.

(Construction of Polarizing Plates 1 to 6)

Individual transparent protective films (samples 101 to 106) as described above and a tack film TD80UF (manufactured by FUJI PHOTOFILM Co., Ltd., 80 μm) were laminated on both faces of a film (polarizer: 20 µm), which was produced by allowing a polyvinyl alcohol-base film to adsorb iodine, with the use of an adhesive to give polarizing plates 1 to 6.

(Construction of Liquid Crystal Display Unit 1)

The optical compensation polarizing plate 1 was laminated on an IPS mode liquid crystal cell in such a manner that the optical compensation layer side was provided as the face in the viewing side of the liquid crystal cell. On the opposite side of the liquid crystal cell, the polarizing plate 1 was laminated with a pressure-sensitive adhesive, thereby providing a liquid crystal display unit. The polarizing plate 1 in the viewing side was laminated so that the extraordinary refractive index direction of a liquid crystal composition in the liquid crystal cell was perpendicular to the absorption axis of the optical compensation polarizing plate under no voltage application. The polarizing plate 1 was provided so that the absorption axis thereof was perpendicular to the absorption axis of the optical compensation polarizing plate.

(Evaluation)

Using a contrast meter (EZ-Contrast, manufactured by ELDIM), the contrast ratios in plane and at an incline angle 70° from the normal line direction at a viewing angle of 45° to the light axis of the perpendicular polarizing plate were measured in this liquid crystal display unit. As a result, the contrast ratio in plane was 370, while that at 70° was 35. In black display, the degree of coloration in plane was compared with the degree of coloration at an incline angle 70° from the normal line direction at a viewing angle of 45° to the light axis of the perpendicular polarizing plate. As a result, little change was observed. When this liquid crystal display unit was exposed to 60° C. and 95% RH for 200 hours, in-plane irregularities were examined with the naked eye. As a result, little irregularities were observed. Similarly, the polarization performance was scarcely worsened.

(Construction of Liquid Crystal Display Units 2 to 6)

Liquid crystal display units 2 to 6 were constructed as in the liquid crystal display unit 1 but using the polarizing plates 2 to 6 as a substitute for the polarizing plate 1 and optical compensation polarizing plates 2 to 6 as a substitute for the optical compensation polarizing plate 1 employed in constructing the liquid crystal display unit 1. As a result, similar performances were achieved.

Example 2

Production of Transparent Protective Film

A cellulose triacetate solution was prepared and a sample 114 was produced as in EXAMPLE 1 but using the following composition.

| | |
|---|---|
| cellulose triacetate (a powder having degree of substitution 2.86, viscosity-average degree of polymerization of 320, moisture content of 0.4% by mass, viscosity in 6% by mass methylene chloride solution of 305 mPa·s, average particle size of 1.5 mm, and standard deviation of 0.5 mm) | 17.0 parts by mass |
| methylene chloride | 67.4 parts by mass |
| methanol | 12.7 parts by mass |
| butanol | 0.5 part by mass |
| triphenyl phosphate (TPP) | 1.3 parts by mass |
| biphenyl-diphenyl phosphate (BDP) | 0.7 part by mass |
| compound imparting optical isotropy (as listed in Table 1) | 2.0 parts by mass |
| compound regulating wavelength dispersion (as listed in Table 1) | 0.8 parts by mass |

(Construction of Polarizing Plate 7)

The above transparent protective film was laminated on both faces of a film (polarizer: 20 µm), which was produced by allowing a polyvinyl alcohol-base film to adsorb iodine, with the use of an adhesive to give a polarizing plates 7.

(Lamination of Optical Compensation Layer)

By stretching a polystyrene film, an optical compensation layer having a thickness of 60 µm, $R_{e1}$ of 260 nm and Nz value of 0.50 was obtained. This optical compensation layer was laminated on the polarizing plate 7 with a pressure-sensitive adhesive so that the slow axis was in parallel with the absorption axis of the polarizing plate. Thus, an optical compensation polarizing plate 7 was obtained.

(Construction of Liquid Crystal Display Unit 7)

The optical compensation polarizing plate 7 was laminated on an IPS mode liquid crystal cell in such a manner that the optical compensation layer side was provided as the face in the viewing side of the liquid crystal cell. On the opposite side of the liquid crystal cell, the polarizing plate 7 was laminated with a pressure-sensitive adhesive, thereby providing a liquid crystal display unit 7. The polarizing plate 7 in the viewing side was laminated so that the extraordinary refractive index direction of a liquid crystal composition in the liquid crystal cell was perpendicular to the absorption axis of the optical compensation polarizing plate 7 under no voltage application. The polarizing plate 7 was provided so that the absorption axis thereof was perpendicular to the absorption axis of the optical compensation polarizing plate.

(Evaluation)

The contrast ratios in plane and at an incline angle 70° from the normal line direction at a viewing angle of 45° to the light axis of the perpendicular polarizing plate were measured in this liquid crystal display unit. As a result, the contrast ratio in plane was 360, while that at 70° was 35. In black display, the degree of coloration in plane was compared with the degree of coloration at an incline angle 70° from the normal line direction at a viewing angle of 45° to the light axis of the perpendicular polarizing plate. As a result, little change was observed. When this liquid crystal display unit was exposed to 60° C. and 95% RH for 200 hours, in-plane irregularities were examined with the naked eye. As a result, little irregularities were observed. Similarly, the polarization performance was scarcely worsened.

Example 3

Production of Transparent Protective Film

A cellulose triacetate solution was prepared and a sample 114 was produced as in EXAMPLE 2 but using the following composition.

| | |
|---|---|
| cellulose triacetate (a powder having degree of substitution 2.86, viscosity-average degree of polymerization of 320, moisture content of 0.4% by mass, viscosity in 6% by mass methylene chloride solution of 305 mPa·S, average particle size of 1.5 mm, and standard deviation of 0.5 mm) | 17.0 parts by mass |
| methyl acetate | 62.4 parts by mass |
| ethanol | 5.7 parts by mass |
| butanol | 6.5 part by mass |
| triphenyl phosphate (TPP) | 1.3 parts by mass |
| biphenyl-diphenyl phosphate (BDP) | 0.7 part by mass |
| compound imparting optical isotropy (as listed in Table 1) | 2.0 parts by mass |
| compound regulating wavelength dispersion (as listed in Table 1) | 0.8 parts by mass |

(Construction of Polarizing Plate 8)

The above transparent protective film was laminated on both faces of a film (polarizer: 20 μm), which was produced by allowing a polyvinyl alcohol-base film to adsorb iodine, with the use of an adhesive to give a polarizing plates 8.

(Lamination of Optical Compensation Layer)

After surface-saponifying the cellulose acylate sample 115 as described above, it was confirmed that the contact angle of these sample was 38°. Next, a coating solution for orientation film of the following composition was applied on the film with a wire bar coater at 20 ml/m² and dried under a hot air stream at 60° C. for 60 seconds and then under a hot air stream at 100° C. for 120 seconds. Next, the thus formed film was rubbed in the direction parallel with the slow axis direction of the film. (Composition of coating solution for orientation film)

| | |
|---|---|
| denatured polyvinyl alcohol shown below | 15 parts by mass |
| water | 334 parts by mass |
| methanol | 100 parts by mass |
| glutaraldehyde | 1 part by mass |
| para-toluenesulfonic acid | 0.3 part by mass |

Denatured polyvinyl alcohol:

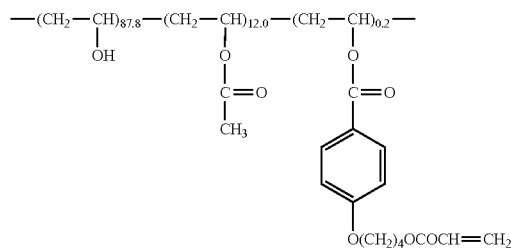

On the thus oriented film, a solution prepared by dissolving 1.8 g of the following discotic liquid crystal compound, 0.2 g of ethylene oxide-denatured trimethylolpropane triacrylate (V#360, manufactured by OSAKA ORGANIC CHEMICAL INDUSTRIES), 0.06 g of a photopolymerization initiator (Irgacure 907, manufactured by Ciba-Geigy), 0.02 g of a sensitizer (Kayacure DETX, manufactured by NIPPON KAYAKU Co., Ltd.) and 0.01 g of the following perpendicular orientation agent in the atmosphere-interface side in 3.9 g of methyl ethyl ketone was coated with a #3.4 wire bar. The obtained product was bonded to a metallic frame and heated in a thermostat at 125° C. for 3 minutes to thereby orientated the discotic liquid crystal compound. Subsequently, it was UV-irradiated at 100° C. with the use of a high-pressure mercury lamp at 120 W/cm for 30 seconds to thereby crosslink the discotic liquid crystal compound and then cooled to room temperature by allowing to stand. Thus, an optical compensation layer was laminated.

Discotic Liquid Crystal Compound:

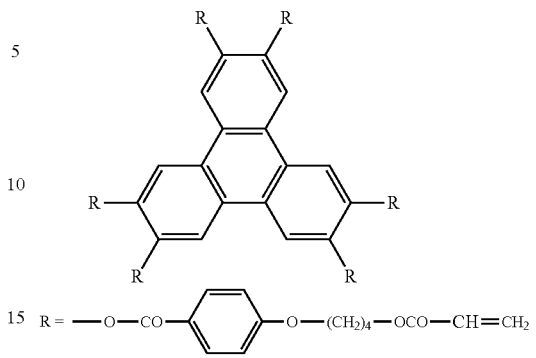

Perpendicular orientation agent in the atmosphere-interface side:

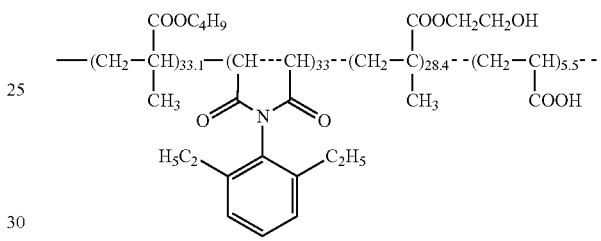

When the optical characteristics of the discotic liquid crystal phase contrast layer alone were calculated, $R_{e1}$ was 200 nm while the Nz value was 0.54. Thus, it was confirmed that the discotic liquid crystals are oriented perpendicularly to the film face. The slow axis direction was parallel with the rubbing direction.

(Construction of Liquid Crystal Display Unit 8)

The optical compensation polarizing plate 8 was laminated on an IPS mode liquid crystal cell in such a manner that the optical compensation layer side was provided as the face in the viewing side of the liquid crystal cell. On the opposite side of the liquid crystal cell, the polarizing plate 8 was laminated with a pressure-sensitive adhesive, thereby providing a liquid crystal display unit 8. The polarizing plate 8 in the viewing side was laminated so that the extraordinary refractive index direction of a liquid crystal composition in the liquid crystal cell was perpendicular to the absorption axis of the optical compensation polarizing plate 8 under no voltage application. The polarizing plate 8 was provided so that the absorption axis thereof was perpendicular to the absorption axis of the optical compensation polarizing plate 8.

(Evaluation)

The contrast ratios in plane and at an incline angle 70° from the normal line direction at a viewing angle of 45° to the light axis of the perpendicular polarizing plate were measured in this liquid crystal display unit. As a result, the contrast ratio in plane was 370, while that at 70° was 35. In black display, the degree of coloration in plane was compared with the degree of coloration at an incline angle 70° from the normal line direction at a viewing angle of 45° to the light axis of the perpendicular polarizing plate. As a result, little change was observed. When this liquid crystal display unit was exposed to 60° C. and 95% RH for 200 hours, in-plane irregularities were examined with the naked eye. As a result, little irregularities were observed. Similarly, the polarization performance was scarcely worsened.

Example 4

Production of Transparent Protective Film

A sample 116 was produced by preparing a cellulose triacetate solution as in EXAMPLE 1 but using cellulose triacetate having a larger degree of substitution (degree of substitution 2.94, viscosity-average degree of polymerization 320). The transparent protective film thus obtained was cut into pieces (10 cm×2 cm) and stretched by 5% with the use of Tensilon (manufactured by Orientec, Co.) at speed of 1 cm/min. Before and after the 5% orientation, the transparent protective film showed in plane retardation values $|Re_{(5)}-Re_{(0)}|/5=0.5$ nm.

(Construction of Polarizing Plate 9) (Lamination of Optical Compensation Layer) (Construction of Liquid Crystal Display Unit 9)

A polarizing plate 9, an optical compensation polarizing plate 9 and a liquid crystal display unit 9 of the IPS mode were obtained as in EXAMPLE 1 but using the above-described transparent protective film.

(Evaluation)

The contrast ratio at an incline angle 70° from the normal line direction at a viewing angle of 45° to the light axis of the perpendicular polarizing plate was measured in this liquid crystal display unit 9. As a result, the contrast ratio was 35. In black display, the degree of coloration in plane was compared with the degree of coloration at an incline angle 70° from the normal line direction at a viewing angle of 45° to the light axis of the perpendicular polarizing plate. As a result, little change was observed. When this liquid crystal display unit was exposed to 60° C. and 95% RH for 200 hours, in-plane irregularities were examined with the naked eye. As a result, little irregularities were observed. Similarly, the polarization performance was scarcely worsened.

Example 5

Production of Transparent Protective Film

A sample 117 was produced by preparing a cellulose triacetate solution as in EXAMPLE 1 but using cellulose acylates SEF-1, SEF-2 and SEF-3 as will be mentioned hereinafter as a substitute for cellulose triacetate. Then the performance was evaluated.

(Cellulose Acylate SEF-1)

Starting with cellulose collected from cotton, cellulose acylate SEF-1 was synthesized. Cellulose acylate SEF-1 was a powder having a degree of acetyl substitution of 1.20, a degree of butyryl substitution of 1.50, a total degree of substitution of 2.70, a viscosity-average degree of polymerization of 280, a moisture content of 0.2% by mass, a viscosity in a 6% by mass dichloromethane solution of 235 mPas, an average particle size of 1.5 mm and a standard deviation of 0.6 mm. In the solid cellulose acylate content, residual acetic acid content was 0.1% by mass or less and residual butanoic acid content was 0.1% by mass or less. Ca content was 85 ppm, Mg content was 30 ppm, Fe content was 0.3 ppm and sulfur content as sulfate was 130 ppm. The degree of substitution by acetyl group at the 6-position was 0.40, and the degree of substitution by butyryl group at the 6-position was 0.48. The weight-average molecular weight/number-average molecular weight ratio (determined by GPC) was 2.6.

(Cellulose Acylate SEF-2)

Cellulose acylate SEF-2 was a powder having a degree of acetyl substitution of 2.58, a degree of butyryl substitution of 1.30, a total degree of substitution of 2.88, a viscosity-average degree of polymerization of 365, a moisture content of 0.2% by mass, a viscosity in a 6% by mass dichloromethane solution of 290 mPas, an average particle size of 1.4 mm and a standard deviation of 0.6 mm.

(Cellulose Acylate SEF-3)

Cellulose acylate SEF-3 was a powder having a degree of acetyl substitution of 1.00, a degree of propionyl substitution of 1.85, a total degree of substitution of 2.85, a viscosity-average degree of polymerization of 280, a moisture content of 0.19% by mass, a viscosity in a 6% by mass dichloromethane solution of 105 mPa·s, an average particle size of 1.5 mm and a standard deviation of 0.4 mm.

The transparent protective film thus obtained was cut into pieces (10 cm×2 cm) and stretched by 5% with the use of Tensilon (manufactured by Orientec, Co.) at speed of 1 cm/min. Before and after the 5% orientation, the transparent protective film showed in plane retardation values $|Re_{(5)}-Re_{(0)}|/5=0.5$ nm.

(Construction of Polarizing Plate 10) (Lamination of Optical Compensation Layer) (Construction of Liquid Crystal Display Unit 10)

A polarizing plate 10, an optical compensation polarizing plate 10 and a liquid crystal display unit 10 of the IPS mode were obtained as in EXAMPLE 1 but using the above-described transparent protective film.

(Evaluation)

The contrast ratio at an incline angle 70° from the normal line direction at a viewing angle of 45° to the light axis of the perpendicular polarizing plate was measured in this liquid crystal display unit 9. As a result, the contrast ratio was 35. In black display, the degree of coloration in plane was compared with the degree of coloration at an incline angle 70° from the normal line direction at a viewing angle of 45° to the light axis of the perpendicular polarizing plate. As a result, little change was observed. When this liquid crystal display unit was exposed to 60° C. and 95% RH for 200 hours, in-plane irregularities were examined with the naked eye. As a result, little irregularities were observed. Similarly, the polarization performance was scarcely worsened. Thus, it can be understood that a specific cellulose acylate is preferably employed in the invention.

Example 6

Production of Transparent Protective Film

A cellulose acetate powder (flakes) was gradually added to a solvent mixture solution comprising the following components in a stainless dissolution tank (4000 L) provided with stirring blade while thoroughly stirring and dispersing until the total amount attained 2000 kg. Individual compound lowering optical anisotropy according to the inventions and wavelength dispersion regulators according to the invention (as listed in Table 1) were added to give samples 107 to 113 and samples 118 to 121.

| | |
|---|---|
| cellulose triacetate (degree of substitution 2.94, viscosity-average degree of polymerization 320) | 17.0 parts by mass |
| methylene chloride | 70.5 parts by mass |
| methanol | 10.5 parts by mass |

| | |
|---|---|
| compound imparting optical isotropy (as listed in Table 1) | 2.0 parts by mass |
| compound regulating wavelength dispersion (as listed in Table 1) | 0 or 8 parts by mass |

When measured in an arbitrary area (1 m²), the phase contrast value in plane Re was 1±1 nm, the contrast in the thickness direction of Rth was 0±1 nm. After treating the transparent protective film at 60° C. and 90% RH for 240 hours, Re and Rth showed changes of 3 nm and 5 nm respectively. After treating the transparent protective film at 80° C. for 240 hours, Re and Rth showed changes of 2 nm and 5 nm respectively.

(Construction of Polarizing Plates 11 to 21)

Individual transparent protective films (107 to 113 and 118 to 121) as described above and an antireflective film CV02L80 (manufactured by FUJI PHOTOFILM Co., Ltd., 80 μm) were laminated on both faces of a film (polarizer: 20 μm), which was produced by saponifying a polyvinyl alcohol-base film and then allowing it to adsorb iodine, with the use of an adhesive to give polarizing plates 11 to 21.

(Lamination of Optical Compensation Layer)

By stretching a polycarbonate film, an optical compensation layer having a thickness of 60 μm, $R_{e1}$ of 210 nm and Nz value of 0.48 was obtained. This optical compensation layer was laminated on the polarizing plates 11 to 17 in the side of the samples 107 to 113 with a pressure-sensitive adhesive so that the slow axis of the optical compensation layer was in parallel with the absorption axis of the polarizing plate in each case. Thus, optical compensation polarizing plates 11 to 21 were obtained.

(Construction of Liquid Crystal Display Unit 11)

The optical compensation polarizing plate 11 was laminated on an IPS mode liquid crystal cell in such a manner that the optical compensation layer side was provided as the face in the viewing side of the liquid crystal cell. On the opposite side of the liquid crystal cell, the polarizing plate 11 was laminated with a pressure-sensitive adhesive, thereby providing a liquid crystal display unit 11. The polarizing plate 11 in the viewing side was laminated so that the extraordinary refractive index direction of a liquid crystal composition in the liquid crystal cell was perpendicular to the absorption axis of the optical compensation polarizing plate 11 under no voltage application. The polarizing plate 11 was provided so that the absorption axis thereof was perpendicular to the absorption axis of the optical compensation polarizing plate.

(Evaluation)

Using a contrast meter (EZ-Contrast, manufactured by ELDIM), the contrast ratios in plane and at an incline angle 70° from the normal line direction at a viewing angle of 45° to the light axis of the perpendicular polarizing plate were measured in this liquid crystal display unit. As a result, the contrast ratio in plane was 370, while that at 70° was 35. In black display, the degree of coloration in plane was compared with the degree of coloration at an incline angle 70° from the normal line direction at a viewing angle of 45° to the light axis of the perpendicular polarizing plate. As a result, little change was observed. When this liquid crystal display unit was exposed to 60° C. and 95% RH for 200 hours, in-plane irregularities were examined with the naked eye. As a result, little irregularities were observed. Similarly, the polarization performance was scarcely worsened.

(Construction of Liquid Crystal Display Units 12 to 21)

Liquid crystal display units 12 to 21 were constructed as in the construction of the liquid crystal display unit 11 but using the polarizing plates 12 to 21 as a substitute for the polarizing plate 11 and the optical compensation polarizing plates 12 to 21 as a substitute for the optical compensation polarizing plate 21. As a result, similar performances were achieved.

Example 7

Production of Transparent Protective Films

The samples 118 to 121 obtained in EXAMPLE 6 were stretched 1.1-fold by fixed-end transverse stretching at 140° C. and then dipped in a 10% aqueous sodium hydroxide solution at 75° C. for 1 minute for hydrophilization. Then the samples were washed with purified water and dried at 70° C. for 3 minutes for hydrophilization to give transparent protective films 122 to 125.

(Construction of Polarizing Plates 22 to 25)

Individual transparent protective films (122 to 125) as described above and an antireflective film CV02L80 (manufactured by FUJI PHOTOFILM Co., Ltd., 80 μm) were laminated on both faces of a film (polarizer: 20 μm), which was produced by saponifying a polyvinyl alcohol-base film and then allowing it to adsorb iodine, with the use of an adhesive to give polarizing plates 22 to 25.

(Lamination of Optical Compensation Layer)

An optical compensation layer obtained by stretching a polycarbonate film as in EXAMPLE 6 was laminated on the polarizing plates 22 to 25 in the side of the samples 122 to 125 with a pressure-sensitive adhesive so that the slow axis of the optical compensation layer was in parallel with the absorption axis of the polarizing plate in each case. Thus, optical compensation polarizing plates 22 to 25 were obtained.

(Construction of Liquid Crystal Display Unit 22)

The optical compensation polarizing plate 22 was laminated on an IPS mode liquid crystal cell in such a manner that the optical compensation layer side was provided as the face in the viewing side of the liquid crystal cell. On the opposite side of the liquid crystal cell, the polarizing plate 22 was laminated with a pressure-sensitive adhesive, thereby providing a liquid crystal display unit 22. The polarizing plate 22 in the viewing side was laminated so that the extraordinary refractive index direction of a liquid crystal composition in the liquid crystal cell was perpendicular to the absorption axis of the optical compensation polarizing plate 22 under no voltage application. The polarizing plate 22 was provided so that the absorption axis thereof was perpendicular to the absorption axis of the optical compensation polarizing plate.

(Evaluation)

Using a contrast meter (EZ-Contrast, manufactured by ELDIM), the contrast ratios in plane and at an incline angle 70° from the normal line direction at a viewing angle of 45° to the light axis of the perpendicular polarizing plate were measured in this liquid crystal display unit. As a result, the contrast ratio in plane was 370, while that at 70° was 35. In black display, the degree of coloration in plane was compared with the degree of coloration at an incline angle 70° from the normal line direction at a viewing angle of 45° to the light axis of the perpendicular polarizing plate. As a result, little change was observed. When this liquid crystal display unit was exposed to 60° C. and 95% RH for 200 hours, in-plane irregularities were examined with the naked eye. As a result, little irregularities were observed. Similarly, the polarization performance was scarcely worsened.

(Construction of liquid crystal display units 23 to 25)

Liquid crystal display units 23 to 25 were constructed as in the construction of the liquid crystal display unit 22 but using the polarizing plates 13 to 25 as a substitute for the polarizing plate 22 and the optical compensation polarizing plates 13 to 25 as a substitute for the optical compensation polarizing plate 21. As a result, similar performances were achieved.

Example 8

Lamination of Optical Compensation Layer

On the samples 118 to 121 obtained in EXAMPLE 6, an optical compensation layer was laminated via an oriented film as in EXAMPLE 1. Next, the samples were stretched 1.05-fold by longitudinal stretching at 140° C. and then dipped in a 10% aqueous sodium hydroxide solution at 75° C. for 1 minute for hydrophilization. Then the samples were washed with purified water and dried at 70° C. for 3 minutes for hydrophilization. Then lamination was made with the use of a pressure-sensitive adhesive so that the slow axis of the optical compensation layer was in parallel with the absorption axis of the polarizing plate to give optical compensation layer-having protective films 26 to 29.

(Optical compensation polarizing plates 26 to 29)

Individual optical compensation layer-having protective films (26 to 29) as described above and an antireflective film CV02L80 (manufactured by FUJI PHOTOFILM Co., Ltd., 80 μl) were laminated on both faces of a film (polarizer: 20 μm), which was produced by saponifying a polyvinyl alcohol-base film and then allowing it to adsorb iodine, with the use of an adhesive to give polarizing plates 26 to 29.

(Construction of Liquid Crystal Display Unit 26)

The optical compensation polarizing plate 26 was laminated on an IPS mode liquid crystal cell in such a mariner that the optical compensation layer side was provided as the face in the viewing side of the liquid crystal cell. On the opposite side of the liquid crystal cell, the polarizing plate 26 was laminated with a pressure-sensitive adhesive, thereby providing a liquid crystal display unit 26. The polarizing plate 26 in the viewing side was laminated so that the extraordinary refractive index direction of a liquid crystal composition in the liquid crystal cell was perpendicular to the absorption axis of the optical compensation polarizing plate 26 under no voltage application. The polarizing plate 26 was provided so that the absorption axis thereof was perpendicular to the absorption axis of the optical compensation polarizing plate.

(Evaluation)

Using a contrast meter (EZ-Contrast, manufactured by ELDIM), the contrast ratios in plane and at an incline angle 70° from the normal line direction at a viewing angle of 45° to the light axis of the perpendicular polarizing plate were measured in this liquid crystal display unit. As a result, the contrast ratio in plane was 370, while that at 70° was 35. In black display, the degree of coloration in plane was compared with the degree of coloration at an incline angle 70° from the normal line direction at a viewing angle of 45° to the light axis of the perpendicular polarizing plate. As a result, little change was observed. When this liquid crystal display unit was exposed to 60° C. and 95% RH for 200 hours, in-plane irregularities were examined with the naked eye. As a result, little irregularities were observed. Similarly, the polarization performance was scarcely worsened.

(Construction of Liquid Crystal Display Units 27 to 29)

Liquid crystal display units 27 to 29 were constructed as in the construction of the liquid crystal display unit 26 but using the polarizing plates 27 to 29 as a substitute for the polarizing plate 26 and the optical compensation polarizing plates 27 to 29 as a substitute for the optical compensation polarizing plate 26. As a result, similar performances were achieved.

Comparative Example 1

On both faces of a film (polarizer: 20 μm) obtained by allowing a polyvinyl alcohol-base film to adsorb iodine and stretching, a cellulose triacetate film (T80UZ manufactured by FUJI PHOTOFILM Co., Ltd., 80 μm) as a transparent protective film was laminated with the use of a pressure-sensitive adhesive to give a polarizing plate. The cellulose triacetate film had a thickness of 80 μm, a phase contrast in plane Re of 4 nm and a phase contrast in the thickness direction Rth of 45 nm.

This polarizing plate was laminated on both faces of a liquid crystal cell of the IPS mode as in EXAMPLE 1 to give a liquid crystal display unit. The polarizing plates provided on both faces of the liquid crystal cell were arranged so that the polarization axes thereof were perpendicular to each other.

The contrast ratios in plane and at an incline angle 70° from the normal line direction at a viewing angle of 45° to the light axis of the perpendicular polarizing plate were measured in this liquid crystal display unit. As a result, the contrast ratio in plane was 370, while that at 70° was 9. In black display, serious coloration into blue was observed at an incline angle 70° from the normal line direction at a viewing angle of 45°.

Comparative Example 2

A film (TAC TD80U manufactured by FUJI PHOTOFILM Co., Ltd., 80 μm) was laminated on one face of a film (polarizer: 20 μm) obtained by allowing a polyvinyl alcohol-base film to adsorb iodine and stretching, while a ZEONOR film (manufactured by ZEON Co.) was laminated on the other face as transparent protective films with the use of a pressure-sensitive adhesive to give a polarizing plate. The ZEONOR film had a thickness of 80 μm, a phase contrast in plane Re of 1 nm and a phase contrast in the thickness direction Rth of 4 nm.

This polarizing plate was laminated on both faces of a liquid crystal cell of the IPS mode as in EXAMPLE 1 to give a liquid crystal display unit. The polarizing plates provided on both faces of the liquid crystal cell were arranged so that the polarization axes thereof were perpendicular to each other.

The contrast ratios in plane and at an incline angle 70° from the normal line direction at a viewing angle of 45° to the light axis of the perpendicular polarizing plate were measured in this liquid crystal display unit. As a result, the contrast ratio in plane was 360, while that at 70° was 10. In black display, serious coloration into blue was observed at an incline angle 70° from the normal line direction at a viewing angle of 45°. When this liquid crystal display unit was exposed to 60° C. and 95% RH for 200 hours and then taken out, peeling occurred at the interface of the polarizer and the ZEONOR and irregularities and a lowering in contrast were observed.

Comparative Example 3

A film (TAC TD80U manufactured by FUJI PHOTOFILM Co., Ltd., 80 μm) was laminated on one face of a film (polarizer: 20 μm) obtained by allowing a polyvinyl alcohol-base film to adsorb iodine and stretching, while a phase contrast film obtained by stretching a polycarbonate film (phase contrast in plane 100 nm, Nz=0.5) was laminated as transparent protective films with the use of a pressure-sensitive adhesive so as to make the slow axis of the phase contrast film in parallel to the absorption axis of the polarizing plate to give an optical compensation polarizing plate 17. The optical compensation polarizing plate thus formed was laminated on an IPS mode liquid crystal cell in such a manner that the optical compensation layer side was provided as the face in the viewing side of the liquid crystal cell as in EXAMPLE 1. On the opposite side of the liquid crystal cell, the polarizing plate 1 used in EXAMPLE 1 was laminated with a pressure-sensitive adhesive, thereby providing a liquid crystal display unit 17.

The contrast ratios in plane and at an incline angle 70° from the normal line direction at a viewing angle of 45° to the light axis of the perpendicular polarizing plate were measured in this liquid crystal display unit. As a result, the contrast ratio in plane was 360, while that at 70° was 15. In black display, serious coloration into blue was observed at an incline angle 70° from the normal line direction at a viewing angle of 45°. When this liquid crystal display unit was exposed to 60° C. and 95% RH for 200 hours and then taken out, peeling occurred at the interface of the polarizer and the ZEONOR and irregularities and a lowering in contrast were observed.

Comparative Example 4

A film (TAC TD80U manufactured by FUJI PHOTOFILM Co., Ltd., 80 μm) was laminated on one face of a film (polarizer: 20 μm) obtained by allowing a polyvinyl alcohol-base film to adsorb iodine and stretching, while a phase contrast film obtained by stretching a polycarbonate film (phase contrast in plane 120 nm, Nz=1.0) was laminated as transparent protective films with the use of a pressure-sensitive adhesive so as to make the slow axis of the phase contrast film in parallel to the absorption axis of the polarizing plate to give an optical compensation polarizing plate 18. The optical compensation polarizing plate thus formed was laminated on an IPS mode liquid crystal cell in such a manner that the optical compensation layer side was provided as the face in the viewing side of the liquid crystal cell as in EXAMPLE 1. On the opposite side of the liquid crystal cell, the polarizing plate 1 used in EXAMPLE 1 was laminated with a pressure-sensitive adhesive, thereby providing a liquid crystal display unit.

The contrast ratios in plane and at an incline angle 70° from the normal line direction at a viewing angle of 45° to the light axis of the perpendicular polarizing plate were measured in this liquid crystal display unit. As a result, the contrast ratio in plane was 370, while that at 70° was 8. In black display, serious coloration into blue was observed at an incline angle 70° from the normal line direction at a viewing angle of 45°. When this liquid crystal display unit was exposed to 60° C. and 95% RH for 200 hours and then taken out, peeling occurred at the interface of the polarizer and the ZEONOR and irregularities and a lowering in contrast were observed.

TABLE 1

Optical Performances of Samples 101 to 116

| Sample | Ex. No. | Film thickness μm | Degree of cellulose acetate substitution | Agent lowering optical anisotropy (LogP) | Re (590) nm | Rth (590) nm | Wavelength dispersion regulator (LogP) | $|Re_{(400)}-Re_{(700)}|$ nm | $|Rth_{(400)}-Rth_{(700)}|$ nm | Dope transparency % | Film Tg °C. | Film haze % | ΔRth nm (10% RH-80% RH) | $H_2O$ content % (% RH) | Vapor transmission rate (as 80 μml) g/m² day |
|---|---|---|---|---|---|---|---|---|---|---|---|---|---|---|---|
| 101 | 1 | 80 | 2.86 | A-19 (5.9% to cellulose) | 1.8 | 23.8 | No | — | 6.0 | 23.1 | 93.4 | 138.4 | 0.33 | 27.7 | 3.4 | 1482 |
| 102 | 1 | 80 | 2.86 | A-19 (12% to cellulose) | 1.9 | 7.2 | No | — | 5.2 | 24.4 | 93.2 | 138.5 | 0.35 | 26.5 | 3.2 | 1346 |
| 103 | 1 | 80 | 2.86 | A-19 (12% to cellulose) | 1.0 | 14.9 | UV-102 (1.8% to cellulose) | 5.6 | 1.1 | 14.7 | 92.1 | 134.2 | 0.42 | 25.4 | 3.1 | 1152 |
| 104 | 1 | 60 | 2.86 | A-19 (12% to cellulose) | 2.0 | 12.3 | UV-102 (1.8% to cellulose) | 5.6 | 0.8 | 14.2 | 92.4 | 134.0 | 0.35 | 24.8 | 3.0 | 1164 |
| 105 | 1 | 40 | 2.86 | A-19 (12% to cellulose) | 1.3 | 8.2 | UV-102 (1.8% to cellulose) | 5.6 | 0.1 | 13.8 | 91.8 | 133.9 | 0.32 | 23.9 | 3.1 | 1158 |
| 106 | 1 | 80 | 2.86 | C-1 (12% to cellulose) | 1.3 | −22.5 | No | — | 9.0 | 21.5 | 90.3 | 132.4 | 0.31 | — | 2.7 | 1688 |
| 107 | 5 | 80 | 2.94 | A-7 (12% to cellulose) | 0.5 | −2.1 | No | — | 3.2 | 13.0 | 91.4 | 136.2 | 0.33 | — | 3.0 | 1584 |
| 108 | 5 | 80 | 2.94 | B-30 (12% to cellulose) | 1.1 | 5.1 | No | — | 3.4 | 14.2 | 92.3 | 138.1 | 0.32 | — | 3.1 | 1543 |
| 109 | 5 | 80 | 2.94 | PL-1 (12% to cellulose) | 0.8 | −7.6 | No | — | 4.0 | 14.5 | 90.7 | 137.4 | 0.34 | — | 3.4 | 1538 |
| 110 | 5 | 80 | 2.94 | PL-19 (12% to cellulose) | 1.0 | 7.3 | No | — | 5.0 | 11.0 | 89.4 | 124.5 | 0.24 | — | 3.6 | 1595 |
| 111 | 5 | 80 | 2.94 | D-7 (12% to cellulose) | 1.7 | −9.9 | No | — | 5.0 | 18.1 | 92.2 | 138.0 | 0.27 | — | 3.2 | 1405 |
| 112 | 5 | 80 | 2.94 | E-1 (12% to cellulose) | 0.8 | 6.5 | No | — | 6.0 | 17.4 | 93.0 | 133.0 | 0.23 | — | 2.8 | 1438 |
| 113 | 5 | 80 | 2.94 | I-10 (12% to cellulose) | 0.2 | 17.1 | UV-21 + UV-22 (1.8% in total to cellulose) | 10.10 | 4.8 | 14.8 | 89.4 | 132.8 | 0.36 | — | 2.7 | 1128 |
| 114 | 2 | 80 | 2.86 | L-1 (12% to cellulose) | 0.4 | 11.4 | UV-21 + UV-22 | 10.10 | 4.4 | 13.2 | 90.2 | 131.3 | 0.32 | — | 2.9 | 1178 |

TABLE 1-continued

Optical Performances of Samples 101 to 116

| Sample | Ex. No. | Film thickness µm | Degree of cellulose acetate substitution | Agent lowering optical anisotropy (LogP) | Re (590) nm | Rth (590) nm | Wavelength dispersion regulator (LogP) | $|Re_{(400)}-Re_{(700)}|$ nm | $|Rth_{(400)}-Rth_{(700)}|$ nm | Dope transparency % | Film Tg °C. | Film haze % | ΔRth nm (10% RH-80% RH) | $H_2O$ content % (% RH) | Vapor transmission rate (as 80 µml) g/m² day |
|---|---|---|---|---|---|---|---|---|---|---|---|---|---|---|---|
| | | | | | | | (1.8% in total to cellulose) | | | | | | | | |
| 115 | 3 | 40 | 2.86 | A-19 (12% to cellulose) | 2.9 | 0.3 | 3.2 | UV-102 (3.6% to cellulose) | 5.6 | 1.2 | 7.5 | 93.3 | 134.3 | 0.34 | 24.9 | 3.3 | 1063 |
| 116 | 4 | 40 | 2.94 | A-19 (12% to cellulose) | 2.9 | 0.5 | 0.2 | UV-102 (3.6% to cellulose) | 5.6 | 1.0 | 2.8 | 93.1 | 133.8 | 0.36 | 23.7 | 3.2 | 958 |

TABLE 2

| Sample | Ex. No. | Film thickness | Degree of TAC-substitution | Rth-lowering agent | Re | Rth | Wavelength dispersion regulator | ΔRe | ΔRth | Transparency | Tg | Haze | Humd. dependency | H₂O content | Vapor transmission rate |
|---|---|---|---|---|---|---|---|---|---|---|---|---|---|---|---|
| 118 | 5, 6, 7 | 80 | 2.94 | A-19 | 0.8 | −1.1 | UV-102 (1.8%) | 1.0 | 10.0 | 93.1 | 134 | 0.20 | — | 2.8 | 1020 |
| 119 | 5, 6, 7 | 90 | 2.94 | A-19 | 1.0 | −2.1 | UV-102 (1.8%) | 1.2 | 12.1 | 92.8 | 134 | 0.23 | — | 2.8 | 952 |
| 120 | 5, 6, 7 | 80 | 2.94 | D-7 | 1.1 | −1.5 | UV-21-22 (1.8%) | 1.4 | 11.7 | 93.1 | 137 | 0.28 | — | 2.9 | 1120 |
| 121 | 5, 6, 7 | 90 | 2.94 | D-7 | 1.5 | −2.4 | UV-21-22 (1.8%) | 1.9 | 13.8 | 92.0 | 137 | 0.32 | — | 2.9 | 980 |

The invention claimed is:

1. An optical compensation polarizing plate comprising: a first transparent protective film; a polarizer; a second transparent protective film; and an optical compensation layer in this order, wherein at least one of the first and second transparent protective films is a cellulose acylate film having a retardation value in plane Re (nm) and a retardation value in film thickness direction Rth (nm) which fulfill the following formulae (I) and (II), and Nz and $Re_1$ defined by the following formulae (III) and (IV), of the optical compensation layer fulfill the following formulae (V) and (VI):

$$|Re| \leq 2 \quad (I)$$

$$|Rth| \leq 5 \quad (II)$$

$$Nz = (nx_1 - nz_1)/(nx_1 - ny_1) \quad (III)$$

$$Re_1 = (nx_1 - ny_1) \times d_1 \quad (IV)$$

$$0.45 \leq Nz \leq 0.6 \quad (V)$$

$$100 \leq Re_1 \leq 350 \quad (VI)$$

wherein $Re_1$ is a retardation value in plane (nm) at a wavelength of 590 nm; Nz is an Nz factor at a wavelength of 590 nm; $nx_1$ is a refractive index along a slow axis in a film plane; $ny_1$ is a refractive index along a direction perpendicular to the slow axis in a film plane; $nz_1$ is a refractive index along a thickness direction of the film; and $d_1$ is a thickness of the film (nm), wherein the at least one of the first and second transparent protective films contains at least one compound being capable of lowering the retardation value in a film thickness direction Rth within a range fulfilling both of the following formulae (IX) and (X), and wherein the at least one compound being capable of lowering the retardation value in a film thickness direction Rth is present in an amount which fulfills formula (X):

$$(Rth(A) - Rth(0))/A \leq 1.0 \quad (IX)$$

$$0.1 \leq A \leq 30 \quad (X)$$

wherein Rth(A) is Rth (nm) of a film containing A % of the compound being capable of lowering Rth; Rth(0) is Rth (nm) of a film containing no compound being capable of lowering Rth; and A is a mass (%) of the compound referring to a mass of polymers employed as film material as 100.

2. The optical compensation polarizing plate according to claim 1, wherein the at least one of the first and second transparent protective films fulfills the following formula (VII):

$$|Re_{(400)} - Re_{(700)}| \leq 10 \text{ and } |Rth_{(400)} - Rth_{(700)}| \leq 35 \quad (VII)$$

wherein Re(λ) is a retardation value in plane (nm) at a wavelength of λ nm; and Rth(λ) is a retardation value in a film thickness direction (nm) at a wavelength of λ nm.

3. The optical compensation polarizing plate according to claim 1, wherein the at least one of the first and second transparent protective films has a thickness of from 10 to 120 µm.

4. The optical compensation polarizing plate according to claim 1, wherein the at least one of the first and second transparent protective films fulfills the following formula (VIII):

$$|Re(MAX) - Re(MIN)| \leq 6 \text{ and } |Rth(MAX) - Rth(MIN)| \leq 10 \quad (VIII)$$

wherein Re(MAX) and Rth(MAX) are maximum retardation values (nm) of an arbitrary cut out film piece of 1 m square; and Re(MIN) and Rth(MIN) are minimum retardation values (expressed in nm) thereof.

5. The optical compensation polarizing plate according to claim 1, wherein the compound being capable of lowering Rth is a compound having an octanol-water partition coefficient (LogP) of from 0 to 7.

6. The optical compensation polarizing plate according to claim 1, which contains, as the compound lowering Rth, at least one compound selected from compounds represented by the following formulae (13), (18) and (19) in an amount of from 0.01 to 30% by weight based on solid cellulose acylate content:

(13)

wherein $R^1$ represents an alkyl group or an aryl group; and $R^2$ and $R^3$ each independently represent a hydrogen atom, an alkyl group or an aryl group, provided that a sum of carbon atoms in $R^1$, $R^2$ and $R^3$ is 10 or more;

(18)

wherein $R^1$ represents an alkyl group or an aryl group; and $R^2$ and $R^3$ each independently represent a hydrogen atom, an alkyl group or an aryl group;

(19)

wherein $R^4$, $R^5$ and $R^6$ each independently represent an alkyl group or an aryl group.

7. The optical compensation polarizing plate according to claim 1, wherein the at least one of the first and second transparent protective films contains at least one compound being capable of lowering |Re(400)−Re(700)| and |Rth(400)−Rth(700)| in an amount of from 0.01 to 30% by weight based on solid cellulose acylate content.

8. The optical compensation polarizing plate according to claim 1, wherein the at least one of the first and second transparent protective films has a slow axis in a transverse direction perpendicular to a machine direction of the film.

9. The optical compensation polarizing plate according to claim 1, wherein the at least one of the first and second transparent protective films is alkali-saponified and has a contact angle of an alkali-saponified film surface of 55° or less.

10. The optical compensation polarizing plate according to claim 1, wherein the at least one of the first and second transparent protective films shows changes in Re and Rth each 15 nm or less after treating at 60° C. and 90% RH for 240 hours.

11. The optical compensation polarizing plate according to claim 1, wherein the at least one of the first and second transparent protective films shows changes in Re and Rth each 15 nm or less after treating at 80° C. for 240 hours.

12. The optical compensation polarizing plate according to claim 1, wherein the at least one of the first and second transparent protective films is a stretched film and the optical compensation layer is provided after the stretching.

13. The optical compensation polarizing plate according to claim 1, wherein the at least one of the first and second transparent protective films is a stretched film which is stretched after the optical compensation layer is provided.

14. The optical compensation polarizing plate according to claim 12, wherein the retardation values in plane of the at least one of the first and second transparent protective films before and after the stretching fulfill the following formula (XI):

$$|Re(n)-Re(0)|/n \leq 1.0 \qquad (XI)$$

wherein Re(n) is a retardation value in plane (nm) of the film stretched by n(%); and Re(0) is a retardation value in plane (nm) of non-stretched film.

15. The optical compensation polarizing plate according to claim 1, wherein the at least one of the first and second transparent protective films comprises cellulose acetate having a degree of substitution by acyl group of from 2.70 to 3.00.

16. The optical compensation polarizing plate according to claim 1, wherein the at least one of the first and second transparent protective films comprises cellulose acylate fulfilling the following formulae (XII) to (XIV):

$$2.50 \leq SA+SB \leq 3.00 \qquad (XII)$$

$$0 \leq SA \leq 2.5 \qquad (XIII)$$

$$0.5 \leq SB \leq 3.00 \qquad (XIV)$$

wherein SA is a degree of substitution by acetyl group; and SB is a degree of substitution by substituted acyl group having from 3 to 22 carbon atoms.

17. The optical compensation polarizing plate according to claim 1, wherein the optical compensation layer is an optical compensation layer wherein a rod-like or disk-like compound is oriented perpendicularly to a face of the at least one of the first and second transparent protective films.

18. The optical compensation polarizing plate according to claim 1, wherein the optical compensation layer contains a polymer having a positive intrinsic double refraction value selected from the group consisting of polyamide, polyimide, polyester, polyether ketone, polyamide imide and polyester imide.

19. The optical compensation polarizing plate according to claim 1, wherein the optical compensation layer contains a polymer having a negative intrinsic double refraction value.

20. The optical compensation polarizing plate according to claim 1, wherein the at least one of the first and second transparent protective films is bonded to the optical compensation layer via an adhesive layer or a pressure-sensitive adhesive layer.

21. The optical compensation polarizing plate according to claim 1, which further comprises at least one layer selected from the group consisting of a hard coat layer, an antiglare layer and an antireflective layer.

22. An image display unit comprising the optical compensation polarizing plate according to claim 1.

23. A liquid crystal display unit comprising an image display unit of an IPS mode, wherein the optical compensation polarizing plate according to claim 1 is provided at a cell substrate in a viewing side, a polarizing plate comprising the transparent protective film and a polarizer is provided at a cell substrate in a side opposite to the viewing side, and a major axis direction of liquid crystal molecules in the liquid crystal cell is in parallel with an absorption axis direction of the polarizing plate under no voltage application, the transparent protective film being a cellulose acylate film having a retardation value in plane Re (nm) and a retardation value in film thickness direction Rth (nm) which fulfill the following formulae (I) and (II):

$$|Re| \leq 2 \qquad (I)$$

$$|Rth| \leq 5. \qquad (II)$$

24. A liquid crystal display unit comprising an image display unit of an IPS mode, wherein a polarizing plate comprising the transparent protective film and a polarizer is provided at a cell substrate in a viewing side, the optical compensation polarizing plate according to claim 1 is provided in a cell substrate at a side opposite to the viewing side, and a major axis direction of liquid crystal molecules in the liquid crystal cell is perpendicular to an absorption axis direction of the polarizing plate under no voltage application, the transparent protective film being a cellulose acylate film having a retardation value in plane Re (nm) and a retardation value in film thickness direction Rth (nm) which fulfill the following formulae (I) and (II):

$$|Re| \leq 2 \qquad (I)$$

$$|Rth| \leq 5. \qquad (II)$$

25. The optical compensation polarizing plate according to claim 1, wherein the at least one of the first and second transparent protective films contains at least one compound lowering Rth that is selected from compounds represented by the following formulae (13), (18) and (19):

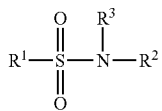 (13)

wherein $R^1$ represents an alkyl group or an aryl group; and $R^2$ and $R^3$ each independently represent a hydrogen atom, an alkyl group or an aryl group, provided that a sum of carbon atoms in $R^1$, $R^2$ and $R^3$ is 10 or more;

 (18)

wherein $R^1$ represents an alkyl group or an aryl group; and $R^2$ and $R^3$ each independently represent a hydrogen atom, an alkyl group or an aryl group;

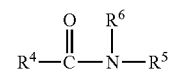 (19)

wherein $R^4$, $R^5$ and $R^6$ each independently represent an alkyl group or an aryl group.

* * * * *